(12) United States Patent
Wachi

(10) Patent No.: US 6,929,687 B2
(45) Date of Patent: Aug. 16, 2005

(54) INK SET FOR INK JET RECORDING AND INK JET RECORDING METHOD

(75) Inventor: Naotaka Wachi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 52 days.

(21) Appl. No.: 10/624,536

(22) Filed: Jul. 23, 2003

(65) Prior Publication Data

US 2004/0123770 A1 Jul. 1, 2004

(30) Foreign Application Priority Data

Jul. 24, 2002 (JP) .................................... P. 2002-215296
Jul. 24, 2002 (JP) .................................... P. 2002-215297

(51) Int. Cl.$^7$ .............................................. C09D 11/02
(52) U.S. Cl. ................................ 106/31.48; 106/31.49; 106/31.5
(58) Field of Search .......................... 106/31.48, 31.49, 106/31.5; 347/100

(56) References Cited

U.S. PATENT DOCUMENTS

| | | | | |
|---|---|---|---|---|
| 6,786,571 B2 | * | 9/2004 | Fukumoto et al. | 347/43 |
| 2003/0035034 A1 | * | 2/2003 | Fukumoto et al. | 347/86 |
| 2003/0210310 A1 | * | 11/2003 | Wachi | 347/100 |
| 2003/0217671 A1 | * | 11/2003 | Ozawa | 106/31.49 |
| 2004/0066438 A1 | * | 4/2004 | Taguchi et al. | 347/100 |
| 2004/0089200 A1 | * | 5/2004 | Fujiwara et al. | 106/31.48 |
| 2004/0139882 A1 | * | 7/2004 | Taguchi et al. | 106/31.13 |
| 2004/0155947 A1 | * | 8/2004 | Ozawa et al. | 347/100 |
| 2004/0187735 A1 | * | 9/2004 | Taguchi et al. | 106/31.27 |
| 2004/0187738 A1 | * | 9/2004 | Taguchi et al. | 106/31.48 |
| 2004/0194661 A1 | * | 10/2004 | Taguchi et al. | 106/31.48 |

FOREIGN PATENT DOCUMENTS

| | | |
|---|---|---|
| JP | 2002-60664 A | 2/2002 |
| JP | 2002-105365 A | 4/2002 |
| JP | 2002-105366 A | 4/2002 |
| JP | 2002-105367 A | 4/2002 |
| JP | 2002-105368 A | 4/2002 |
| JP | 2002-138224 A | 5/2002 |
| JP | 2002-249677 A | 9/2002 |
| JP | 2002-309115 A | 10/2002 |
| JP | 2002-309116 A | 10/2002 |
| JP | 2002-309118 A | 10/2002 |
| JP | 2003-12952 A | 1/2003 |
| JP | 2003-64275 A | 3/2003 |
| JP | 2003-119415 A | 4/2003 |

* cited by examiner

*Primary Examiner*—Helene Klemanski
(74) *Attorney, Agent, or Firm*—Sughrue Mion, PLLC

(57) ABSTRACT

The ink set for ink jet recording of the present invention, which exhibits a high recorded image quality, an excellent image preservability (heat stability, light fastness, oxidation resistance) and little change of color balance with time, and an ink jet recording method using same, and which comprises a plurality of inks containing a dye, a water-miscible organic solvent and water, wherein the ink set comprises at least yellow, magenta, cyan, black and dark yellow inks, and the dark yellow ink contains at least one of a magenta-azo dye having a specific structure having a 6-membered heterocyclic group connected to diazo group and a cyan dye having a specific structure.

6 Claims, No Drawings

INK SET FOR INK JET RECORDING AND INK JET RECORDING METHOD

FIELD OF THE INVENTION

The present invention relates to an ink set for ink jet recording which provides a recorded image having a high quality and an excellent preservability and an ink jet recording method using same. More particularly, the present invention relates to an ink set for ink jet recording which provides an image that is fast even in an oxidizing atmosphere and shows little change in hue of gray in particular and an ink jet recording method using same.

BACKGROUND OF THE INVENTION

In recent years, with the spread of computers, ink jet printers have been widely used to print on paper, film, cloth, etc. at offices as well as at home.

Examples of ink jet recording method include a method which allows a piezoelectric element to give pressure that causes a droplet to be ejected, a method which comprises heating the ink to generate bubbles, causing a droplet to be ejected, a method involving the use of ultrasonic wave, and a method which uses electrostatic force to suck and discharge a droplet. As inks for these ink jet recording methods there are used aqueous inks, oil-based inks and solid (melt type) inks. Among these inks, aqueous inks are mainly used from the standpoint of producibility, handleability, odor, safety, etc.

The coloring agents to be incorporated in these inks for ink jet recording are required to exhibit a high solubility in solvents, allow a high density recording and have a good hue and an excellent fastness to light, heat, air, water and chemical, a good fixability to image-receiving materials, difficulty in running, an excellent preservability, no toxicity and a high purity and be available at a low cost. However, it is extremely difficult to seek coloring agents meeting these requirements to a high extent. In particular, coloring agents having a good magenta hue and cyan hue and an excellent light fastness have been keenly desired.

Various dyes and pigments have been already proposed for ink jet recording and have been actually used. However, no coloring agents meeting all these requirements have been found yet. Known dyes and pigments provided with color index (C.I.) can difficultly satisfy both the hue and fastness requirements for inks for ink jet recording. No magenta dyes having an excellent hue and a satisfactory fastness have been obtained yet.

On the other hand, an ink jet recording method involving recording with an ink set comprising an ink (e.g., dark yellow ink) comprising a small amount of dyes (or pigments) having different hues incorporated in admixture in a main dye (or pigment) has been proposed. However, it was found disadvantageous in that when an ink comprising a plurality of dyes (or pigments) incorporated in admixture therein is used, the recorded image undergoes color tone change with time and the degree of change differs with the image density due to the difference in dye fastness among the dyes (or pigments) in the ink composition and probably due to the interaction of the dyes (or pigments). These troubles cause an undesirable complex color balance change that cannot be corrected even by controlling the ink jet printer by an image processing soft ware. As a result, neutral color (also referred to as "gray"), which is a base of color image quality, is tinted, remarkably deteriorating the image quality.

The deterioration of quality of recorded image with time is accelerated by exposure to high temperature and humidity or an oxidizing atmosphere or irradiation with light at high illuminance. Accordingly, the dye (or pigment) to be incorporated in the ink composition has been required to have excellent heat stability, light fastness and oxidation resistance and undergo no tint change of neutral color with time, i.e., no change of color balance.

SUMMARY OF THE INVENTION

It is therefore an aim of the invention is to provide an ink set for ink jet recording which provides a recorded image having a high quality and an excellent preservability (heat stability, light fastness and oxidation resistance) that shows little change of color balance with time and an ink jet recording method using same.

The inventors searched a dye material which can avoid or eliminate the foregoing problems. As a result, a dye material which itself is fast and doesn't have its fastness affected by other dye materials, it any present therewith, or doesn't affect these dye materials was found. The aim of the invention was accomplished with this dye material. In other words, the invention concerns the following ink set for ink jet recording and ink jet recording method.

(1) An ink set for ink jet recording, which comprises a plurality of inks containing a dye, a water-miscible organic solvent and water, wherein the ink set includes yellow, magenta, cyan, black and dark yellow inks, and the dark yellow ink contains at least one of a magenta dye represented by the following general formula (I-a) and a cyan dye represented by the following general formula (I-b):

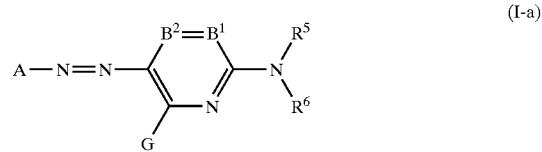

(I-a)

wherein A represents a 5-membered heterocyclic group; $B^1$ and $B^2$ each represent a nitrogen atom, $=CR^1—$ or $—CR^2=$, and when one of $B^1$ and $B^2$ represents a nitrogen atom, the other represents $=CR^1—$ or $—CR^2=$; $R^5$ and $R^6$ each independently a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, the hydrogen atom of which maybe substituted; G, $R^1$ and $R^2$ each independently represent a hydrogen atom, halogen atom, aliphatic group, aromatic group, heterocyclic group, cyano group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureide group, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfinyl group, sulfamoyl group or sulfo group, the hydrogen atom of which may be substituted; $R^1$ and $R^5$ or $R^5$ and $R^6$ may be connected to each other to form a 5- or 6-membered ring:

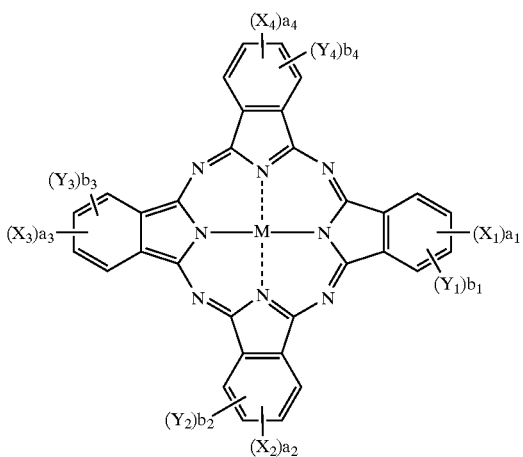

(I-b)

wherein $X_1$, $X_2$, $X_3$ and $X_4$ each independently represent —SO-Z, —SO$_2$-Z, —SO$_2$NR$_1$R$_2$, sulfo group, —CONR$_1$R$_2$ or —CO$_2$R$_1$; Z represents a substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group; $R_1$ and $R_2$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group, with the proviso that when there are a plurality of Z's, they may be the same or different; $Y_1$, $Y_2$, $Y_3$ and $Y_4$ each independently represent a monovalent substituent, with the proviso that when there are a plurality of any of $X_1$ to $X_4$ and $Y_1$ to $Y_4$, they may be the same or different; M represents a hydrogen atom, a metal atom, or the oxide, hydroxide or halide thereof; and $a_1$ to $a_4$ and $b_1$ to $b_4$ each independently represent an integer of from 0 to 4, which indicate the number of substituents on $X_1$ to $X_4$ and $Y_1$ to $Y_4$, with the proviso that $a_1$ to $a_4$ are not 0 at the same time.

(2) The ink set for ink jet recording as defined in the item (1), wherein the dark yellow ink and the magenta ink each comprise at least one magenta dye represented by the general formula (I-a).

(3) The ink set for ink jet recording as defined in the item (1) or (2), wherein the dark yellow ink and the cyan ink each comprise at least one cyan dye represented by the general formula (I-b).

(4) The ink set for ink jet recording as defined in any one of the items (1) to (3), wherein the ink set comprises yellow, dark yellow, magenta, light magenta, cyan, light cyan and black inks.

(5) An ink jet recording method, which comprises using the ink set for ink jet recording as defined in any one of the items (1) to (4).

(6) The ink jet recording method as defined in the item (5), which comprises: ejecting an ink droplet onto an image-receiving material according to a recording signal, in which the image-receiving material comprises an image-receiving layer containing a particulate white inorganic pigment provided on a support; and recording an image on the image-receiving material, wherein the ink droplet is an ink of the ink set for ink jet recording defined in any one of the items (1) to (4).

DETAILED DESCRIPTION OF THE INVENTION

The invention will be further described hereinafter.

The dye of the following general formula (I-a) to be incorporated in the dark yellow ink and magenta ink of the ink set for ink jet recording of the invention which satisfies the requirements for image fastness of the invention will be described. This dye is an azo dye comprising an aromatic nitrogen-containing 6-membered heterocyclic group as a coupling component and is represented by the following general formula (I-a).

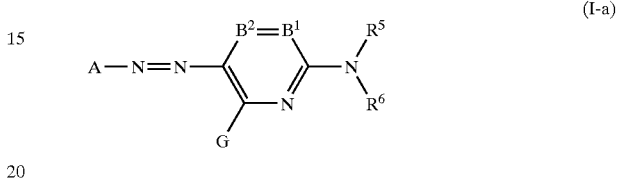

(I-a)

In the general formula (I-a), A represents a 5-membered heterocyclic group.

$B^1$ and $B^2$ each represent =CR$^1$— or —CR$^2$=or one of $B^1$ and $B^2$ represents a nitrogen atom and the other represents =CR$^1$— or —CR$^1$=. $R^5$ and $R^6$ each independently a hydrogen atom or a substituent such as aliphatic group, aromatic group, heterocyclic group, acyl group, alkoxycarbonyl group, aryloxycarbonyl group, carbamoyl group, alkylsulfonyl group, arylsulfonyl group or sulfamoyl group the hydrogen atoms of which may be substituted.

G, $R^1$ and $R^2$ each independently represent a hydrogen atom or a substituent such as halogen atom, aliphatic group, aromatic group, heterocyclic group, cyano group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, acylamino group, ureide group, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfonyl group, alkylsulfinyl group, arylsulfinyl group, heterocyclic sulfinyl group, sulfamoyl group or sulfo group the hydrogen atoms of which may be substituted.

$R^1$ and $R^5$ or $R^5$ and $R^6$ may be connected to each other to form a 5- or 6-membered ring.

The dye represented by the general formula (I-a) will be further described hereinafter.

In the general formula (I-a), A represents a 5-membered heterocyclic group. Examples of the hetero atoms of the heterocyclic group include N, O, and S. A is preferably a nitrogen-containing 5-membered ring. To the heterocyclic group may be condensed an aliphatic ring, an aromatic ring or other heterocyclic groups. Preferred examples of the heterocyclic group A include pyrazole ring, imidazole ring, thiazole ring, isothiazole ring, thiadiazole ring, benzothiazole ring, benzoxazole ring, and benzoisothiazole ring. These heterocyclic groups may each have substituents. Preferred among these heterocyclic groups are pyrazole ring, imidazole ring, isothiazole ring, thiadiazole ring and benzothiazole ring represented by the following general formulae (a) to (f).

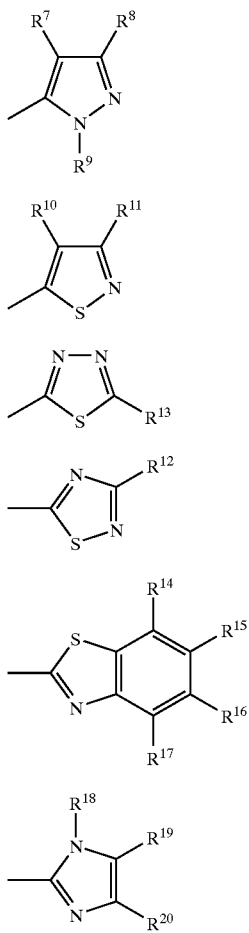

In the general formulae (a) to (f), $R^7$ to $R^{20}$ each represent the same substituent as represented by G, $R^1$ and $R^2$ in the general formula (I-a).

Preferred among the groups represented by the general formulae (a) to (f) are pyrazole ring and isothiazole ring represented by the general formulae (a) and (b), respectively. Most desirable among these groups is pyrazole ring represented by the general formula (a).

In the general formula (I-a), $B^1$ and $B^2$ represent =$CR^1$— and —$CR^2$=, respectively, or one of $B^1$ and $B^2$ represents =$CR^{1'}$ and the other represents —$CR^2$—. Preferably, $B^1$ and $B^2$ represent =$CR^1$— and —$CR^2$=, respectively.

$R^5$ and $R^6$ each independently represent a hydrogen atom or a substituent such as aliphatic group, aromatic group, heterocyclic group, acyl group, alkoxycarbonyl group, aryloxycarbonyl group, carbamoyl group, alkylsulfonyl group, arylsulfonyl group or sulfamoyl group the hydrogen atoms of which may be substituted.

Particularly preferred among the groups represented by $R^5$ and $R^6$ are hydrogen atom, aliphatic group, aromatic group, heterocyclic group, acyl group, alkylsulfonyl group and arylsulfonyl group, more preferably hydrogen atom, aromatic group, heterocyclicp group, acyl group, alkylsulfonyl group and arylsulfonyl group, most preferably hydrogen atom, aryl group and heterocyclic group. The hydrogen atoms of these substituents may be substituted. However, $R^5$ and $R^6$ are not a hydrogen atom at the same time.

G, $R^1$ and $R^2$ each independently represent a hydrogen atom or a substituent such as halogen atom, aliphatic group, aromatic group, heterocyclic group, cyano group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureide group, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfonyl group, alkylsulfinyl group, arylsulfinyl group, heterocyclic sulfinyl group, sulfamoyl group or sulfo group the hydrogen atoms of which may be substituted.

G is preferably a hydrogen atom, halogen atom, aliphatic group, aromatic group, hydroxyl group, alkoxy group, aryloxy group, acyloxy group, heterocyclic oxy group, amino group, acylamino group, ureide group, sulfamoylamino group, alkoxycarbonylamino group, aryloxycarbonylamino group, alkylthio group, arylthio group or heterocyclic thio group, more preferably hydrogen atom, halogen atom, alkyl group, hydroxyl group, alkoxy group, aryloxy group, acyloxy group, amino group or acylamino group, particularly a hydrogen atom, amino group (preferably anilino group) or acylamino group. The hydrogen atoms of these substituents may be substituted.

Preferred examples of $R^1$ and $R^2$ include hydrogen atom, alkyl group, halogen atom, alkoxycarbonyl group, carboxyl group, carbamoyl group, hydroxyl group, alkoxy group, and cyano group. The hydrogen atoms of these substituents may be substituted.

$R^1$ and $R^5$ or $R^5$ and $R^6$ may be connected to each other to form a 5- or 6-membered ring.

Examples of the substituents on A or on the substituents on the substituents $R^1$, $R^2$, $R^5$, $R^6$ or G include those listed with reference to G, $R^1$ and $R^2$.

When the dye of the general formula (1) is a water-soluble dye, it is preferred that an ionic hydrophilic group be on any site on A, $R^1$, $R^2$, $R^5$, $R^6$ and G as a substituent. Examples of the ionic hydrophilic group to be used as a substituent include sulfo group, carboxyl group, phosphono group, and quaternary ammonium group. Preferred among these ionic hydrophilic groups are carboxyl group, phosphono group and sulfo group. Particularly preferred among these ionic hydrophilic groups are carboxyl group and sulfo group. The carboxyl group, phosphono group and sulfo group may be used in the form of salt. Examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion).

The substituents used herein will be further described hereinafter. The meaning of these substituents are common to different signs in the general formula (I-a) as well as the general formula (2) described later.

Examples of the halogen atom include fluorine atom, chlorine atom, and bromine atom.

The term "aliphatic group" as used herein is meant to include an alkyl group, substituted alkyl group, alkenyl group, substituted alkenyl group, alkinyl group, substituted alkinyl group, aralkyl group and substituted aralkyl group. The term "substituted" as used in "substituted alkyl group" is meant to indicate that the hydrogen atoms present in "alkyl group", etc. are substituted by substituents listed with reference to G, $R^1$ and $R^2$ above, etc.

The aliphatic group may have branches or may form a ring. The number of carbon atoms in the aliphatic group is preferably from 1 to 20, more preferably from 1 to 16. The aryl moiety of the aralkyl group and substituted aralkyl group is preferably a phenyl group or naphthyl group, particularly phenyl group. Examples of the aliphatic group include methyl group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenethyl group, vinyl group, and allyl group.

The term "aromatic group" as used herein is meant to include an aryl group and substituted a aryl group. The aryl group is preferably a phenyl group or naphthyl group, particularly phenyl group. The number of carbon atoms in the aromatic group is preferably from 6 to 20, more preferably from 6 to 16.

Examples of the aromatic group include phenyl group, p-tollyl group, p-methoxyphenyl group, o-chlorophenyl group, and m-(3-sulfopropylamino)phenyl group.

Examples of the heterocyclic group include substituted heterocyclic group. The heterocyclic group may have an aliphatic ring, aromatic ring or other heterocyclic groups condensed to its heterocyclic ring. The aforementioned heterocyclic group is preferably 5- or 6-membered heterocyclic group. Examples of the substituents on the aforementioned heterocyclic group include aliphatic group, halogen atom, alkylsulfonyl group, arylsulfonyl group, acyl group, acylamino group, sulfamoyl group, carbamoyl group, and ionichydrophilic group. Specific examples of the aforementioned include 2-pyridyl group, 2-chenyl group, 2-thiazolyl group, 2-benzothiazolyl group, 2-benzoxazoyl group, and 2-furyl group.

Examples of the carbamoyl group include substituted carbamoyl group. Examples of the substituents on the carbamoyl group include alkyl group. Examples of the aforementioned carbamoyl group include methylcarbamoyl group, and dimethylcarbamoyl group.

Examples of the alkoxycarbonyl group include substituted alkoxycarbonyl group. The alkoxycarbonyl group is preferably a $C_2$–$C_{20}$ alkoxycarbonyl group. Examples of the substituents on the alkoxycarbonyl group include ionic hydrophilic group. Examples of the alkoxycarbonyl group include methoxycarbonyl group, and ethoxycarbonyl group.

Examples of the aryloxycarbonyl group include substituted aryloxycarbonyl group. The aryloxycarbonyl group is preferably a $C_7$–$C_{20}$ aryloxycarbonyl group. Examples of the substituents on the aryloxycarbonyl group include ionic hydrophilic group. Examples of the aryloxycarbonyl group include phenoxycarbonyl group.

Examples of the heterocyclic oxycarbonyl group include substituted heterocyclic oxycarbonyl group. Examples of the heterocyclic ring include those listed with reference to the aforementioned heterocyclic group. The aforementioned heterocyclic oxycarbonyl group is preferably a $C_2$–$C_{20}$ heterocyclicoxycarbonyl group. Examples of the substituents on the heterocyclic oxycarbonyl group include ionic hydrophilic group. Examples of the heterocyclic oxycarbonyl group include 2-pyridyloxycarbonyl group.

Examples of the acyl group include substituted acyl group. The acyl group is preferably a $C_1$–$C_{20}$ acyl group. Examples of the substituents on the acyl group include ionic hydrophilic group. Examples of the acyl group include acetyl group, and benzoyl group.

Examples of the alkoxy group include substituted alkoxy group. The alkoxy group is preferably a $C_1$–$C_{20}$ alkoxy group. Examples of the substituents on the alkoxy group include alkoxy group, hydroxyl group, and ionic hydrophilic group. Examples of the alkoxy group include methoxy group, ethoxy group, isopropoxy group, methoxyethoxy group, hydroxyethoxy group, and 3-carboxypropoxy group.

Examples of the aryloxy group include substituted aryloxy group. The aryloxy group is preferably a $C_6$–$C_{20}$ aryloxy group. Examples of the substituents on the aryloxy group include alkoxy group, and ionic hydrophilic group. Examples of the aryloxy group include phenoxy group, p-methoxyphenoxy group, and o-methoxyphenoxy group.

Examples of the heterocyclic oxy group include substituted heterocyclic oxy group. The heterocyclic oxy group is preferably a $C_2$–$C_{20}$ heterocyclic oxy group. Examples of the substituents on the heterocyclic oxy group include alkyl group, alkoxy group, and ionic hydrophilic group. Examples of the heterocyclic oxy group include 3-pyridyloxy group, and 3-chenyloxy group.

The silyloxy group is preferably a $C_1$–$C_{20}$ silyloxy group having its aliphatic group or aromatic group substituted by substituents. Examples of the silyloxy group include trimethylsilyloxy, and diphenylmethylsilyloxy.

Examples of the acyloxy group include substituted acyloxy group. The acyloxy group is preferably a $C_1$–$C_{20}$ acyloxy group. Examples of the substituents on the acyloxy group include ionic hydrophilic group. Examples of the acyloxy group include acetoxy group, and benzoyloxy group.

Examples of the carbamoyloxy group include substituted carbamoyloxy group. Examples of the substituents on the carbamoyloxy group include alkyl group. Examples of the carbamoyloxy group include N-methylcarbamoyloxy group.

Examples of the alkoxycarbonyloxy group include substituted alkoxycarbonyloxy group. The alkoxycarbonyloxy group is preferably a $C_2$–$C_{20}$ alkoxycarbonyloxy group. Examples of the alkoxycarbonyloxy group include methoxycarbonyloxy group, and isopropoxycarbonyloxy group.

Examples of the aryoxycarbonyloxy group include substituted aryloxycarbonyloxy group. The aryloxycarbonyloxy group is preferably a $C_7$–$C_{20}$ aryloxycarbonyloxy group. Examples of the aryloxycarbonyloxy group include phenoxycarbonyloxy group.

Examples of the amino group include substituted amino group. Examples of the substituents on the amino group include alkyl group, aryl group, and heterocyclic group. The alkyl group, aryl group and heterocyclic group may further contain substituents. Examples of the alkylamino group include substituted alkylamino group. The alkylamino group is preferably a $C_1$–$C_{20}$ alkylamino group. Examples of the substituents on the alkylamino group include ionic hydrophilic group. Examples of the alkylamino group include methylamino group, and diethylamino group.

Examples of the arylamino group include substituted arylamino group. The arylamino group is preferably a $C_6$–$C_{20}$ arylamino group. Examples of the substituents on the arylamino group include halogen atom, and ionic hydrophilic group. Examples of the arylamino group include phenylamino group, and 2-chlorophenylamino group.

Examples of the heterocyclic amino group include substituted heterocyclic amino group. Examples of the heterocyclic ring include those listed with reference to the aforementioned heterocyclic group. The heterocyclic amino group is preferably a $C_2$–$C_{20}$ heterocyclic amino group. Examples of the substituents on the heterocyclic amino group include alkyl group, halogen atom, and ionic hydrophilic group.

Examples of the acylamino group include substituted acylamino group. The acylamino group is preferably a $C_2$–$C_{20}$ acylamino group. Examples of the substituents on the acylamino group include ionic hydrophilic group. Examples of the acylamino group include acetylamino group, propionylamino group, benzoylamino group, N-phenylacetylamino group, and 3,5-disulfobenzoylamino group.

Examples of the ureide group include substituted ureide group. The ureide group is preferably a $C_1$–$C_{20}$ ureide group. Examples of the substituents on the ureide group include alkyl group, and aryl group. Examples of the ureide group include 3-methylureide group, 3,3-dimethylureide group, and 3-phenylureide group.

Examples of the sulfamoylamino group include substituted sulfamoylamino group. Examples of the substituents on the sulfamoylamino group include alkyl group. Examples of the sulfamoylamino group include N,N-dipropylsulfamoylamino group.

Examples of the alkoxycarbonylamino group include substituted alkoxycarbonylamino group. The alkoxycarbonylamino group is preferably a $C_2$–$C_{20}$ alkoxycarbonylamino group. Examples of the substituents on the alkoxycarbonylamino group include ionic hydrophilic group. Examples of the alkoxycarbonylamino group include ethoxycarbonylamino group.

Examples of the aryloxycarbonylamino group include substituted aryloxycarbonylamino group. The aryloxycarbonylamino group is preferably a $C_7$–$C_{20}$ aryloxycarbonylamino group. Examples of the substituents on the aryloxycarbonylamino group include ionic hydrophilic group. Examples of the aryloxycarbonylamino group include phenoxycarbonylamino group.

Examples of the alkylsulfonylamino group and arylsulfonylamino group include substituted alkylsulfonylamino group, and substituted arylsulfonylamino group. The alkylsulfonylamino group and arylsulfonylamino group are preferably $C_1$–$C_{20}$ alkylsulfonylamino group and arylsulfonylamino group. Examples of the substituents on the alkylsulfonylamino group and arylsulfonylamino group include ionic hydrophilic group. Examples of the alkylsulfonylamino group and arylsulfonylamino group include methylsulfonylamino group, N-phenylmethylsulfonylamino group, phenylsulfonylamino group, and 3-carboxyphenylsulfonylamino group.

Examples of the heterocyclic sulfonylamino group include substituted heterocyclic sulfonylamino group. Examples of the heterocyclic ring include those listed with reference to the aforementioned heterocyclic group. The heterocyclic sulfonylamino group is preferably a $C_1$–$C_{12}$ heterocyclic sulfonylamino group. Examples of the substituents on the heterocyclic sulfonylamino group include ionic hydrophilic group. Examples of the heterocyclic sulfonylamino group include 2-chenylsulfonylamino group, and 3-pyridylsulfonylamino group.

Examples of the alkylthio group, arylthio group and heterocyclic thio group include substituted alkylthio group, substituted arylthio group, and substituted heterocyclic thio group. Examples of the heterocyclic ring include those listed with reference to the aforementioned heterocyclic group. The alkylthio group, arylthio group and heterocyclic thio group each preferably have from 1 to 20 carbon atoms. Examples of the substituents on the alkylthio group, arylthio group and heterocyclic thio group include ionic hydrophilic group. Examples of the alkylthio group, arylthio group and heterocyclic thio group include methylthio group, phenylthio group, and 2-pyridyl group.

Examples of the alkylsulfonyl group and arylsulfonyl group include substituted alkylsulfonyl group and substituted arylsulfonyl group. Examples of the alkylsulfonyl group and arylsulfonyl group include methylsulfonyl group, and phenylsulfonyl group.

Examples of the heterocyclic sulfonyl group include substituted heterocyclic sulfonyl group. Examples of the heterocyclic ring include those listed with reference to the aforementioned heterocyclic group. The heterocyclic sulfonyl group is preferably a $C_1$–$C_{20}$ heterocyclic sulfonyl group. Examples of the substituents on the heterocyclic sulfonyl include ionic hydrophilic group. Examples of the heterocyclic sulfonyl group include 2-chenylsulfonyl group, and 3-pyridylsulfonyl group.

Examples of the alkylsulfinyl group and arylsulfinyl group include substituted alkylsulfinyl group, and substituted arylsulfinyl group. Specific examples of the alkylsulfinyl group and arylsulfinyl group include methylsulfinyl group, and phenylsulfinyl group.

Examples of the heterocyclic sulfinyl group include substituted heterocyclic sulfinyl group. Examples of the heterocyclic ring include those listed with reference to the aforementioned heterocyclic group. The heterocyclicsulfinyl group is preferably a $C_1$–$C_{20}$ heterocyclic sulfinyl group. Examples of the substituents on the heterocyclic sulfinyl include ionic hydrophilic group. Examples of the heterocyclic sulfinyl group include 4-pyridylsulfinyl group.

Examples of the sulfamoyl group include substituted sulfamoyl group. Examples of the substituents on the sulfamoyl group include ionic hydrophilic group. Specific examples of the sulfamoyl group include dimethylsulfamoyl group, and di-(2-hydroxyethyl)sulfamoyl group.

A particularly preferred structure of the dye of the general formula (I-a) to be incorporated in the ink set of the invention is represented by the following general formula (2).

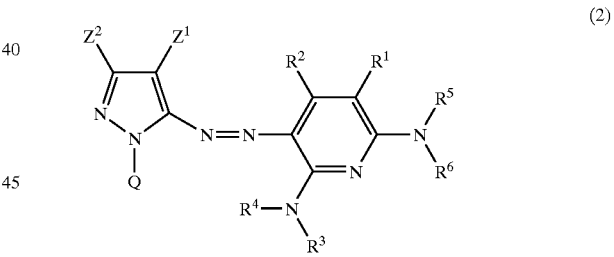

(2)

In the general formula (2), $R^1$, $R^2$, $R^5$ and $R^6$ are as defined in the general formula (I-a).

$R^3$ and $R^4$ each independently represent a hydrogen atom or a substituent such as aliphatic group, aromatic group, heterocyclic group, acyl group, alkoxycarbonyl group, aryloxycarbonyl group, carbamoyl group, alkylsulfonyl group, arylsulfonyl group and sulfamoyl group. Preferred among these substituents are hydrogen atom, aromatic group, heterocyclic group, acyl group, alkylsulfonyl group and arylsulfonyl group. Particularly preferred among these substituents are hydrogen atom, aromatic group and heterocyclic group.

$Z^1$ represents an electron-withdrawing group having a Hammett's substituent constant σp of not smaller than 0.20. $Z^1$ is preferably an electron-withdrawing group having a Hammett's substituent constant σp of not smaller than 0.30, more preferably not smaller than 0.45, particularly not smaller than 0.60. However, the Hammett's substituent constant σp of the electron-withdrawing group is preferably not greater than 1.0. Specific preferred examples of the substituents include electron-withdrawing substituents described later. Preferred among these electron-withdrawing substituents are $C_2$–$C_{20}$ acyl group, $C_2$–$C_{20}$ alkyloxycarbonyl group, nitro group, cyano group, $C_1$–$C_{20}$ alkylsulfonyl group, $C_1$–$C_{20}$ arylsulfonyl group, $C_1$–$C_{20}$ carbamoyl group, and $C_1$–$C_{20}$ halogenated alkyl group. Particularly preferred among these electron-withdrawing substituents are cyano group, $C_1$–$C_{20}$ alkylsulfonyl group, and $C_6$–$C_{20}$ arylsulfonyl group. Cyano group is most desirable.

$Z^2$ represents a hydrogen atom or a substituent such as aliphatic group, aromatic group and heterocyclic group. $Z^2$ is preferably an aliphatic group, more preferably a $C_1$–$C_6$ alkyl group.

Q represents a hydrogen atom or a substituent such as aliphatic group, aromatic group and heterocyclic group. Q is preferably a group formed by a group of non-metallic atoms required to form a 5- to 8-membered ring. The aforementioned 5- to 8-membered ring may be substituted, may be a saturated ring or may have an unsaturated bond. Particularly preferred among these 5- to 8-membered ring are aromatic group and heterocyclic group. Preferred examples of the non-metallic atom include nitrogen atom, oxygen atom, sulfur atom, and carbon atom. Specific examples of these cyclic structures include benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzoxazole ring, thiazole ring, benzothiazole ring, oxane ring, sulfolane ring, and thiane ring.

The hydrogen atoms in the substituents described with reference to the general formula (2) may be substituted. Examples of the substituents on these substituents include substituents listed with reference to the general formula (I-a), and ionic hydrophilic group exemplified with reference to G, $R^1$ and $R^2$.

The Hammett's substituent constant σp as used herein will be further described hereinafter. Hammett's rule is an empirical rule which L. P. Hammett proposed in 1935 to quantitatively discuss the effect of substituents on the reaction or equilibrium of benzene derivatives. The validity of this empirical rule has been widely accepted today. Substituent constants required in Hammett's rule are σp value and σm value. These values are found in many general literatures. For the details of these values, reference can be made to J. A. Dean, "Lange's Handbook of Chemistry", 12th ed., 1979 (Mc Graw-Hill), and "Kagaku no Ryoiki (Region of Chemistry)", extra edition, No. 122, pp. 96–103, 1979 (Nankodo). In the invention, these substituents are defined or described by Hammett's substituent constant σp. However, this doesn't mean that the known values found in the aforementioned literatures are not limited to certain substituents. It goes without saying that even if the values are unknown in literatures, they contain substituents which may fall within the defined range when measured according to Hammett's rule. The compounds of the general formula (2) of the invention contain those which are not benzene derivatives. As a measure for indicating the electron effect of substituents there is used σp value regardless of substitution position. In the invention, σp value is used in this sense.

Examples of the electron-withdrawing group having a Hammett's substituent constant σp of not smaller than 0.60 include cyano group, nitro group, and alkylsulfonyl group (e.g., methylsulfonyl, arylsulfonyl (e.g., phenylsulfonyl group)).

Examples of the electron-withdrawing group having a Hammett's Substituent constant σp of not smaller than 0.45 include acyl group (e.g., acetyl group), alkoxycarbonyl group (e.g., dodecyloxycarbonyl group), aryloxycarbonyl group (e.g., m-chlorophenoxycarbonyl), alkylsulfinyl group (e.g., n-propylsulfinyl), arylsulfinyl group (e.g., phenylsulfinyl), sulfamoyl group (e.g., N-ethylsulfamoyl, N,N-dimethylsulfamoyl), and halogenated alkyl group (e.g., trifluoromethyl), in addition to the aforementioned groups.

Examples of the electron-withdrawing group having a Hammett's substituent constant σp of not smaller than 0.30 include, acyloxy group (e.g., acetoxy group), carbamoyl group (e.g., N-ethylcarbamoyl group, N,N-dibutylcarbamoyl group), halogenated alkoxy group (e.g., trifluoromethyloxy group), halogenated aryloxy group (e.g., pentafluorophenyloxy group), sulfonyloxy group (e.g., methylsulfonyloxy group), halogenated alkylthio group (e.g., difluoromethylthio group), aryl group substituted by two or more electron-withdrawing groups having a σp value of not smaller than 0.15 (e.g., 2,4-dinitrophenyl group, pentafluorophenyl group), and heterocyclic group (e.g., 2-benzooxazolyl group, 2-benzothiazolyl group, 1-phenyl-2-benzoimidazolyl group), in addition to the aforementioned groups.

Specific examples of the electron-withdrawing group having a σp value of not smaller than 0.20 include halogen atom, in addition to the aforementioned groups.

Referring to a particularly preferred combination of azo dyes represented by the general formula (I-a), $R^5$ and $R^6$ each are preferably a hydrogen atom, alkyl group, aryl group, heterocyclic group, sulfonyl group or acyl group, more preferably hydrogen atom, aryl group, heterocyclic group or sulfonyl group, most preferably hydrogen atom, aryl group or heterocyclic group, with the proviso that $R^5$ and $R^6$ are not a hydrogen atom at the same time.

G is preferably a hydrogen atom, halogen atom, alkyl group, hydroxyl group, amino group or acylamino group, more preferably hydrogen atom, halogen atom, amino group or acylamino group, most preferably hydrogen atom, amino group or acylamino group.

A is preferably a pyrazole ring, imidazole ring, isothiazole ring, thiadiazole ring or benzothiazole ring, more preferably pyrazole ring or isothiazole ring, most preferably pyrazole ring.

Referring to a preferred combination of $B^1$ and $B^2$, $B^1$ and $B^2$ are =CR$^1$— and —CR$^2$=, respectively, in which $R^1$ and $R^2$ each are preferably a hydrogen atom, alkyl group, halogen atom, cyano group, carbamoyl group, carboxyl group, hydroxyl group, alkoxy group or alkoxycarbonyl group, more preferably hydrogen atom, alkyl group, carboxyl group, cyano group or carbamoyl group.

Referring to a preferred combination of substituents on the compound represented by the general formula (I-a), at least one of the various substituents is preferably a compound which is a preferred group as mentioned above. More preferably, more of the various substituents are compounds which are preferred groups as mentioned above. Most preferably, all the various substituents are compounds which are preferred groups as mentioned above.

Specific examples of the azo dye represented by the general formula (I-a) will be given below, but the azo dye to be used herein is not limited thereto.

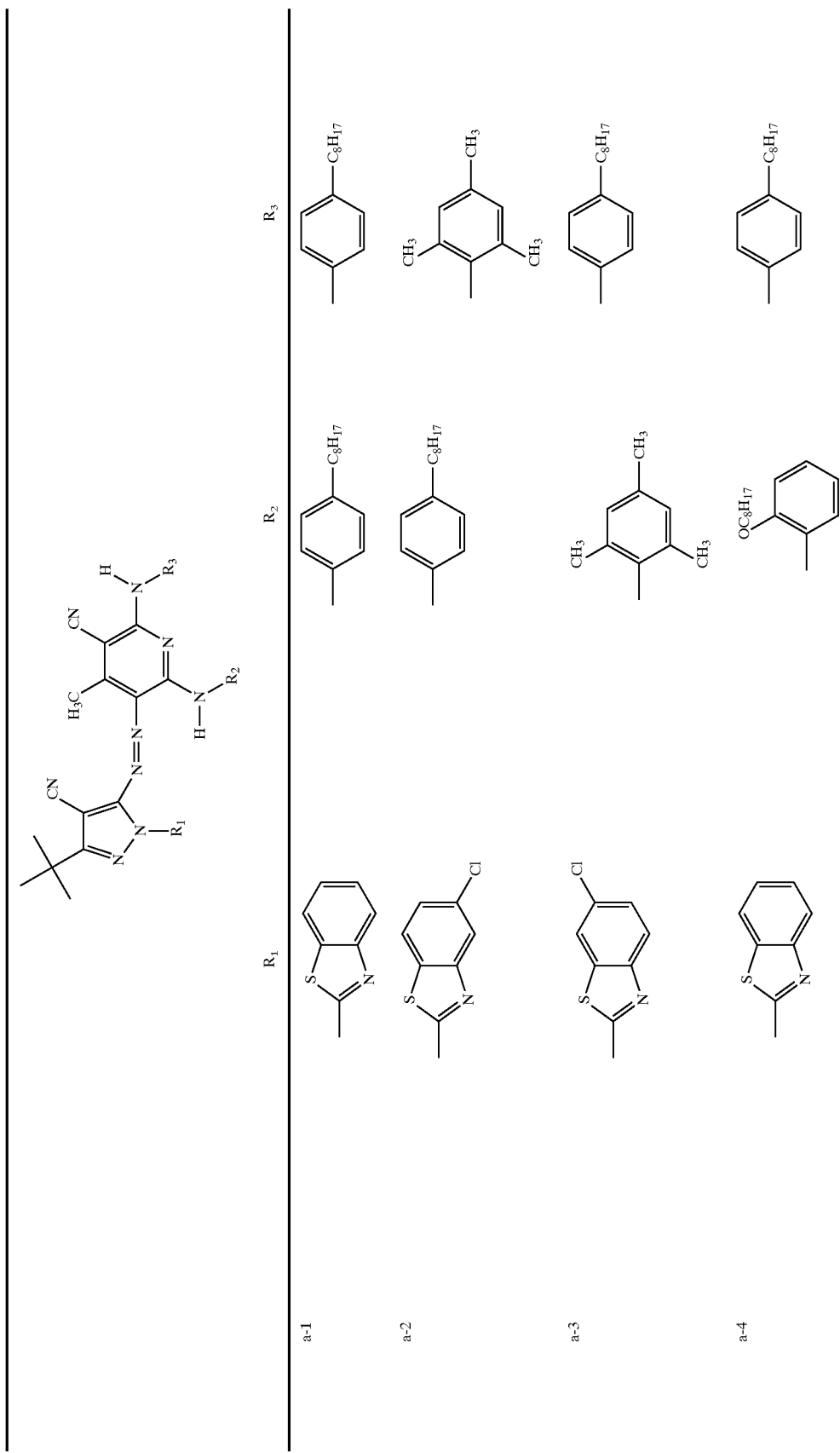

-continued
| | | | |
|---|---|---|---|
| a-5 |  | 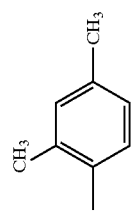 | 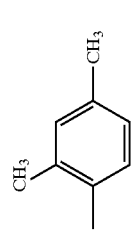 |
| a-6 | 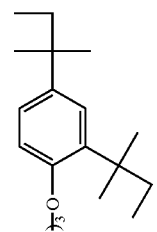 | 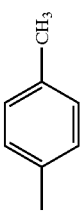 | 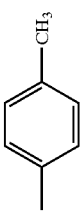 |
| a-7 | 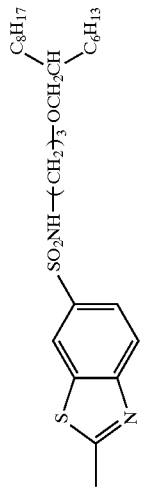 | 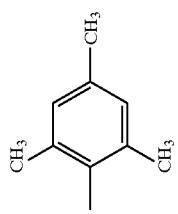 | 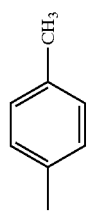 |
| a-8 | 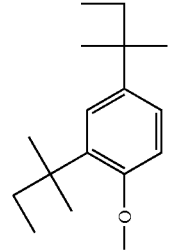 | 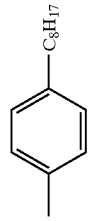 | 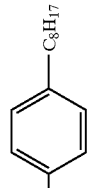 |
| a-9 | 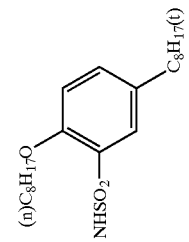 | 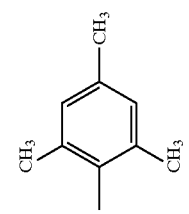 |  |
| a-10 | 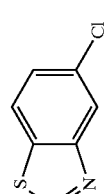 | 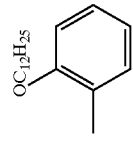 | 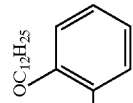 |

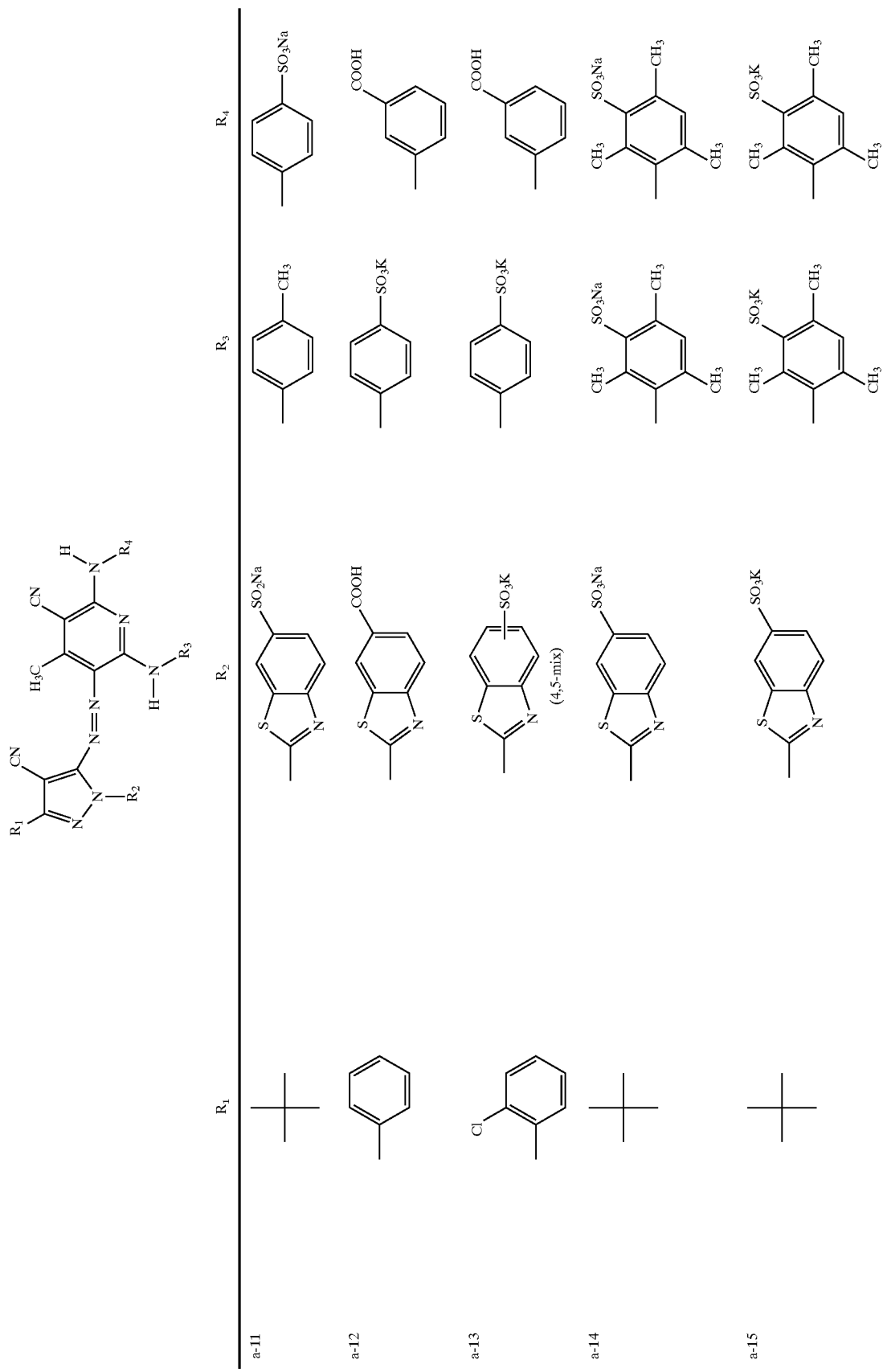

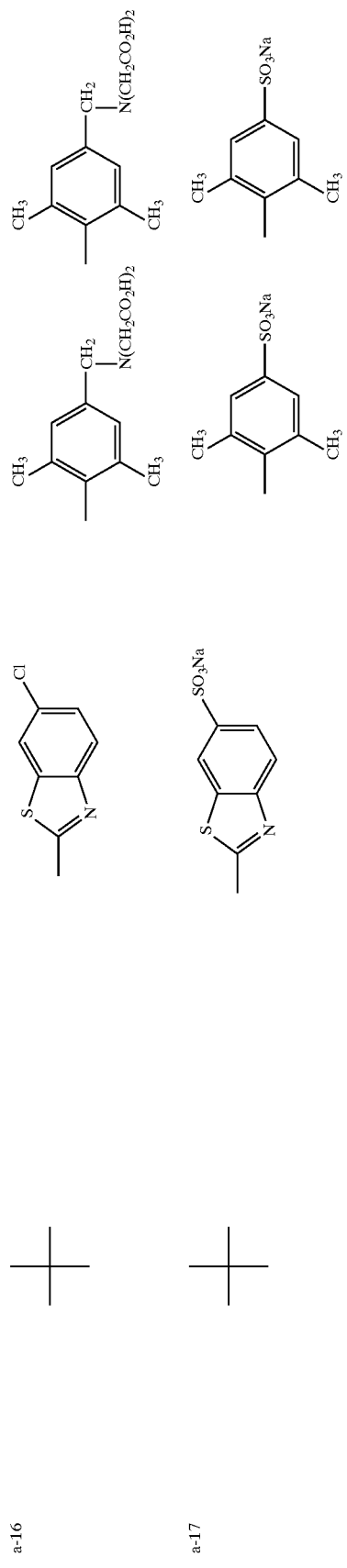
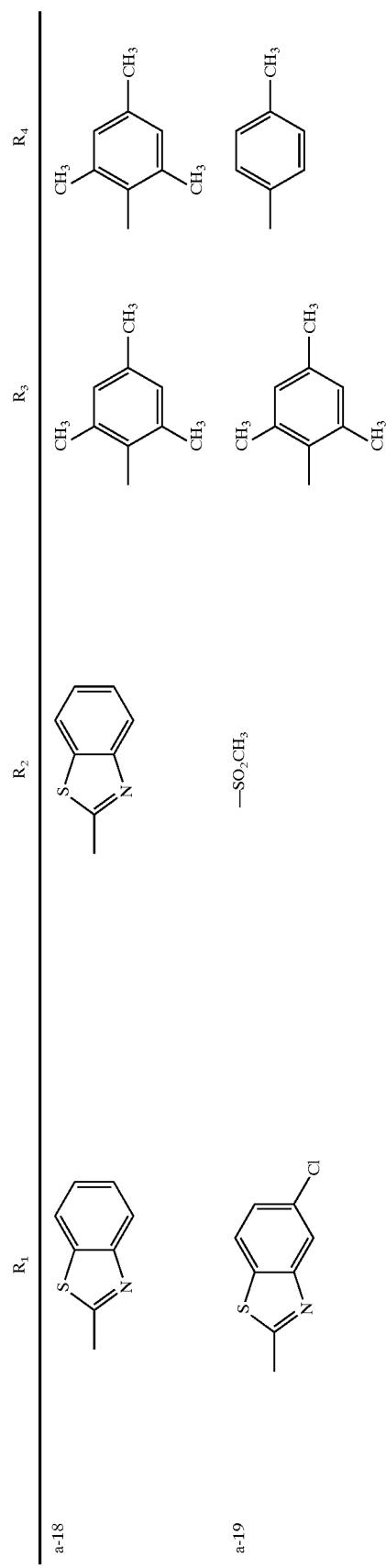

| | -continued | | |
|---|---|---|---|
| a-20 | —COCH₃ | C₈H₁₇(t) | C₈H₁₇(t) |
| a-21 | —SO₂CH₃ | C₈H₁₇(t) | C₈H₁₇(t) |
| a-22 | H | 2,4-dimethylphenyl | 2,4,6-trimethylphenyl |
| a-23 | H | o-tolyl | o-tolyl |
| a-24 | H | 2,6-dimethylphenyl | 2,6-dimethylphenyl |
| a-25 | 2-benzoxazolyl | 2,4,6-trimethylphenyl | 2,4,6-trimethylphenyl |

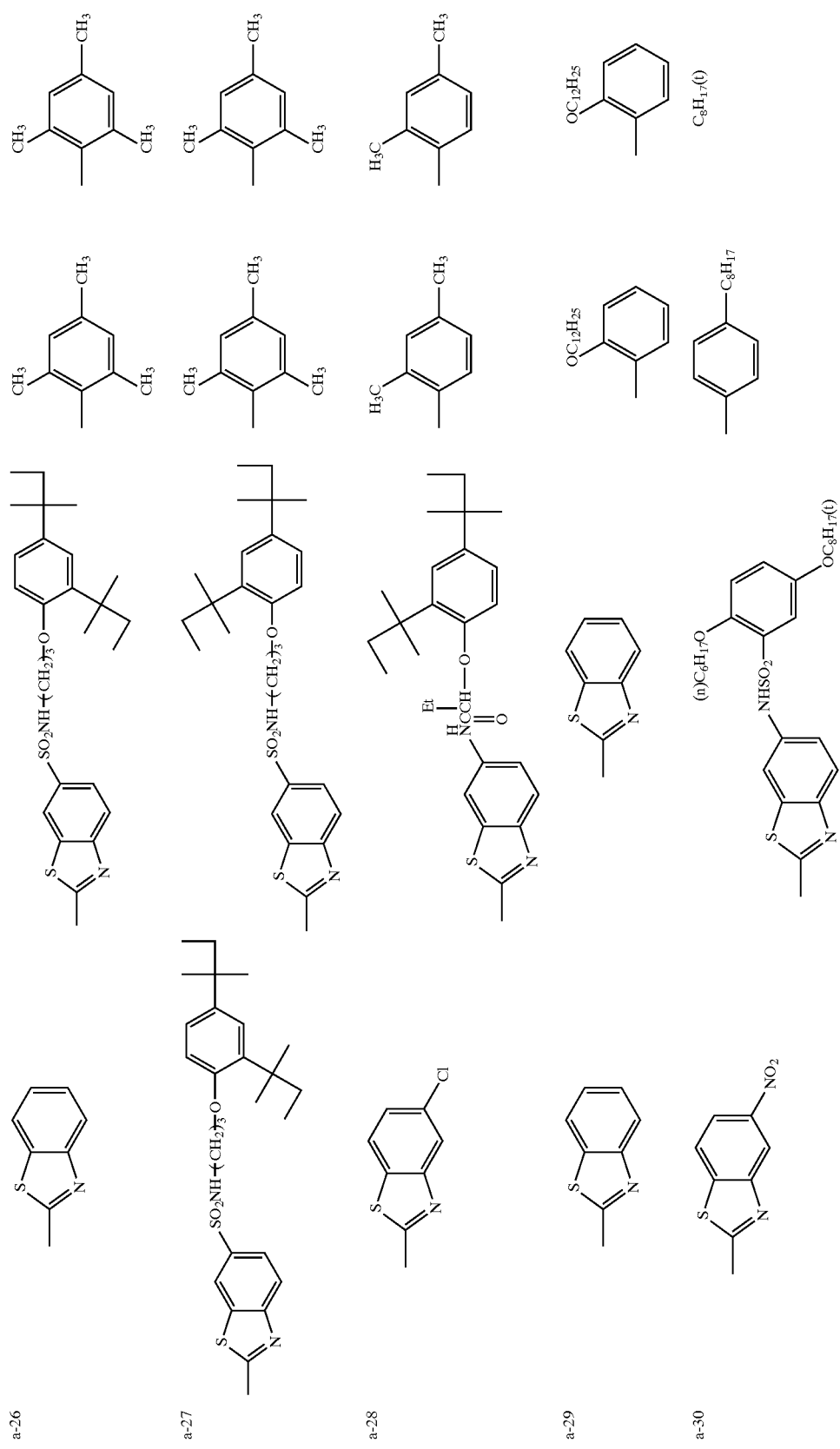

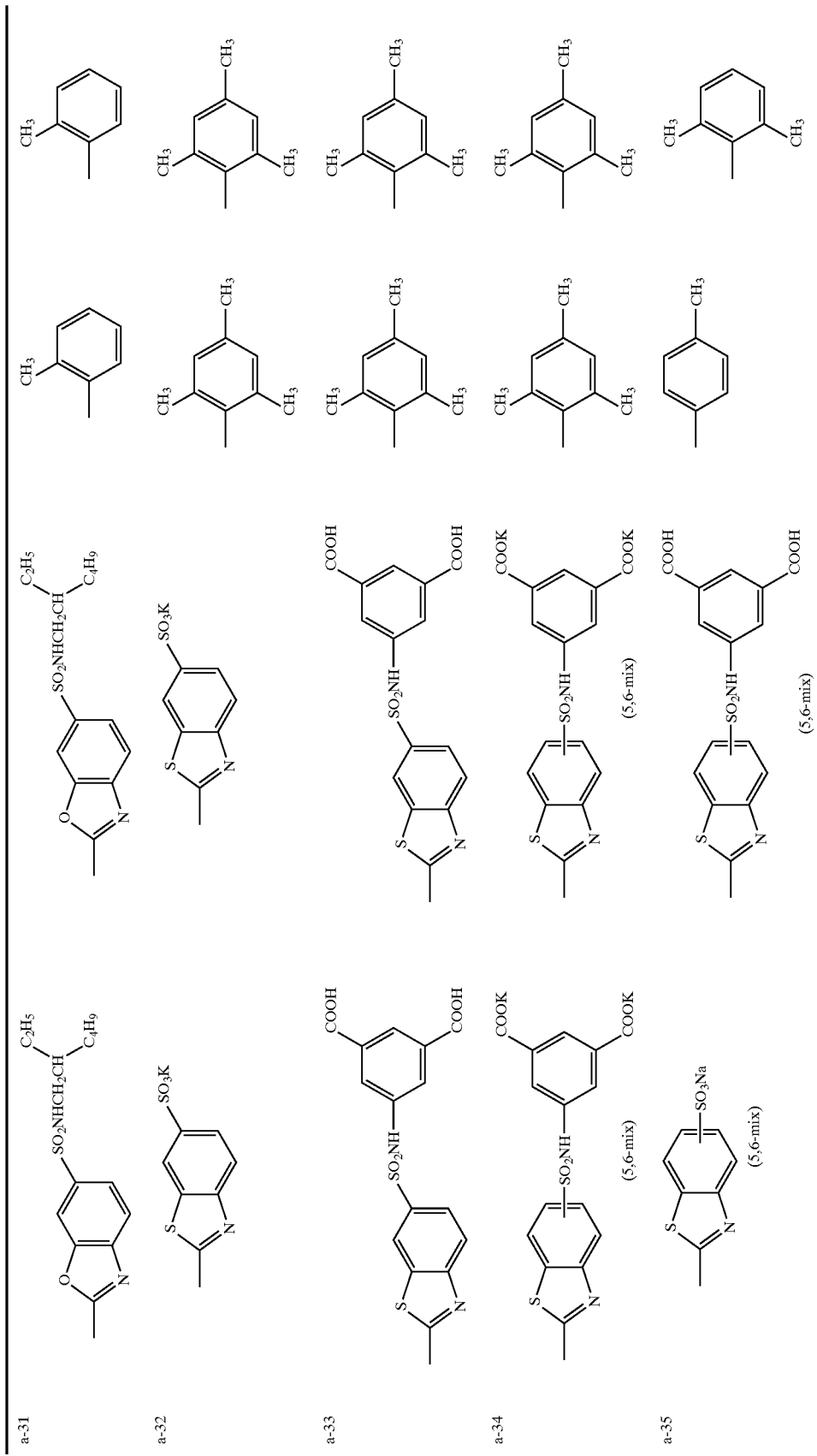

-continued

| | $R_1$ | $R_2$ | $R_3$ | $R_4$ | $R_5$ | $R_6$ | $R_7$ | $R_8$ |
|---|---|---|---|---|---|---|---|---|
| a-41 | o-tolyl | CN | 2-methylpyridyl | H | CONH$_2$ | SO$_2$CH$_3$ | o-OC$_8$H$_{17}$-tolyl | o-tolyl |
| a-42 | t-Bu | Br | 2-methylpyridyl | COOEt | H | 2-methylbenzothiazolyl | C$_8$H$_{17}$(t) | COCH$_3$ |
| a-43 | 2-methylpyridyl | SO$_2$CH$_3$ | 4,6-bis(NHCH$_3$)-triazinyl | CONH$_2$ | H | 6-chloro-2-methylbenzothiazolyl | p-tolyl | t-Bu-CO |
| a-44 | t-Bu | CN | 2,5-dicyano-4-methylphenyl | H | H | 6-chloro-2-methylbenzothiazolyl | o-tolyl | SO$_2$CH$_3$ |

-continued

| | | | | | | |
|---|---|---|---|---|---|---|
| a-45 | ![t-Bu] | Br | H | CONH₂ | CCH₃=O | ![p-C₈H₁₇-phenyl] |
| | | | | | ![3,5-diCl-4-Me-phenyl with NO₂] | ![2,4,6-trimethylphenyl with CH₃ top, CH₃ CH₃ bottom] |
| | | | | | ![3,5-diEt-4-Me-phenyl] | ![3,5-diEt-4-Me-phenyl] |
| a-46 | ![t-Bu] | CN | CH₃ | H | ![2-methylbenzothiazole] | ![2-methylbenzothiazole] |

General structure:

Pyridine with substituents R₃, R₂ on ring; R₄–N– and R₅–N at 6-position, R₆–N–H at 2-position; linked via N=N azo to an isothiazole bearing CN and R₁.

| | R₁ | R₂ | R₃ | R₄ | R₅ | R₆ |
|---|---|---|---|---|---|---|
| b-1 | CH₃ | CH₃ | CN | H | ![p-C₈H₁₇-phenyl] | ![p-C₈H₁₇-phenyl] |
| | | | | | ![2,4,6-trimethylphenyl] | ![2,4,6-trimethylphenyl] |
| b-2 | CH₃ | CH₃ | CN | H | | |

-continued

| | | | | | | |
|---|---|---|---|---|---|---|
| b-3 | CH$_3$ | CH$_3$ | CONH$_2$ | H | ![C$_8$H$_{17}$-phenyl] | ![2,4,6-trimethylphenyl] |
| b-4 | CH$_3$ | CH$_3$ | H | H | 2,4,6-trimethyl-3-SO$_3$Li-phenyl | 2,4,6-trimethyl-3-SO$_3$Li-phenyl |
| b-5 | CH$_3$ | H | CN | H | 4-SO$_3$Na-phenyl (p-tolyl-SO$_3$Na) | 4-SO$_3$Na-phenyl |
| b-6 | CH$_3$ | CH$_3$ | H | 2-benzothiazolyl | 2,4,6-trimethyl-3-CH$_2$N(CH$_2$CO$_2$K)$_2$-phenyl | 2,4,6-trimethyl-3-CH$_2$N(CH$_2$CO$_2$K)$_2$-phenyl |
| b-7 | CH$_3$ | CH$_3$ | H | 2-benzothiazolyl | 3,5-dimethyl-4-CH$_3$-phenyl | 4-C$_8$H$_{17}$-phenyl |
| b-8 | CH$_3$ | H | H | SO$_2$CH$_3$ | 3,4-dimethyl-SO$_3$Na-phenyl | 3,4-dimethyl-SO$_3$Na-phenyl |

-continued
| | $R_1$ | $R_2$ | $R_3$ | $R_4$ | $R_5$ | $R_6$ |
|---|---|---|---|---|---|---|
| c-1 | —SCH$_3$ | CH$_3$ | CN | H |  | 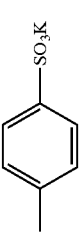 |
| c-2 |  | H | CONH$_2$ | H |  | 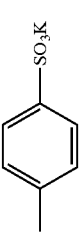 |
| c-3 |  | CH$_3$ | H |  | 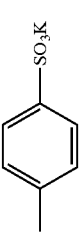 |  |
| c-4 | —CH$_3$ | CH$_3$ | H |  | 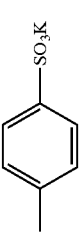 |  |
| c-5 |  | H | H | | | C$_8$H$_{17}$(t) |

-continued
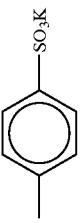
| | $R_1$ | $R_2$ | $R_3$ | $R_4$ | $R_5$ | $R_6$ |
|---|---|---|---|---|---|---|
| d-1 | Me | $CH_3$ | CN | H | 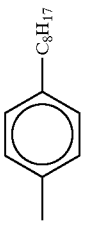 | 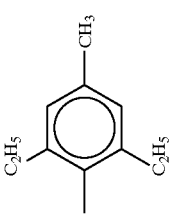 |
| d-2 | Me | $CH_3$ | CN | H | 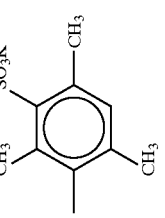 | 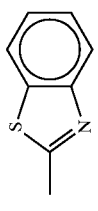 |
| d-3 | Me | H | H |  | 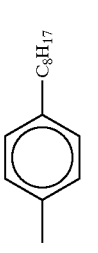 | 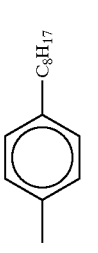 |
| d-4 | Ph | $CH_3$ | $CONH_2$ | H | | |

-continued

| | | | |
|---|---|---|---|
| d-5 | Ph | CH₃ | H | [structure: benzothiazole-SO₂NH-(CH₂)₃-O-2,4-di-tert-pentylphenyl] | [structure: 4-n-butoxyphenyl] | [structure: 2,5-diethyl-4-methylphenyl] |

[Structure of compound class e: benzothiazole connected via N=N to a pyridine bearing R², R³, R⁴, R⁵, R⁶ substituents; benzothiazole numbered 4,5,6,7 with R¹]

| | $R_1$ | $R_2$ | $R_3$ | $R_4$ | $R_5$ | $R_6$ |
|---|---|---|---|---|---|---|
| e-1 | 5-Cl | CH₃ | CONH₂ | H | 4-t-octylphenyl | 4-t-octylphenyl |
| e-2 | 5,6-diCl | H | H | 2-methylbenzothiazol-2-yl | 2,4,6-trimethylphenyl | COCH₃ |
| e-3 | 5,6-diCl | CH₃ | H | 2-methylbenzothiazol-2-yl | | |
| e-4 | 5-CH₃ | H | CN | H | 4-SO₃K-phenyl | 4-SO₃K-phenyl |

| e-5 | 5-NO₂ | CH₃ | H | SO₂CH₃ | 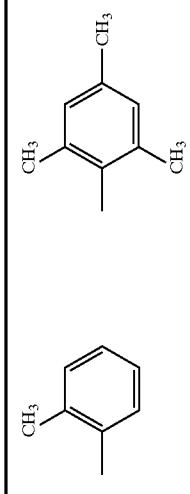 |
| f-1 | 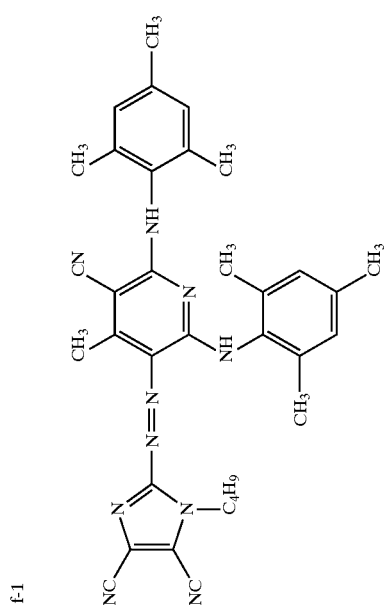 |
| f-2 | 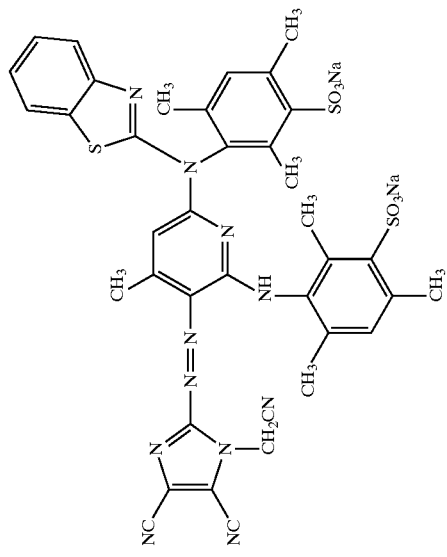 |

In the ink set for ink jet recording of the invention, the dark yellow ink is an ink that contributes to the gradation of the portion mainly ranging from gray (neutral color) to yellow on the image and the adjustment of color balance. This ink contains a yellow dye as a main dye (or pigment) as well as a magenta dye (or pigment) or cyan dye (or pigment) to contribute to the representation of color tone and gradation and the adjustment of shadow, making it possible to improve the quality of the image printed. In the ink set for ink jet recording of the invention, the dark yellow ink contains at least one of the aforementioned azo dyes. The dark yellow ink contains a yellow dye as a main dye among the constituent dyes in a concentration (total concentration in the case where there are a plurality of yellow dyes) of 0.1 to 10% by weight, preferably from 0.5 to 6% by weight. On the other hand, the concentration of the magenta dye of the general formula (I-a) of the invention in the dark yellow ink is from 1/20 to 1/2, preferably from 1/10 to 3/7 of that of the yellow dye (or pigment). Accordingly, the spectral absorption of the ink in the green range is substantially from 1/20 to 1/2, preferably from 1/10 to 3/7 of that of the absorption peak in the blue range. The dark yellow ink may comprise two or more dyes of the general formula (I-a) of the invention incorporated in admixture therein as a magenta component. The dark yellow ink may also comprise a dye of the general formula (I-a) of the invention and other known magenta dyes (or pigments) incorporated in admixture therein. Anyway, the incorporation of a dye of the invention (I-a) in the dark yellow ink makes it possible to give an excellent image quality and eliminate the discoloration of image and inhibit the change of color balance and gradation in various storage atmospheres having different light, heat and oxidizing conditions.

In the ink set for ink jet recording of the invention, the magenta ink, too, preferably contains at least one of the azo dyes of the general formula (I-a). The content of the azo dyes, if any, in the magenta ink is from 0.2% to 20% by weight, preferably from 0.5% to 15% by weight.

The ink set is preferably formed by a magenta ink in combination with a light magenta ink. In the case where the magenta ink is used in combination with a light magenta ink, it is preferred that the magenta ink contain the azo dyes in an amount of from 0.2% to 20% by weight while the light magenta ink contain the azo dyes in an amount of from 1/20 to 1/2, preferably from 1/10 to 3/7 of that in the magenta ink. Accordingly, the absorbance of the dye in the green spectral range is substantially from 1/20 to 1/2, preferably from 1/10 to 3/7 of that of the magenta ink. The magenta ink constituting the ink set may comprise two or more of the dyes of the general formula (I-a) of the invention incorporated in admixture therein. The magenta ink may also comprise a dye of the general formula (I-a) of the invention and other known magenta dyes (or pigments) incorporated in admixture therein. Anyway, the incorporation of a dye of the invention (I-a) in the magenta ink makes it possible to give an excellent image quality and inhibit the change of magenta color tone and gradation during the storage in various storage atmospheres having different light, heat and oxidizing conditions.

The phthalocyanine dye represented by the general formula (I-b) which is used in the dark yellow ink to be incorporated in the ink set for ink jet recording of the invention to satisfy the requirements for image fastness of the invention. A phthalocyanine dye is generally known as a fast dye. A phthalocyanine dye is also known to have a poor fastness to ozone gas when used as a recording dye for ink jet recording.

The phthalocyanine dye to be used in the invention preferably comprises an electron-withdrawing group incorporated in its phthalocyanine skeleton to have an oxidation potential of higher than 1.0 V (vs SCE) in order to deteriorate the reactivity with ozone as an electrophilic agent. The oxidation potential of the phthalocyanine dye is preferably higher, more preferably higher than 1.1 V (vs SCE), most preferably higher than 1.2 V (vs SCE).

The oxidation potential value (Eox) can be easily measured by those skilled in the art. For the details of the method for measuring the oxidation potential, reference can be made to P. Delahay, "New Instrumental Methods in Electrochemistry", Interscicence Publishers, 1954, A. J. Bard, "Electrochemical Methods", John Wiley & Sons, 1980, and Akiya Fujishima, "Denki Kagaku Sokuteiho (Electrochemical Measuring Method)", Gihodo Shuppansha, 1984.

In some detail, the measurement of oxidation potential is carried out by dissolving the test specimen in a solvent containing a supporting electrolyte such as sodium perchlorate and tetrapropylammonium perchlorate in a concentration of from $1 \times 10^{-4}$ to $1 \times 10^{-6}$ mol/l, and then measuring the test solution for oxidation potential with respect to SCE (saturated calomel electrode) using cyclic voltammetry or DC polarography. This value may deviate by scores of millivolts due to the effect of difference in potential between solutions or resistivity of test solution. However, the incorporation of a standard specimen (e.g., hydroquinone) makes it possible to assure the reproducibility of potential.

In order to unequivocally define potential, the potential (vs SCM) measured in dimethylformamide containing 0.1 mol $dm^{-3}$ of tetrapropylammonium perchlorate as a supporting electrolyte (concentration of dye: 0.001 mol $dm^{-3}$) using DC polarography is defined as oxidation potential of dye.

The value of Eox (oxidation potential) indicates the transferability of electrons from the specimen to the electrode. The greater this value is (the higher the oxidation potential is), the more difficultly can be transferred electrons from the specimen to the electrode, i.e., the more difficultly can be oxidized the specimen. With regard to the structure of the compound, the incorporation of electron-withdrawing group causes the oxidation potential to be higher while the incorporation of electron-donative group causes the oxidation potential to be lower. In the invention, in order to deteriorate the reactivity with ozone, which is an electron-withdrawing agent, it is preferred that an electron-withdrawing group be incorporated in the phthalocyanine skeleton to cause the oxidation potential to be higher. The use of Hammett's substituent constant σp, which is a measure of the electron withdrawing properties or electron providing properties of substituents, makes it possible to tell that the incorporation of substituents having a great σp value such as sulfinyl group, sulfonyl group and sulfamoyl group makes it possible to cause the oxidation potential to be higher.

Also for the reason that the potential is adjusted, a phthalocyanine dye represented by the general formula (I-b) is preferably used.

The compound of the general formula (I-b) to be used in the invention will be further described hereinafter.

In the general formula (I-b), $X_1$, $X_2$, $X_3$ and $X_4$ each independently represent —SO-Z, —$SO_2$-Z, —$SO_2NR_1R_2$, sulfo group, —$CONR_1R_2$ or —$CO_2R_1$. Preferred among these substituents are —SO-Z, —$SO_2$-Z, —$SO_2NR_1R_2$ and —$CONR_1R_2$. Particularly preferred among these substituents are —$SO_2$-Z and —$SO_2NR_1R_2$. Most desirable among these substituents is —$SO_2$-Z. In the case where any of $a_1$ to $a_4$ and $b_1$ to $b_4$, which represent the number of substituents on $X_1$ to $X_4$ and $Y_1$ to $Y_4$, represents a number of not smaller than 2, the plurality of $X_1$'s to $X_4$'s may be the same or different and each independently represent any of the aforementioned groups. Alternatively, $X_1$, $X_2$, $X_3$ and $X_4$ may be the same substituent. Alternatively, $X_1$, $X_2$, $X_3$ and $X_4$ each may be —$SO_2$-Z in which Z differs among $X_1$, $X_2$, $X_3$ and $X_4$. Thus, $X_1$, $X_2$, $X_3$ and $X_4$ each may be a substituent of the same kind but partially different. Alternatively, $X_1$, $X_2$, $X_3$ and $X_4$ may be different substituents, e.g., —$SO_2$-Z, —$SO_2NR_1R_2$.

Z each independently represents a substituted or unsubstituted alkyl group, substituted or unsubstituted cycloalkyl group, substituted or unsubstituted alkenyl group, substituted or unsubstituted aralkyl group, substituted or unsubstituted aryl group and substituted or unsubstituted heterocyclic group. Preferred among these groups are substituted or unsubstituted alkyl group, substituted or unsubstituted aryl group and substituted or unsubstituted heterocyclic group. Particularly preferred among these groups are substituted alkyl group, substituted aryl group and substituted heterocyclic group.

$R_1$ and $R_2$ each independently represent a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group. Preferred among these groups are hydrogen atom, substituted or unsubstituted alkyl group, substituted or unsubstituted aryl group or substituted or unsubstituted heterocyclic group. Particularly preferred among these groups are hydrogen atom, substituted alkyl group, substituted aryl group or substituted heterocyclic group. However, it is not preferred that $R_1$ and $R_2$ are a hydrogen atom at the same time.

The substituted or unsubstituted alkyl group represented by $R_1$, $R_2$ or Z is preferably a $C_1$–$C_{30}$ alkyl group. Particularly from the reason of enhancement of dye solubility or ink stability, the alkyl group is preferably branched. It is particularly preferred that the alkyl group have a symmetric carbons (used in racemate form). Examples of the substituents on the alkyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the alkyl group may have a halogen atom or ionic hydrophilic group. The number of carbon atoms in the alkyl group doesn't include that of carbon atoms in the substituents. This can apply to other groups.

The substituted or unsubstituted cycloalkyl group represented by $R_1$, $R_2$ or Z is preferably a $C_5$-$C_{30}$ cycloalkyl group. Particularly from the reason of enhancement of dye solubility or ink stability, it is particularly preferred that the cycloalkyl group have a symmetric carbons (used in racemate form). Examples of the substituents on the cycloalkyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the cycloalkyl group may have a halogen atom or ionic hydrophilic group.

The substituted or unsubstituted alkenyl group represented by $R_1$, $R_2$ or Z is preferably a $C_2$–$C_{30}$ alkenyl group. Particularly from the reason of enhancement of dye solubility or ink stability, the alkenyl group is preferably branched. It is particularly preferred that the alkenyl group have asymmetric carbons (used in racemate form). Examples of the substituents on the alkenyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the alkenyl group may have a halogen atom or ionic hydrophilic group.

The substituted or unsubstituted aralkyl group represented by $R_1$, $R_2$ or Z is preferably a $C_7$–$C_{30}$ aralkyl group. Particularly from the reason of enhancement of dye solubility or ink stability, the aralkyl group is preferably branched. It is particularly preferred that the aralkyl group have asymmetric carbons (used in racemate form). Examples of the substituents on the aralkyl group include those listed with reference to the case where Z, $R_1$, $R_2$, $Y_2$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the aralkyl group may have a halogen atom or ionic hydrophilic group.

The substituted or unsubstituted aryl group represented by $R_1$, $R_2$ or Z is preferably a $C_6$–$C_{30}$ aryl group. Examples of the substituents on the aryl group include those listed with reference to the case where Z, $R_1$, $R_2$, $Y_1$, $Y_2$, $Y_3$ and $Y_4$ are able to have further substituents as described later. In particular, en electron-withdrawing group is preferred because it causes the oxidation potential of the dye to be higher and thus enhances the fastness thereof. Examples of the electron-withdrawing group include those having a positive Hammett's substituent constant σp. Preferred examples of the electron-withdrawing group include halogen atom, heterocyclic group, cyano group, carboxyl group, acylamino group, sulfonamide group, sulfamoyl group, carbamoyl group, sulfonyl group, imide group, acyl group, sulfo group, and quaternary ammonium group. Particularly preferred among these electron-withdrawing groups are cyano group, carboxyl group, sulfamoyl group, carbamoyl group, sulfonyl group, imide group, acyl group, sulfo group, and quaternary ammonium group.

The heterocyclic group represented by $R_1$, $R_2$ or Z is preferably a 5- or 6-membered heterocyclic group which may be further condensed. The heterocyclic group may be an aromatic heterocyclic group or non-aromatic heterocyclic group. The heterocyclic group represented by $R_1$, $R_2$ or Z will be exemplified in the form of heterocyclic ring with its substitution position omitted. However, the substitution position is not limited. For example, pyridine may have substituents on the 2-, 3-or 4-position. Examples of the heterocyclic ring include pyridine, pyrazine, pyrimidine, pyridazine, triazine, quinoline, isoquinoline, quinazoline, cinnoline, phthaladine, quinoxaline, pyrrole, indole, furane, benzofurane, thiophene, benzothiophene, pyrazole, imidazole, benzimidazole, triazole, oxazole, benzoxaole, thiazole, benzothiazole, isothiazole, benzisothiazole, thiadiazole, isooxazole, benzisooxazole, pyrrolidine, piperidine, piperazine, imidazolidine, andthiazoline, Inparticular, aromaticheterocyclic groups are preferred. Preferred examples of the aromatic heterocyclic groups include pyridine, pyrazine, pyrimidine, pyridazine, triazine, pyrazole, imidazole, benzimidazole, triazole, thiazole, benzothiazole, isothiazole, benzisothiazole, and thiadiazole. These aromatic heterocyclic groups may have substituents. Examples of the substituents on the aromatic heterocyclic group include those listed with reference to the case where Z, $R_1$, $R_2$, $Y_1$, $Y_2$, $Y_3$ and $Y_4$ are able to have further substituents as described later. Preferred examples of the substituents include those listed with reference to the aforementioned aryl group. Even more desirable examples of the substituents include those listed with reference to the aforementioned aryl group.

$Y_1$, $Y_2$, $Y_3$ and $Y_4$ each independently represent a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, acylamino group, arylamino group, ureide group, sulfamoyl group, alkylthio group, arylthio group, alkoxycarbonylamino group, sulfonamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group or sulfo group which may further have substituents.

Preferred among these groups are hydrogen atom, halogen atom, alkyl group, aryl group, cyano group, alkoxy group, amide group, ureide group, sulfonamide group, carbamoyl group, sulfamoyl group, alkoxycarbonyl group, carboxyl group and sulfo group. Particularly preferred among these groups are hydrogen atom, halogen atom, cyano group, carboxyl group and sulfo group. Most desirable among these groups is hydrogen atom.

In the case where Z, $R_1$, $R_2$, $Y_1$, $Y_2$, $Y_3$ and $Y_4$ may further have substituents, they may further have the following substituents.

Examples of the substituents on Z, $R_1$, $R_2$, $Y_1$, $Y_2$, $Y_3$ and $Y_4$ include $C_1$–$C_{12}$ straight-chain or branched alkyl group, $C_7$–$C_{18}$ straight-chain or branched aralkyl group, $C_2$–$C_{12}$ straight-chain or branched alkenyl group, $C_2$–$C_{12}$ straight-chain or branched alkinyl group, $C_3$–$C_{12}$ straight-chain or branched cycloalkyl group, $C_3$–$C_{12}$ straight-chain or branched cycloalkenyl group (These groups each preferably have branches for the reason of dye solubility or ink stability. It is particularly preferred that these groups have asymmetric carbons. Specific examples of these groups include methyl group, ethyl group, propyl group, isopropyl group, sec-butyl group, t-butyl group, 2-ethylhexyl group, 2-methylsulfonylethyl group, 3-phenoxypropyl group, trifluoromethyl group, and cyclopentyl group), halogen atom (e.g., chlorine atom, bromine atom), aryl group (e.g., phenyl group, 4-t-butylphenyl group, 2,4-di-t-amylphenyl group), heterocyclic group (e.g., imidazolyl group, pyrazolyl group, triazolyl group, 2-furyl group, 2-chenyl group, 2-pyrimidinyl group, 2-benzothiazolyl group), cyano group, hydroxyl group, nitro group, carboxy group, amino group, alkyloxy group (e.g., methoxy group, ethoxy group, 2-methoxyethoxy group, 2-methanesulfohykethoxy group), aryloxy group (e.g., phenoxy group, 2-methylphenoxy group, 4-t-butylphenoxy group, 3-nitrophenoxy group, 3-t-butyloxycarbamoylphenoxy group, 3-methoxycarbamoyl group), acylamino group (e.g., acetamide group, benzamide group, 4-(3-t-butyl-4-hydroxyphenoxy)butanamide group), alkylamino group (e.g., methylamino group, butylamino group, diethylamino group, methylbutylamino group), anilino group (e.g., phenylamino group, 2-chloroanilino group), ureide group (e.g., phenylureide group, methylureide group, N,N-dibutylureide group), sulfamoylamino group (e.g., N,N-dipropylsulfamoylamino group), alkylthio group (e.g., methylthio group, octylthio group, 2-phenoxyethylthio group), arylthio group (e.g., phenylthio group, 2-butoxy-5-t-octylphenylthio group, 2-carboxyphenylthio group), alkyloxycarbonylamino group (e.g., methoxycarbonylamino group), sulfonamide group (e.g., methanesulfonamide group, benzenesulfonamide group, p-toluenesulfonamide group), carbamoyl group (e.g., N-ethylcarbamoyl group, N,N-dibutylcarbamoyl group), sulfamoyl group (e.g., N-ethylsulfamoyl group, N,N-dipropylsulfamoyl group, N-phenylsulfamoyl group), sulfonyl group (e.g., methanesulfonyl group, octanesulfonyl group, benzenesulfonyl group, toluenesulfonyl group), alkyloxycarbonyl group (e.g., methoxycarbonyl group, butyloxycarbonyl group), heterocyclic oxy group (e.g., 1-phenyltetrazole-5-oxy group, 2-tetrahydropyranyloxy group), azo group (e.g., phenylazo group, 4-methoxyphenylazo group, 4-pivaloylaminophenylazo group, 2-hydroxy-4-propanoylphenylazo group), acyloxy group (e.g., acetoxy group), carbamoyloxy group (e.g., N-methylcarbamoyloxy group, N-phenylcarbamoyloxy group), silyloxy group (e.g., trimethylsilyloxy group, dibutylmethylsilyloxy group), aryloxycarbonylamino group (e.g., phenoxycarbonylamino group), imide group (e.g., N-succinimide group, N-phthalimide group), heterocyclic thio group (e.g., 2-benzothiazolylthio group, 2,4-di-phenoxy-1,3,5-triazole-6-thio group, 2-pyridylthio group), sulfinyl group (e.g., 3-phenoxypropylsulfinyl group), phosphonyl group (e.g., phenoxyphosphonyl group, octyloxyphosphonyl group, phenylphosphonyl group), aryloxycarbonyl group (e.g., phenoxycarbonyl group), acyl group (e.g., acetyl group, 3-phenylpropanoyl group, benzoyl group), and ionic hydrophilic group (e.g., carboxyl group, sulfo group, phosphono group, quaternary ammonium group).

The phthalocyanine dye represented by the general formula (I-b), if it is water-soluble, preferably has an ionic hydrophilic group. Examples of the ionic hydrophilic group include sulfo group, carboxyl group, phosphono group, and quaternary ammonium group. Preferred among these ionic hydrophilic groups are carboxyl group, phosphono group, and sulfo group. Particularly preferred among these ionic hydrophilic groups are carboxyl group and sulfo group. The carboxyl group, phosphono group and sulfo group may be used in the form of salt. Examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion). Preferred among these counter ions are alkaline metal ions. Particularly preferred among these counter ions is lithium ion because it enhances the dye solubility and hence the ink stability.

The number of ionic hydrophilic groups is preferably at least 2 per molecule of phthalocyanine-based dye. It is particularly preferred that there be contained at least two sulfo groups and/or carboxyl groups in the phthalocyanine-based dye.

The suffixes $a_1$ to $a_4$ and $b_1$ to $b_4$ represent the number of the substituents $X_1$ to $X_4$ and $Y_1$ to $Y_4$, respectively. The suffixes $a_1$ to $a_4$ each independently represent an integer of from 0 to 4, with the proviso that the suffixes $a_1$ to $a_4$ are not 0 at the same time. The suffixes $b_1$ to $b_4$ each independently represent an integer of from 0 to 4. When any of $a_1$ to $a_4$ and $b_1$ to $b_4$ is an integer of not smaller than 2, there are a plurality of any of $X_1$'s to $X_4$'s and $Y_1$'s to $Y_4$'s. They may be the same or different.

The suffixes $a_1$ and $b_1$ satisfy the equation $a_1+b_1=4$. In a particularly preferred combination, $a_1$ represents 1 or 2 while $b_1$ represents 3 or 2. In the best combination, $a_1$ represents 1 while $b_1$ represents 3.

The combinations $a_2$ and $b_2$, $a_3$ and $b_3$, and $a_4$ and $b_4$ are similar to the combination of $a_1$ and $b_1$. Preferred examples of the combinations $a_2$ and $b_2$, $a_3$ and $b_3$, and $a_4$ and $b_4$ are also similar to that of the combination of $a_1$ and $b_1$.

M represents a hydrogen atom, metal element or oxide, hydroxide or halide thereof.

Preferred examples of M other than hydrogen atom include metal elements such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. Preferred examples of metal oxide include VO, and GeO. Preferred examples of metal hydroxide include $Si(OH)_2$, $Cr(OH)_2$, and $Sn(OH)_2$. Examples of metal halide include AlCl, $SiCl_2$, VCl, $VCl_2$, VOCl, FeCl, GaCl, and ZrCl. Preferred among these metal elements are Cu, Ni, Zn, and Al. Most desirable among these metal elements is Cu.

Pc (phthalocyanine ring) may form a diameter (e.g., Fc-M-L-M-Pc) or trimer with L (divalent connecting group) interposed therebetween. In this case, M's may be the same or different.

Preferred groups of the divalent connecting group represented by L include oxy group —O—, thio group —S—, carbonyl group —CO—, sulfonyl group —$SO_2$—, imino group —NH—, methylene group —CH2—, and group formed by combining these groups.

Referring to preferred combination of substituents on the compound represented by the general formula (I-b), the compound of the general formula (I-b) preferably has various substituents at least one of which is one of the preferred groups listed above. More preferably, more of the various substituents are the preferred groups listed above. Most preferably, all of the various substituents are the preferred groups listed above.

Preferred among the phthalocyanine dyes represented by the general formula (I-b) is a phthalocyanine dye having the structure represented by the general formula (II). The phthalocyanine dye represented by the general formula (II) which is particularly preferred in the invention will be described in detail hereinafter.

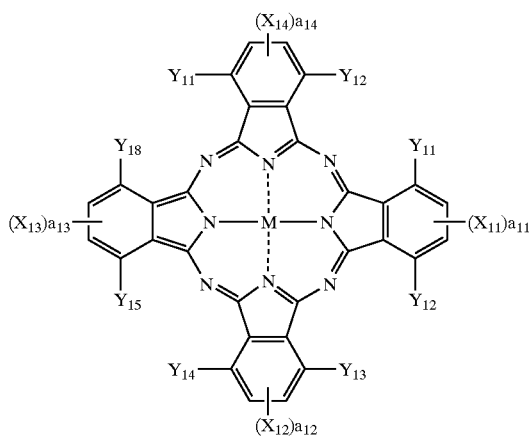

(II)

In the general formula (II), $X_{11}$ to $X_{14}$, $Y_{11}$ to $Y_{18}$, and M are as defined in the general formula (I). The suffixes $a_{11}$ to $a_{14}$ each independently represent an integer of from 1 or 2.

In the general formula (II), $X_{11}$ to $X_{14}$ and $Y_{11}$ to $Y_{18}$ are as defined in the general formula (I). Preferred examples of $X_{11}$ to $X_{14}$ and $Y_{11}$ to $Y_{18}$ include those listed with reference to the general formula (I). M is as defined in the general formula (I). Preferred examples of M include those listed with reference to the general formula (I).

In the general formula (II), $a_{11}$ to $a_{14}$ each independently represent an integer of 1 or 2. Preferably, the sum of $a_{11}$, $a_{12}$, $a_{13}$ and $a_{14}$ is from not smaller than 4 to not greater than 6. It is particularly preferred that $a_{11}$, $a_{12}$, $a_{13}$ and $a_{14}$ each are 1.

$X_{11}$, $X_{12}$, $X_{13}$ and $X_{14}$ may be the same substituent. Alternatively, $X_{11}$, $X_{12}$, $X_{13}$ and $X_{14}$ each may be —$SO_2$-Z in which Z differs among $X_1$, $X_2$, $X_3$ and $X_4$. Thus, $X_{11}$, $X_{12}$, $X_{13}$ and $X_{14}$ each may be a substituent of the same kind but partially different. Alternatively, $X_{11}$, $X_{12}$, $X_{13}$ and $X_{14}$ may be different substituents, e.g., —$SO_2$-Z, —$SO_2NR_1R_2$.

Particularly preferred examples of the combination of substituents among the phthalocyanine dyes represented by the general formula (II) will be given below.

Preferably, $X_{11}$ to $X_{14}$ each independently represent —$SO_2$-Z, —$SO_2$-Z, —$SO_2NR_1R_2$ or —$CONR_1R_2$, particularly —$SO_2$-Z or —$SO_2NR_1R_2$, most preferably —$SO_2$-Z.

Z each independently represents a substituted or unsubstituted alkyl group, substituted or unsubstituted aryl group or substituted or unsubstituted heterocyclic group. Most desirable among these groups are substituted alkyl group, substituted aryl and substituted heterocyclic group. Particularly for the reason of enhancement of dye solubility or ink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$R_1$ and $R_2$ each independently represent a hydrogen atom, substituted or unsubstituted alkyl group, substituted or unsubstituted aryl group or substituted or unsubstituted heterocyclic group, particularly a hydrogen atom, substituted alkyl group, substituted aryl group or substituted heterocyclic group. However, it is not preferred that $R_1$ and $R_2$ each are a hydrogen atom at the same time. Particularly for the reason of enhancement of dye solubility or ink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$Y_{11}$ to $Y_{18}$ each independently represent a hydrogen atom, halogen atom, alkyl group, aryl group, cyano group, alkoxy group, amide group, ureide group, sulfonamide group, carbamoyl group, sulfamoyl group, alkoxycarbonyl group, carboxyl group or sulfo group, particularly hydrogen atom, halogen atom, cyano group, carboxyl group or sulfo group, most preferably hydrogen atom.

The suffixes $a_{11}$ to $a_{14}$ each independently represent 1 or 2. It is particularly preferred that $a_{11}$ to $a_{14}$ each be 1 at the same time.

M represents a hydrogen atom, metal element or owe, hydroxide or halide thereof, particularly Cu, Ni, Zn or Al, most preferably Cu.

The phthalocyanine dye represented by the general formula (II), if it is water-soluble, preferably has an ionic hydrophilic group. Examples of the ionic hydrophilic group include sulfo group, carboxyl group, phosphono group, and quaternary ammonium group. Preferred among these ionic hydrophilic groups are carboxyl group, phosphono group, and sulfo group. Particularly preferred among these ionic hydrophilic groups are carboxyl group and sulfo group. The carboxyl group, phosphono group and sulfo group may be used in the form of salt. Examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion). Preferred among these counter ions are alkaline metal ions. Particularly preferred among these counter ions is lithium ion because it enhances the dye solubility and hence the ink stability.

The number of ionic hydrophilic groups is preferably at least 2 per molecule of phthalocyanine-based dye. It is particularly preferred that there be contained at least two sulfo groups and/or carboxyl groups in the phthalocyanine-based dye.

Referring to preferred combination of substituents on the compound represented by the general formula (II), the compound of the general formula (II) preferably has various substituents at least one of which is one of the preferred groups listed above. More preferably, more of the various substituents are the preferred groups listed above. Most preferably, all of the various substituents are the preferred groups listed above.

Referring to the chemical structure of the phthalocyanine dye according to the invention, it is preferred that at least one electron-withdrawing group such as sulfinyl group, sulfonyl group and sulfamoyl group be incorporated in each of four benzene rings in the phthalocyanine such that σp value of the substituents in the entire phthalocyanine skeleton totals not smaller than 1.6.

The Hammett's substituent constant σp as used herein will be somewhat described hereinafter. Hammett's rule is an empirical rule which L. P. Hammett proposed in 1935 to quantitatively discuss the effect of substituents on the reaction or equilibrium of benzene derivatives. The validity of this empirical rule has been widely accepted today. Substituent constants required in Hammett's rule are σp value and σm value. These values are found in many general literatures. For the details of these values, reference can be made to J. A. Dean, "Lange's Handbook of Chemistry", 12th ed., 1979 (Mc Graw-Hill), and "Kagaku no Ryoiki (Region of Chemistry)", extra edition, No. 122, pp. 96–103, 1979 (Nankodo).

The phthalocyanine derivative represented by the general formula (I-b) is normally a mixture of analogues which are unavoidably different in introduction sites of substituents Xn (n=1 to 4) and Ym (m=1 to 4) and introduced number of these substituents by synthesis method. Accordingly, the general formula of the phthalocyanine dye is mostly a statistically averaged representation of these analogous mixtures. In the invention, it was found that the classification of these analogous mixtures into the following three classes gives a specific mixture which is particularly preferred. In other words, mixtures of phthalocyanine-based dye analogues represented by the general formulae (I-b) and (II) are classified into the following classes for definition.

(1) β-position substitution type: Phthalocyanine dye having a specific substituent on 2- and/or 3-position, 6- and/or 7-position, 10- and/or 11-position, or 14- and/or 15-position (2) α-position substitution type: Phthalocyanine dye having a specific substituent on 1- and/or 4-position, 5- and/or 8-position, 9- and/or 12-position, or 13- and/or 16-position, (3) α, β-position mixed substitution type: Phthalocyanine dye having a specific substituent irregularly on 1- to 16-position In the specification, in order to describe phthalocyanine dye derivatives having different structures (particularly different substitution positions), the aforementioned β-position substitution type, α-position substitution type and α,β-position mixed substitution type are used.

The phthalocyanine derivative to be used in the invention can be synthesized by, e.g., methods described or cited in Shirai and Kobayashi, "Phthalocyanine—Chemistry and Function—", IPC Co., Ltd., pp. 1 to 62, C. C. Leznoff-A. B. P. Lever, "Phthalocyanines—Properties and Applications", VCH, pp. 1–54, etc. or analogous methods in combination.

The phthalocyanine compound represented by the general formula (I-b) to be used in the invention can be synthesized by, e.g., sulfonation reaction, sulfonylchloration reaction and amidation reaction of unsubstituted phthalocyanine compound as disclosed in World Patents 00/17275, 00/08103, 00/08101 and 98/41853 and JP-A-10-36471. In this case, since sulfonation can occur on any position of the phthalocyanine nucleus, it is difficult to control the sulfonated number of substituents. Accordingly, when sulfo groups are incorporated under such a reaction condition, the position and number of sulfo groups incorporated in the reaction product cannot be predetermined, unavoidably giving a mixture of products having different numbers of substituents or substitution positions. Thus, since when this mixture is used as a starting material to synthesize the compound of the invention, a α,β-mixed substitution type mixture comprising some compounds having different numbers of substituents or substitution positions is obtained as a compound suitable for ink set of the invention because the number of heterocyclic group-substituted sulfamoyl groups or the substitution position cannot be predetermined.

As previously mentioned, when many electron-withdrawing groups such as sulfamoyl group are incorporated in the phthalocyanine nucleus, the phthalocyanine dye is provided with a higher oxidation potential and hence an enhanced ozone fastness. When synthesized according to the aforementioned method, it is unavoidable that the reaction mixture contains a phthalocyanine dye having a small number of electron-withdrawing groups incorporated therein, i.e., lower oxidation potential. Accordingly, in order to enhance the ozone fastness of the phthalocyanine dye, a synthesis method capable of inhibiting the production of a compound having a lower oxidation potential is preferably employed.

In the invention, the phthalocyanine compound represented by the general formula (II) can be derived from a tetrasulfophthalocyanine compound obtained by, e.g., reacting a phthalonitrile derivative (compound P) represented by the following general formula and/or a diiminoisoindoline derivative (compound Q) represented by the following general formula with a metal compound represented by the general formula (III) or reacting a 4-sulfophthalocyanine derivative (compound R) represented by the following general formula with a metal compound represented by the general formula (III).

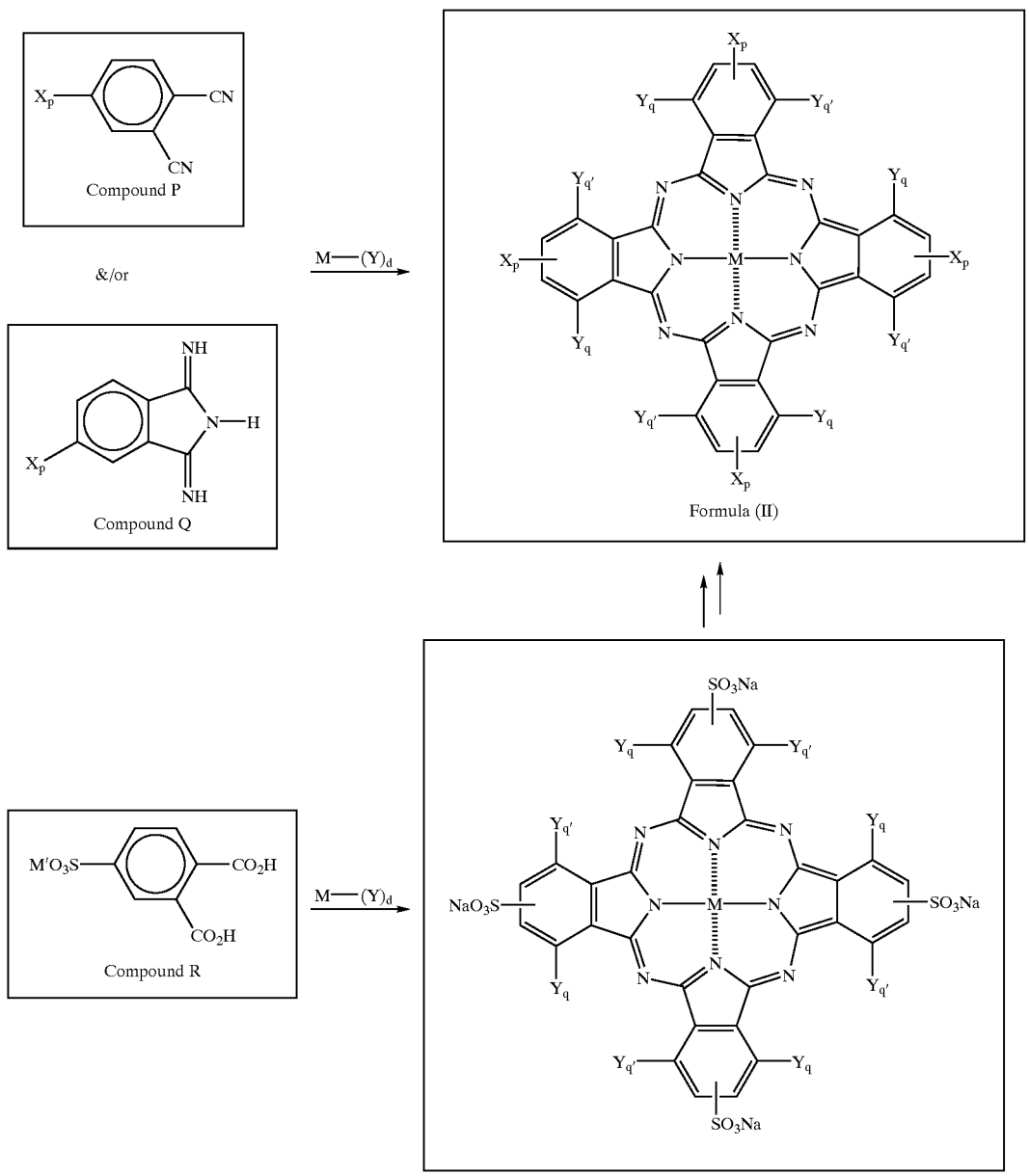

In these general formulae, Xp corresponds to $X_{11}$, $X_{12}$, $X_{13}$ or $X_{14}$ in the general formula (II). Yq and Yq' each correspond to $Y_{11}$, $Y_{12}$, $Y_{13}$, $Y_{140}$ $Y_{15}$, $Y_{16}$, $Y_{17}$ or $Y_{18}$ in the general formula (II). In the compound R, M' represents a cation.

Examples of the cation represented by M' include alkaline metal ions such as Li, Na and K ions and organic cations such as triethylammonium ion and pyridinium ion.

M—(Y)d  (III)

wherein M is as defined in the general formulae (I-b) and (II); Y represents a monovalent or divalent ligand such as halogen atom, acetate anion, acetyl acetonate and oxygen; and d represents an integer of from 1 to 4.

In other words, when synthesized according to the aforementioned method, desired substituents can be incorporated by a predetermined number. In particular, in order to introduce many electron-withdrawing groups to make the oxidation potential higher as in the invention, the aforementioned synthesis method can be used because it is extremely excellent as compared with the aforementioned method for synthesis of the phthalocyanine compound of the general formula (I-b).

The phthalocyanine compound represented by the general formula (II) thus obtained is a mixture of compounds represented by the following general formulae (a)-1 to (a)-4 which are isomeric with the substitution position on Xp, i.e., β-position substitution type mixture.

(a)-1

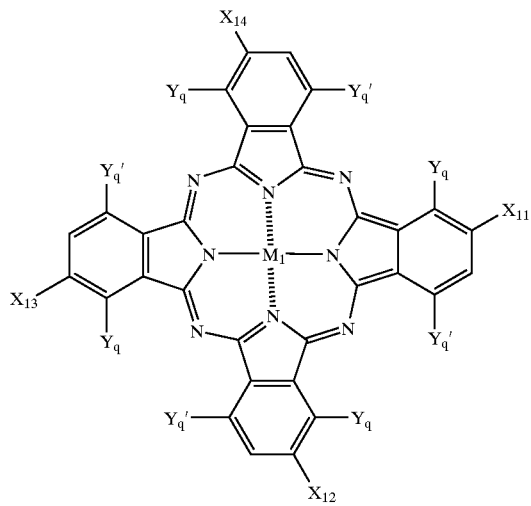

(a)-2

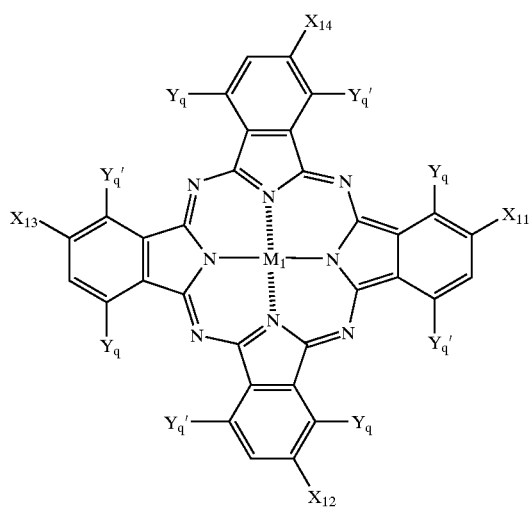

(a)-3

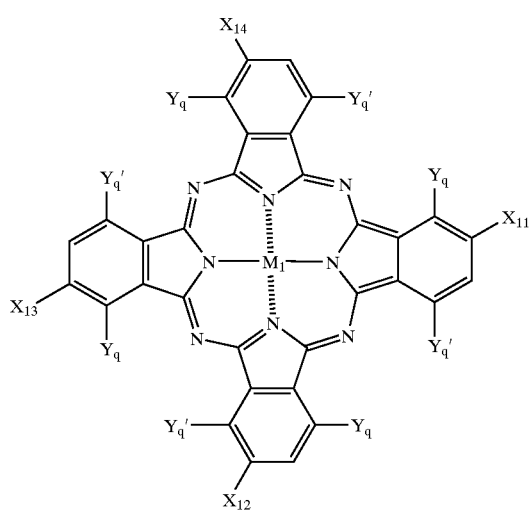

-continued (a)-4

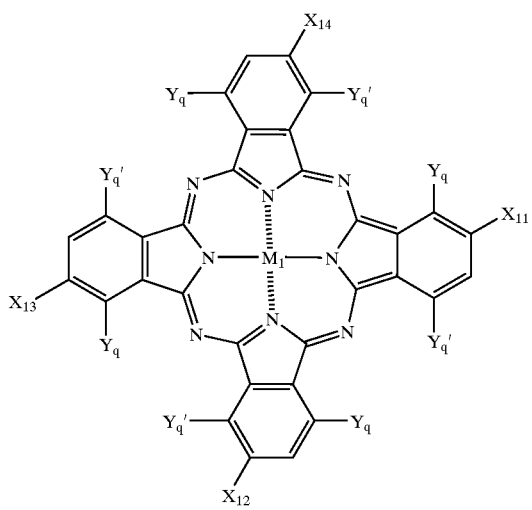

In the foregoing synthesis method, when the same compound is used as Xp, αβ-position substitution type phthalocyanine dye wherein $X_{11}$, $X_{12}$, $X_{13}$ and $X_{14}$ are the same substituent can be obtained. On the contrary, when different materials are used in combination as Xp, a dye having substituents of the same kind but partially different or a dye having different substituents can be synthesized. Among the dyes of the general formula (II), these dyes having different electron-withdrawing substituents are particularly desirable because they can adjust the solubility and association of the dye, the age stability of the ink, etc.

In the invention, it was found very important for the enhancement of fastness that any of these substitution types has an oxidation potential of higher than 1.0 V (vs SCE). The degree of this effect could not be expected from the related art. Although its mechanism is not known in detail, a tendency was given that β-position substitution type is obviously better than α,β-position mixed substitution type in hue, light fastness, ozone fastness, etc.

Specific examples of the phthalocyanine dyes represented by the general formulae (I-b) and (II) (exemplary compounds I-1 to I-12 corresponding to the general formula (I-b) and exemplary compounds 101 to 190 corresponding to the general formula (II)) will be given below, the phthalocyanine dye to be used in the invention is not limited thereto.

Exemplary Compound
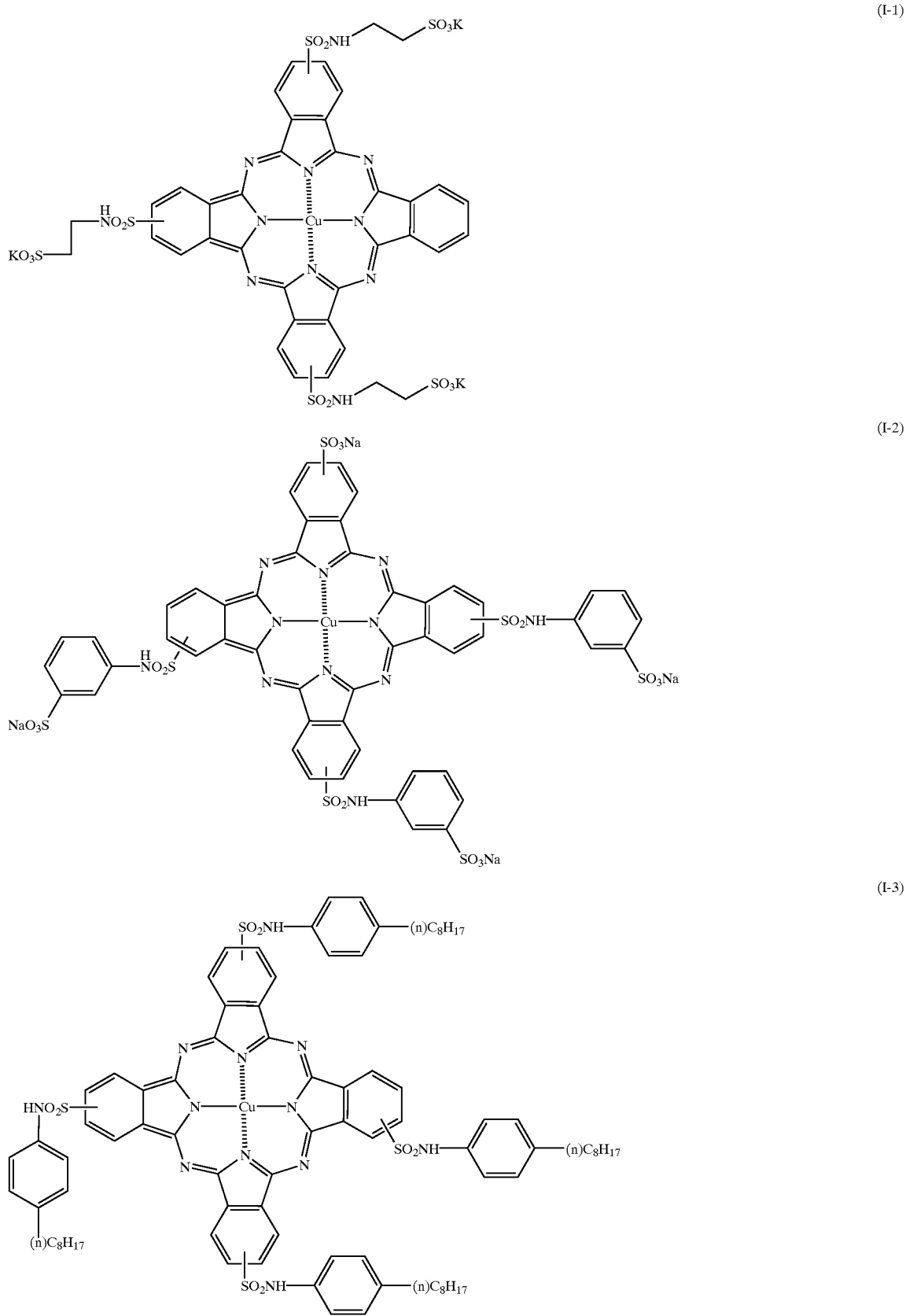
(I-1)
(I-2)
(I-3)

(I-4)
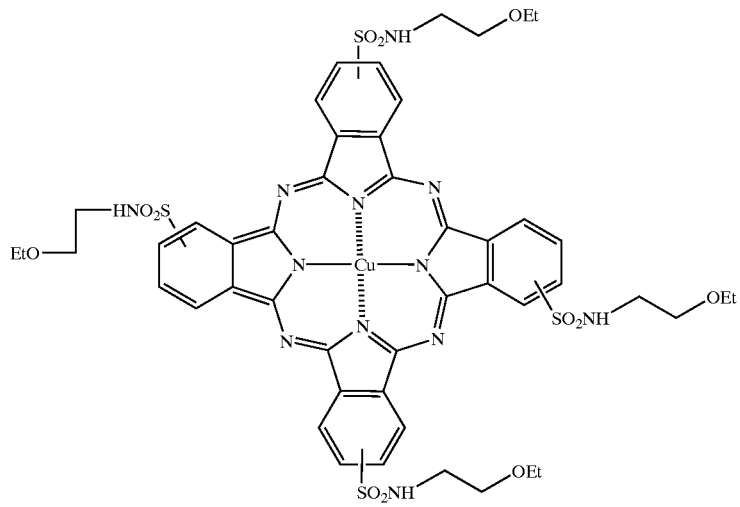
(I-5)
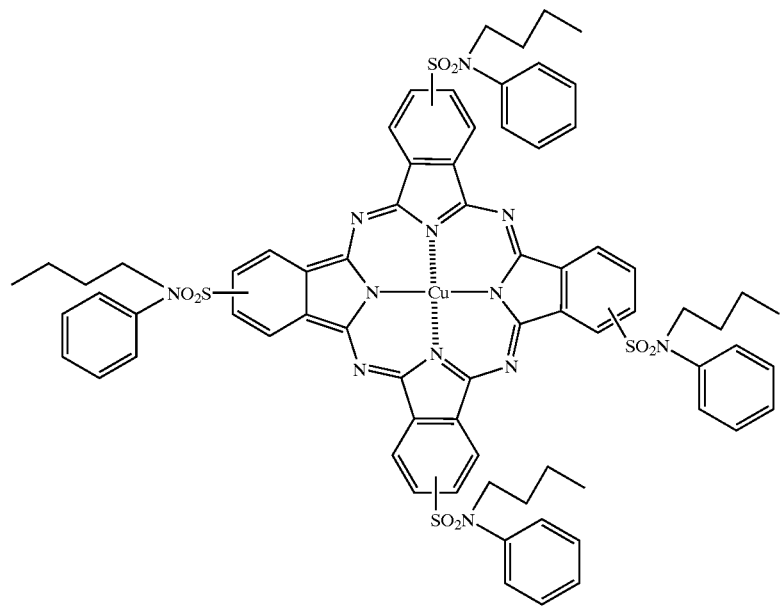
(I-6)
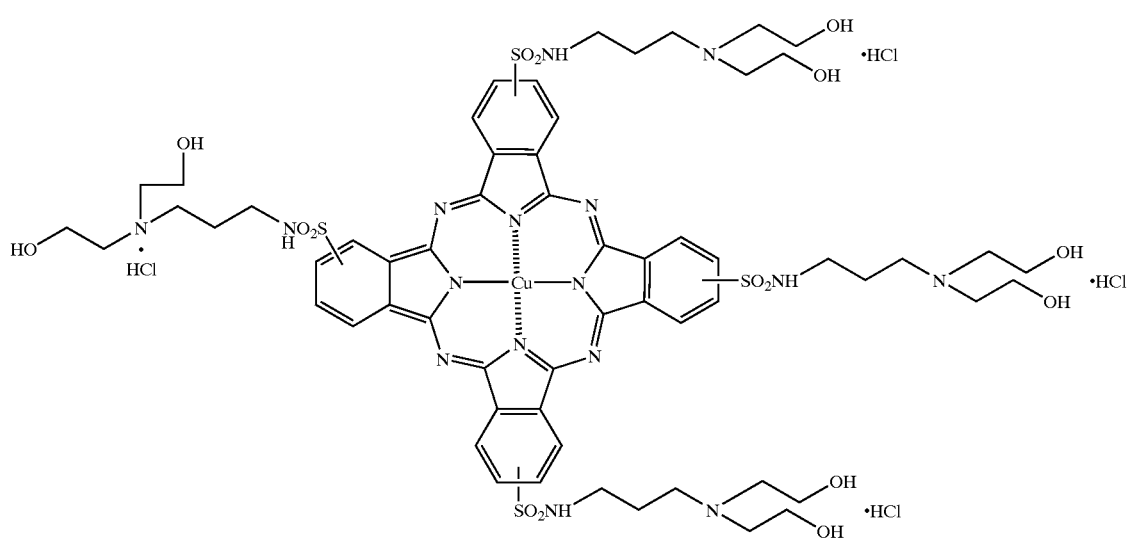

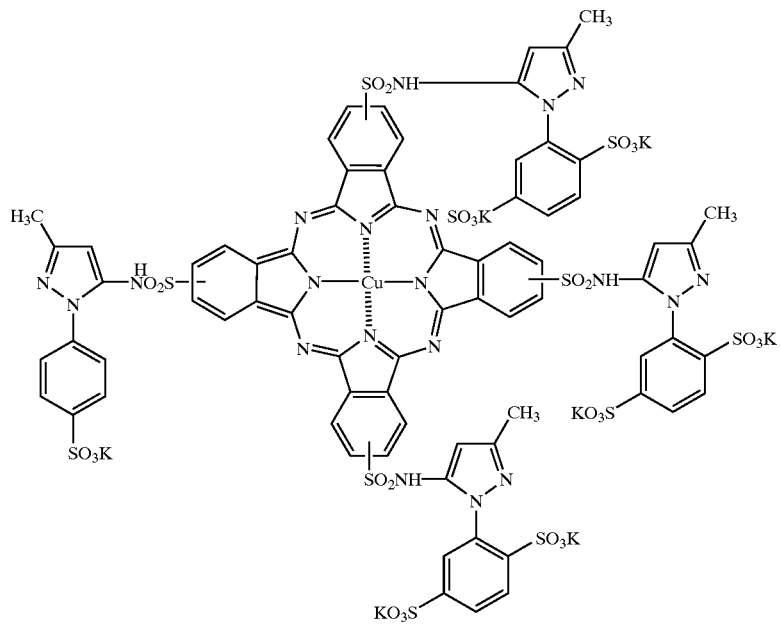
(I-7)
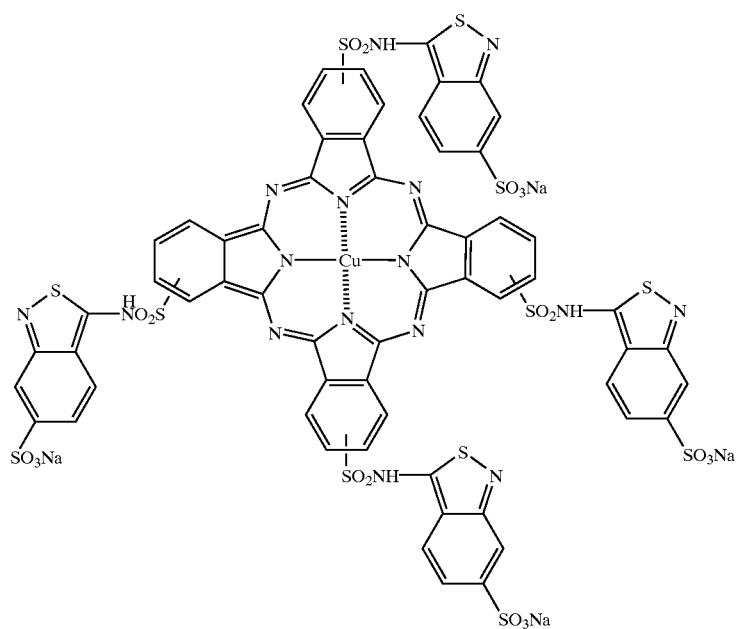
(I-8)

-continued
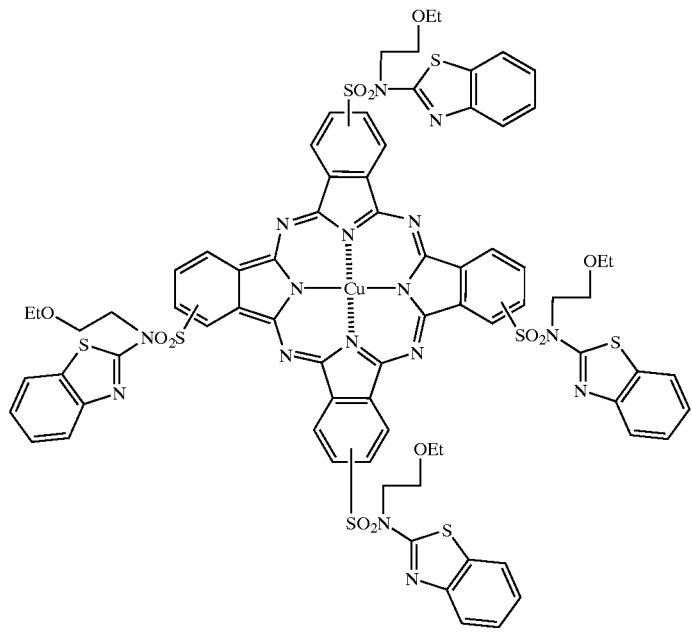
(I-9)
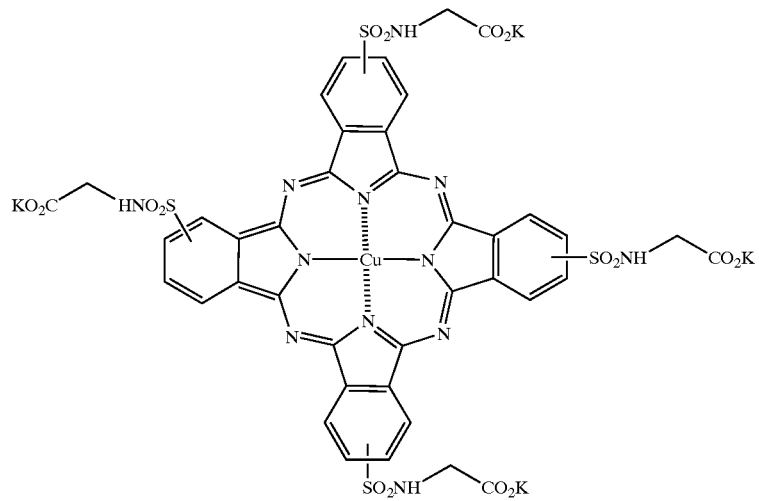
(I-10)

-continued
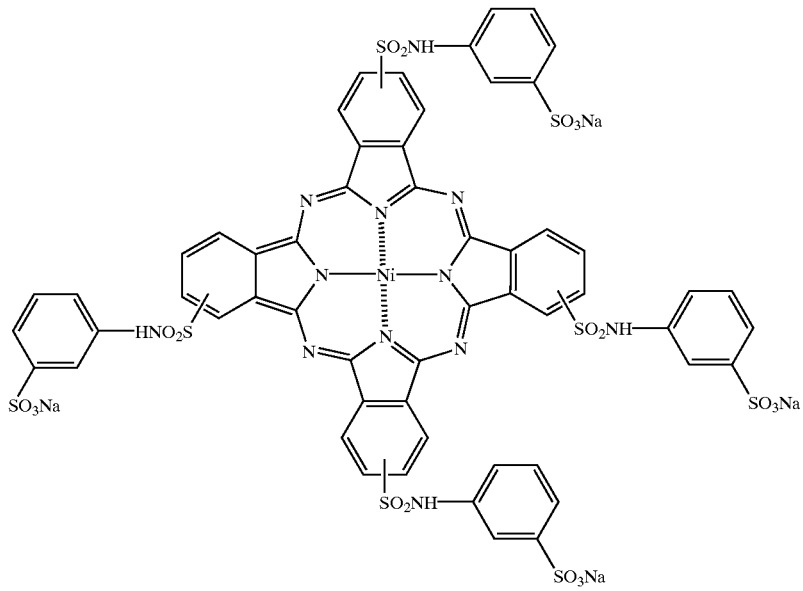
(I-11)
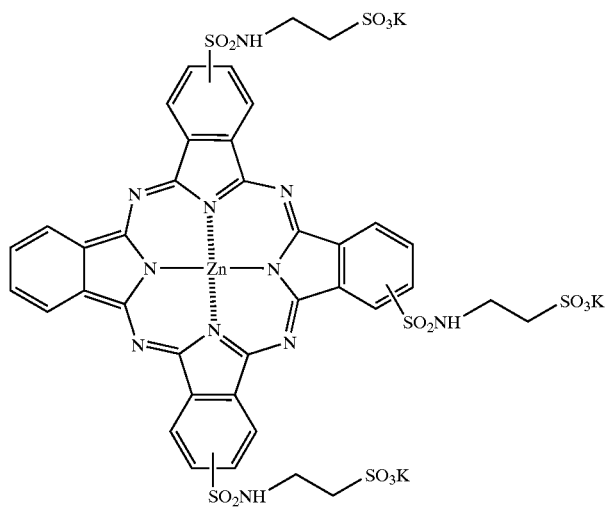
(I-12)

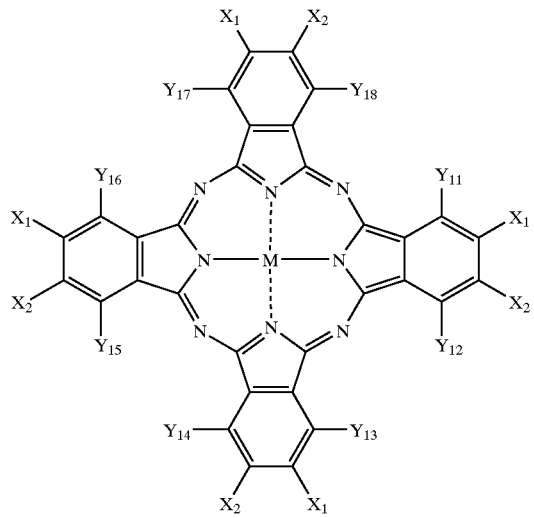

| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 101 | Cu | —SO₂—NH—CH₂—CH₂—SO₃Li | —H | —H, —H | —H, —H | —H, —H | —H, —H |
| 102 | Cu | —SO₂—NH—CH₂—CH(OH)—CO—NH—CH₂CH₂—SO₃Na | —H | —Cl, —H | —Cl, —H | —Cl, —H | —Cl, —H |
| 103 | Cu | —SO₂—NH—CH₂—CH₂—CH₂—SO₂NH—CH₂CH(OH)—SO₃Li | —H | —H, —H | —H, —H | —H, —H | —H, —H |
| 104 | Cu | —SO₂—NH—C₆H₄—SO₂NH—CH₂CH₂—SO₃Li | —H | —H, —H | —H, —H | —H, —H | —H, —H |
| 105 | Ni | —SO₂—NH—CH₂—CH₂—CO—NH—CH(CH₂—COONa)(COONa) | —H | —Cl, —H | —Cl, —H | —Cl, —H | —Cl, —H |
| 106 | Cu | —SO₂—NH—CH₂—CH₂—SO₂—NH—CH₂—COONa | —CH | —H, —H | —H, —H | —H, —H | —H, —H |
| 107 | Cu | —SO₂—CH₂—CH₂—CH₂—SO₂—NH—CH(CH₂—OH)(COOLi) | —H | —H, —H | —H, —H | —H, —H | —H, —H |
| 108 | Cu | —SO₃—CH₂—CH₂—CH₂—SO₃Li | —H | —H, —H | —H, —H | —H, —H | —H, —H |
| 109 | Cu | —SO₃—CH₃—CH₂—CH₂—SO₃K | —H | —H, —H | —H, —H | —H, —H | —H, —H |
| 110 | Cu | —SO₂—(CH₃)₅—CO₂K | —H | —H, —H | —H, —H | —H, —H | —H, —H |
| 111 | Cu | —SO₂—NH—CH₂—CH₂—CH₂—SO₂—NH—CH₂CH(OH)—CH₂—SO₃Li | —H | —H, —H | —H, —H | —H, —H | —H, —H |
| 112 | Cu | —SO₂—NH—CH₂—CH₂—CH₂—SO₂NH—CH₂CH(OH)—CH₃ | —SO₃Li | —H, —H | —H, —H | —H, —H | —H, —H |
| 113 | Cu | —SO₂—CH₂—CH(OH)—CH₂SO₃K | —H | —H, —H | —H, —H | —H, —H | —H, —H |
| 114 | Cu | —SO₂—CH₂—CH(OH)—CH₃ | —SO₃Li | —H, —H | —H, —H | —H, —H | —H, —H |
| 115 | Cu | —SO₂NH(CH₂)₃⁺N(CH₃)(CH₂CH₂OH)₂·C₆H₄—SO₃⁻ | —H | —H, —H | —H, —H | —H, —H | —H, —H |

-continued

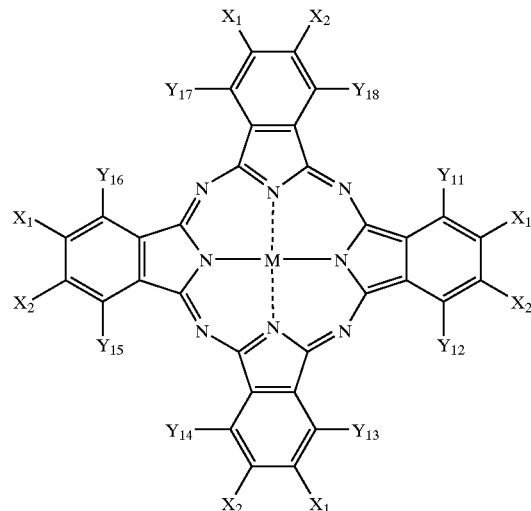

| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 116 | Cu | —CO—NH—CH₂—CH(OH)—CH₂SO₃K | —H | —H, —H | —H, —H | —H, —H | —H, —H |
| 117 | Cu | —CO—NH—CH(COOLi)—CH₂CH₂SO₃Li | —H | —H, —H | —H, —H | —H, —H | —H, —H |
| 118 | Cu | —SO₂CH₂CH₂CH(CH₃)(SO₃Li) | —H | —H, —H | —H, —H | —H, —H | —H, —H |
| 119 | Cu | —SO₂—CH₂—CH(OH)—CH₂—SO₃Na | —H | —H, —H | —H, —H | —H, —H | —H, —H |
| 120 | Cu | —SO₂—CH₂—CH₂—CH(CH₃)—COOLi | —H | —H, —H | —H, —H | —H, —H | —H, —H |
| 121 | Cu | —SO₂(CH₂)₃SO₂NHCH₂—CH(OH)—CH₂—SO₃Li | —H | —H, —H | —H, —H | —H, —H | —H, —H |
| 122 | Cu | —CO₂CH₂CH₂CH₂SO₂—NH—CH₂—CH(OH)—CH₂—SO₃Li | —H | —H, —H | —H, —H | —H, —H | —H, —H |
| 123 | Cu | —SO₂NH—C₃H₁₇(t) | —H | —H, —H | —H, —H | —H, —H | —H, —H |
| 124 | Cu | —SO₂—NH—CH₂—CH(CH₂CH₃)—CH₂CHCH₂—CH₃ | —H | —H, —H | —H, —H | —H, —H | —H, —H |
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)(CH₃) | —H | —H, —H | —H, —H | —H, —H | —H, —H |

-continued

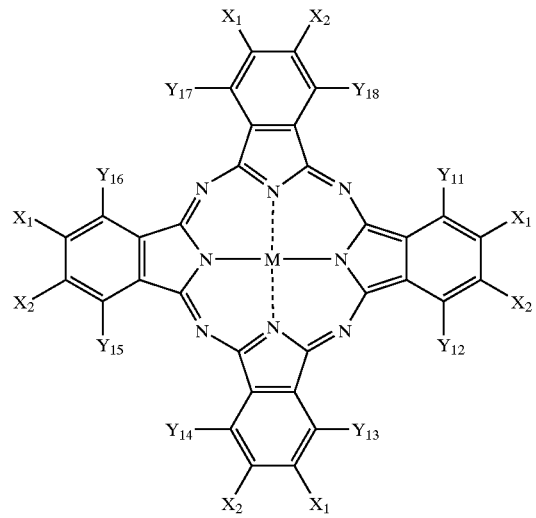

| No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 128 | Zn | —SO₂—CH₂—CH(O—CH₃)—CH₂—O—CH₂ | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO—CH(CH₃)—CH₂—O—C₄H₉(t) | —H | —H, —H | —H, —H | —H, —H | —H, —H |
| 131 | Cu | —SO₂—CH₂—CH₂—CH(CH₃)—SO₂—NH—C₆H₃(2-SO₃Li)(5-SO₃Li) | —H | —H, —H | —H, —H | —H, —H | —H, —H |
| 132 | Cu | —SO₂NH—C₆H₃(CO₂C₆H₁₃(n))(CO₂C₆H₁₃(n)) | —H | —H, —H | —H, —H | —H, —H | —H, —H |
| 133 | Cu | —SO₂NH—C₆H₃(OCH₂CH₂OCH₃)(SO₂NHCH₂CH(C₂H₅)(C₄H₉)) | —H | —H, —H | —H, —H | —H, —H | —H, —H |
| 134 | Cu | —SO₂NH—C₆H₄—SO₂—NH—CH₂—CH(CH₂CH₃)—CH₂CH₂—CH₂—CH₃ | —H | —H, —H | —H, —H | —H, —H | —H, —H |

-continued
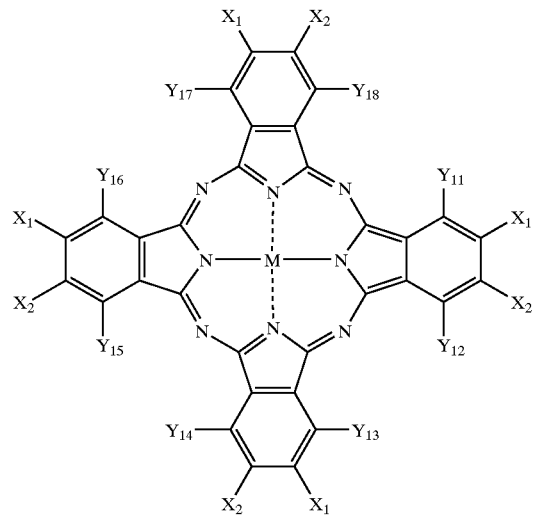
| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 135 | Cu | —SO₂—C₆H₄—CO₂Na (meta) | —H | —H, —H | —H, —H | —H, —H | —H, —H |
| 136 | Cu | —SO₂N(C₄H₉(n))(C₆H₅) | —H | —H, —H | —H, —H | —H, —H | —H, —H |
| 137 | Cu | —SO₂-(benzothiazol-2-yl)-6-SO₃Li | —H | —H, —H | —H, —H | —H, —H | —H, —H |
| 138 | Cu | —SO₂NH-(3-methyl-1-(2,5-disulfoLi-phenyl)pyrazol-5-yl) | —H | —H, —H | —H, —H | —H, —H | —H, —H |
| 139 | Cu | —SO₂(CH₂)₃—NH—CO—C₆H₃(CO₂Li)₂ | —Cl | —H, —H | —H, —H | —H, —H | —H, —H |

-continued

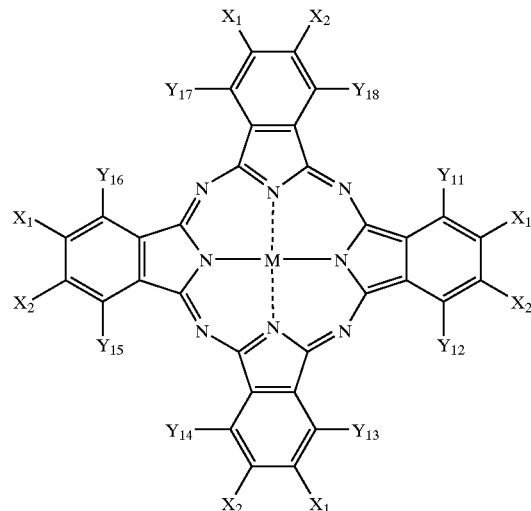

| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 140 | Cu | —CO₂—CH₂CH₂CH₂—NH—[triazine with NH—CH₂—CH₂—CH(CH₃)—SO₃Li substituents (×2)] | —H | —H, —H | —H, —H | —H, —H | —H, —H |
| 141 | Cu | —SO₂NH—CH(COONa)—CH₂—CO—N(CH₂CH₂OH)₂ | —H | —H, —H | —H, —H | —H, —H | —H, —H |
| 142 | Cu | —SO₂NH—C₆H₄(m)—NHCO—C₆H₄(m)—SO₃Li | —H | —H, —H | —H, —H | —H, —H | —H, —H |
| 143 | Cu | —CO—NH—CH₂—CH(OH)—CO—NH—CH(COOK)—CH₂CH₂—SO₃K | —H | —H, —H | —H, —H | —H, —H | —H, —H |
| 144 | Cu | —SO₂—CH₂CH₂CH₂—NH—CO—C₆H₄—CO—NH—CH(COOLi)—CH₂-COOLi | —H | —H, —H | —H, —H | —H, —H | —H, —H |
| 145 | Cu | —SO₂CH₂CH₂OCH₂CH₂OCH₂CH₂SO₃Li | —H | —H, —H | —H, —H | —H, —H | —H, —H |

| No. | M | $X_{p_1}$ | m | $X_{p_1}$ | n |
|---|---|---|---|---|---|
| 146 | Cu | —SO$_2$—NH—CH$_2$—CH(CH$_3$)—SO$_3$Li | 3 | —SO$_2$—NH—CH$_2$—CH(OH)—CH$_3$ | 1 |
| 147 | Cu | —SO$_2$—NH—CH$_2$—CH$_2$SO$_3$Li | 3 | —SO$_2$—NH—CH$_2$—CH$_2$—SO$_2$—NH—CH$_2$—CH(OH)—CH$_3$ | 1 |
| 148 | Cu | —SO$_2$—NH—CH$_2$—CH(CH$_3$)—SO$_3$Li | 3 | —SO$_3$—NH—CH$_2$—CH$_2$—SO$_2$—NH—CH$_2$—CH$_2$—O—CH$_2$—CH$_2$—OH | 1 |
| 149 | Cu | —SO$_2$—NH—CH$_2$—CH(CH$_3$)—SO$_3$Li | 2 | —SO$_2$—NH—CH$_2$—CH$_2$—CH$_2$—CO—N—(CH$_2$—CH$_2$—OH)$_2$ | 2 |
| 150 | Cu | —SO$_3$—NH—CH$_3$—CH$_3$—SO$_2$—NH—CH$_2$CH$_2$—COONa | 3 | —SO$_2$NH—CH(CH$_3$)—CH$_2$OH | 1 |
| 151 | Cu | —SO$_2$—NH—C$_6$H$_4$—SO$_2$NH—CH$_2$—CH(OH)—SO$_3$Li | 3 | —SO$_2$NH—CH$_2$—CH$_2$—O—CH$_2$—CH$_2$—OH | 1 |
| 152 | Cu | —SO$_2$—CH$_2$—CH$_2$—CH(CH$_3$)—SO$_3$Li | 2.5 | —SO$_3$—CH$_2$—C$_6$H$_5$—O—CH$_2$—CH$_2$—OH | 1.5 |
| 153 | Cu | —SO$_2$—CH$_2$—CH$_2$—CH(CH$_3$)—SO$_3$Na | 2 | —SO$_2$—CH$_2$—CH$_2$—CH$_2$—CO—N—(CH$_2$—CH$_2$—OH)$_2$ | 2 |
| 154 | Cu | —SO$_2$—CH$_2$—CH$_2$—CH$_3$—SO$_3$Li | 3 | —SO$_2$—CH$_2$—CH$_2$—CH$_2$—SO$_2$—NH—CH$_2$—CH(OH)—CH$_3$ | 1 |
| 155 | Cu | —SO$_2$—CH$_2$—CH$_2$—COOK | 2 | —SO$_2$—CH$_2$—CH$_2$—SO$_2$—NH—CH$_2$—CH(OH)—CH$_2$—COOK | 2 |
| 156 | Cu | —SO$_3$—CH$_2$—CH$_2$—CH$_3$—SO$_3$Li | 3 | —SO$_2$—CH$_2$—CH(OH)—CH$_2$—SO$_3$Li | 1 |

-continued

M-Pc(Xp₁)ₘ(Xp₂)ₙ

| No. | M | Xp₁ | m | Xp₁ | n |
|---|---|---|---|---|---|
| 157 | Cu | —SO₂—CH₂—CH₂—O—CH₃—CH₂—SO₃Li | 2 | —SO₂—CH₂—CH₂—CO₂—CH₂—CH₂—CH(OH)—CH₂—COOK | 2 |
| 158 | Cu | —SO₂—CH₂—CH(OH)—CH₂SO₃Li | 3 | —SO₂NH—⟨C₆H₄⟩—SO₂NH—CH₂—CH₂—OH | 1 |
| 159 | Cu | —SO₂NHCH₂CH₂SO₃Li | 3 | —SO₂—CH₂—CH₂—SO₂—NH—CH(OH)—CH—CH₃ | 1 |
| 160 | Cu | —SO₂—CH₂—CH₂—O—CH₂—CH₂—O—CH₂—CH₂—SO₃Na | 3 | —SO₂—CH₂—CH₂—CO—NH—CH₂—CH₂—COONa / CH₂—CH₂—COONa | 1 |
| 161 | Cu | —SO₂CH₂CH₂CH₂SO₃Li | 3 | —SO₂CH₂CH₂SO₂NHCH₂—CH(OH)—CH₂SO₃Li | 1 |
| 162 | Cu | —SO₂CH₂CH₂CH₂SO₃Li | 2 | —SO₂CH₂CH₂OCH₂CH₂OCH₂CH₂OH | 2 |
| 163 | Cu | —SO₂CH₂CH₂CH₂SO₃K | 3 | —SO₂CH₂CH₂CH₂SO₂NH—CH(CH₃)—CH₂—OH | 1 |
| 164 | Cu | —SO₂CH₃CH₂CH₂SO₃Li | 2 | —SO₂CH₂CH₂CH₂SO₂N(CH₂CH₂OH)₂ | 2 |
| 165 | Cu | —CO—NH—CH₂—CH₂—SO₃K | 3 | —CO—NH—CH₂—CH₂—O—CH₂—CH₂—OH | 1 |
| 166 | Cu | —CO—NH—CH₂—CH₂—SO₂—NH—CH₂—CH₂—COONa | 3 | —CO—NH—CH₂—CH(OH)—CH₃ | 1 |
| 167 | Cu | —SO₂(CH₂)₃SO₂NHCH₂—CH(OH)—CH₂CO₂Li | 2.5 | —CO—NH—CH₂—CH₂—CO—N(—CH₂—CH₂—OH)₂ | 1.5 |
| 168 | Cu | —CO₂—CH₂—CH(CH₃)—CH—SO₃Na | 2 | —CO—CH₂—CH₂—CH₂—CO—N(—CH₂—CH₂—OH)₂ | 2 |

-continued

| No. | M | $Xp_1$ | m | $Xp_1$ | n |
|---|---|---|---|---|---|
| 180 | Cu | $-SO_2-CH_2-CH_2-CH_2-SO_2-NH-CH_2-CH(O-CH_3)-CH_2-CH_3$ | 3 | $-SO_2NH-CH_2-CH_2-SO_3NH-CH_3-CH_2-O-CH_3-CH_2-OH$ | 1 |
| 181 | Cu | $-SO_2-CH_2-CH_2-CH_2-CO_2-NH-CH(CH_3)-CH_2-CH_2-CH_3$ | 3 | $-SO_2-CH_2-CH_2-CH_2-SO_2-NH-CH(CH_3)_2$ | 1 |
| 182 | Cu | $-SO_2-CH_2-CH_2-CH_2-SO_2NH-CH(OH)-CH_2-CH_3$ | 2.5 | $-SO_2-CH_2-CH_2-CH_2-CO_2-NH-CH(CH_3)-CH_2-CH_3$ | 1.5 |
| 183 | Cu | $-SO_2-CH_2-CH_2-CH_2-CO_2-NH-CH(CH_3)-CH_2-CH_3$ | 2 | $-SO_2-CH_2-CH_2-SO_3-NH-(CH_2)_3-CH_3-O-CH_2CH_2-OH$ | 2 |
| 184 | Cu | $-SO_2-CH_2-CH_2-CH_2-SO_2-NH-CH(OH)-CH_2-CH_3$ | 3 | $-SO_2-CH_2-CH_2-O-CH_2-CH_2-O-CH_3$ | 1 |
| 185 | Cu | $-SO_2-CH_2-CH_2-CH_2-SO_2-NH-CH(OH)-CH_2-CH_3$ | 3 | $-SO_2-CH_2-CH_2-O-CH_3-CH_2-O-CH_3$ | 1 |
| 186 | Cu | $-SO_2-CH_2-CH_2-CH_2-CO_2-NH-CH(CH_3)-CH_2-CH_3$ | 3 | $-SO_2-CH_2-CH_2-O-CH_3-CH_2-CH_2-OH$ | 1 |
| 187 | Cu | $-SO_2-CH_2-CH_2-CH_2-SO_2-NH-CH(CH_3)_2$ | 3 | $-CO_2-CH_2-CH(CH_2CH_3)-CH_2-CH_2CH_3$ | 1 |
| 188 | Cu | $-CO_2-CH_2-CH_2-CO_2-NH-CH(CH_3)-CH_2-CH_3$ | 3 | $-CO_3-CH_2-CH_2-O-CH_2-CH_2-O-CH_3$ | 1 |
| 189 | Cu | $-CO-NH-CH_2-CH_2-SO_2-NH-CH(CH_3)_2$ | 3 | $-SO_2-NH-CH_2-CH(CH_2CH_3)-CH_2-CH_2-CH_3$ | 1 |
| 190 | Cu | $-CO-NH-CH_2-CH(CH_2CH_3)-CH_2-CH_2CH_3$ | 3 | $-CO-NH-CH_2-CH_3-CH_2-O-CH_3$ | 1 |

In the above Tables, specific examples of various combinations of (X1, X2), (Y11, Y12), (Y13, Y14), (Y15, Y16), and (Y17, Y18) are each independently not in order. Also, in the above Tables, In the table, the introduction sites of the substituents (Xp1) and (Xp2) in the β-position substituents are not in order.

The structure of the phthalocyanine compound represented by M-Pc(Xp$_1$)m(Xp$_2$)n in Tables 8 to 11 is as follows.

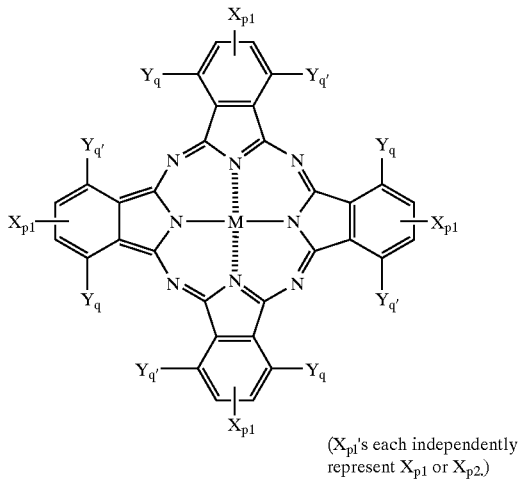

(X$_{p1}$'s each independently represent X$_{p1}$ or X$_{p2}$.)

The phthalocyanine dye represented by the general formula (I-b) can be synthesized according to the patent cited above. The phthalocyanine dye represented by the general formula (II) can be synthesized by the aforementioned method as well as the method disclosed in JP-A-2001-226275, JP-A-2001-96610, JP-A-2001-47013 and JP-A-2001-193638. The starting material, intermediate dye and synthesis route are not limited to those according to these methods.

In the ink set for ink jet recording of the invention, the dark yellow ink is an ink that contributes to the gradation of the portion mainly ranging from gray (neutral color) to yellow on the image and the adjustment of color balance. This ink contains a yellow dye as a main dye as well as a magenta dye or cyan dye to contribute to the representation of color tone and gradation and the adjustment of shadow, making it possible to improve the quality of the image printed. In the ink set for ink jet recording of the invention, the dark yellow ink contains at least one of the cyan dyes of the general formula (I-b). The dark yellow ink contains a yellow dye as a main dye among the constituent dyes in a concentration (total concentration in the case where there are a plurality of yellow dyes) of 0.1 to 10% by weight, preferably from 0.5 to 6% by weight. On the other hand, the concentration of the cyan dye of the general formula (I-b) of the invention in the dark yellow ink is from ¹⁄₂₀ to ½, preferably from ¹⁄₁₀ to ³⁄₇ of that of the yellow dye. Accordingly, the spectral absorption of the ink in the red range is substantially from ¹⁄₂₀ to ½, preferably from ¹⁄₁₀ to ³⁄₇ of that of the absorption peak in the blue range. The dark yellow ink may comprise two or more dyes of the general formula (I-b) of the invention incorporated in admixture therein as a cyan component. The dark yellow ink may also comprise a dye of the general formula (I-b) of the invention and other known cyan dyes incorporated in admixture therein. Anyway, the incorporation of a dye of the invention (I-b) in the dark yellow ink makes it possible to give an excellent image quality and inhibit the change of color balance and gradation in various storage atmospheres having different light, heat and oxidizing conditions.

In the ink set for ink jet recording of the invention, the cyan ink, too, preferably contains at least one of the phthalocyanine dyes of the general formula (I-b). The content of the phthalocyanine dye, if any incorporated in the cyan ink, is from 0.2% to 20% by weight, preferably from 0.5% to 15% by weight.

The ink set is preferably composed of cyan ink in combination with light cyan ink. In the case where the cyan ink is used in combination with a light cyan ink, the cyan ink preferably contains the phthalocyanine dye in an amount of from 0.2% to 20% by weight while the light cyan ink contains the phthalocyanine dye in a concentration of from ¹⁄₂₀ to ½, preferably from ¹⁄₁₀ to ³⁄₇ of that of the cyan ink. Accordingly, the spectral absorption of the light cyan ink in the green range is substantially from ¹⁄₂₀ to ½, preferably from ¹⁄₁₀ to ³⁄₇ of that of the cyan ink. The cyan ink constituting the ink set may comprise two or more dyes of the general formula (I-b) of the invention incorporated in admixture therein. The cyan ink may also comprise a dye of the general formula (I-b) of the invention and other known cyan dyes (or pigments) incorporated in admixture therein. Anyway, the incorporation of a dye of the invention (I-b) in the cyan ink makes it possible to give an excellent image quality and inhibit the change of magenta color tone and gradation of the image in various storage atmospheres having different light, heat and oxidizing conditions.

The various ink to be incorporated in the ink set of the invention, including the aforementioned dark yellow ink, comprise various dyestuffs (both dye and pigment will be hereinafter referred to as "dyestuff") incorporated therein to adjust its tone for full-color image. Examples of the dyestuffs employable herein will be given below.

Examples of yellow dyestuffs include aryl or heterylazo dyestuffs having phenols, naphthols, anilines, pyrazolones, pyridones or closed-chain type active methylene compounds as coupling components, azomethine dyestuffs having closed-chain type active methylene compounds as coupling components, methine dyestuffs such as benzylidene dyestuff and monomethine oxonol dyestuff, and quinone-based dyestuffs such as naphthoquinone dyestuff and anthraquinone dyestuff. Other examples of yellow dyestuffs include quinophthalone dyestuff, nitro-nitroso dyestuff, acridine dyestuff, and acridinone dyestuff. These dyestuffs may assumes yellow only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

Examples of magenta dyestuffs include aryl or heterylazo dyestuffs having phenols, naphthols or anilines as coupling components, azomethine dyestuffs having pyrazolones or pyrazolotriazoles as coupling components, methine dyestuffs such as arylidene dyestuff, styryl dyestuff, melocyanine dyestuff and oxonol dyestuff, carbonium dyestuffs such as diphenylmethane dyestuff, triphenylmethane dyestuff and xanthene dyestuff, quinone-based dyestuffs such as naphthoquinone, anthraquinone and anthrapyridone, and condensed polycyclic dyestuffs such as dioxazine dyestuff. These dyestuffs may assumes magenta only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

Examples of cyan dyestuff include azomethine dyestuffs such as indoaniline dyestuff and indophenol dyestuff, polymethine dyestuffs such as cyanine dyestuff, oxonol dyestuff and melocyanine dyestuff, carbonium dyestuffs such as diphenylmethane dyestuff, triphenylmethane dyestuff and xanthene dyestuff, phthalocyanine dyestuffs, anthraquinone dyestuffs, aryl or heterylazo dyestuffs having phenols, naphthols or anilines as coupling components, and indigo-thioindigo dyestuffs. These dyestuffs may assumes cyan only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

Further, black dyestuffs such as polyazo dyestuff may be used.

Examples of the water-soluble dyes include direct dye, acidic dye, food dye, basic dye, and reactive dye. Preferred examples of these water-soluble dyes include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247, C.I. Direct Violet 7, 9, 47, 48, 51, 66, 90, 93, 94, 95, 98, 100, 101, C.I. Direct Yellow 8, 9, 11, 12, 27, 28, 29, 33, 35, 39, 41, 44, 50, 53, 58, 59, 68, 86, 87, 93, 96, 98, 100, 106, 108, 109, 110, 130, 132, 142, 144, 161, 163, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291, C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 396, 397, C.I. Acid Violet 5, 34, 43, 47, 48, 90, 103, 126, C.I. Acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326, C.I. Acid Black 7, 24, 48, 52:1, 172, C.I. Reactive Red 3, 13, 17, 19, 21, 22, 23, 24, 29, 35, 37, 40, 41, 43, 45, 49, 55, C.I. Reactive Violet 1, 3, 4, 5, 6, 7, 8, 9, 16, 17, 22, 23, 24, 26, 27, 33, 34, C.I. Reactive Yellow 2, 3, 13, 14, 15, 17, 18, 23, 24, 25, 26, 27, 29, 35, 37, 41, 42, C.I. Reactive Blue 2, 3, 5, 8, 10, 13, 14, 15, 17, 18, 19, 21, 25, 26, 27, 28, 29, 38, C.I. Reactive Black 4, 5, 8, 14, 21, 23, 26, 31, 32, 34, C.I. Basic Red 12, 13, 14, 15, 18, 22, 23, 24, 25, 27, 29, 35, 36, 38, 39, 45, 46, C.I. Basic Violet 1, 2, 3, 7, 10, 15, 16, 20, 21, 25, 27, 28, 35, 37, 39, 40, 48, C.I. Basic Yellow 1, 2, 4, 11, 13, 14, 15, 19, 21, 23, 24, 25, 28, 29, 32, 36, 39, 40, C.I. Basic Blue 1, 3, 5, 7, 9, 22, 26, 41, 45, 46, 47, 54, 57, 60, 62, 65, 66, 69, 71, and C.I. Basic Black 8.

The ink set of the invention may comprise pigments incorporated therein. As these pigments there may be used commercially available products as well as known compounds listed in various literatures. Examples of these literatures include Color Index (compiled by The Society of Dyers and Colourists), "Kaitei Shinban Ganryo Binran (Revised Edition of Handbook of Pigments)", compiled by Japan Association of Figment Technology, 1989, "Saishin Ganryo Ouyou Gijutsu (Modern Applied Technology of Pigments)", CMC, 1986, "Insatsu Inki Gijutsu (Printing Ink Technology)", CMC, 1984, and W. Herbst, K. Hunger, "Industrial Organic Pigments", VCH Verlagsgesellschaft, 1993. Specific examples of these pigments include organic pigments such as azo pigment (e.g., azo lake pigment, insoluble azo pigment, condensed azo pigment, chelate azo pigment), polycyclic pigment (e.g., phthalocyanine pigment, anthraquinone-based pigment, perylene-based pigment, perynone-based pigment, indigo-based pigment, quinacridone-based pigment, dioxazine-based pigment, isoindolinone-based pigment, quinophthalone-based pigment, diketopypyrrolopyrrole-based pigment), dyed lake pigment (e.g., acidic or basic dye lake pigment) and azine pigment, and inorganic pigments such as yellow pigment (e.g., C.I. Pigment Yellow 34, 37, 42, 53), red pigment (e.g., C.I. Pigment Red 101, 108), blue pigment (e.g., C.I. Pigment blue 27, 29, 17:1), black pigment (e.g., C.I. Pigment Black 7, magnetite) and white pigment (e.g., C.I. Pigment White 4, 6, 18, 21).

As a pigment having a color tone suitable for image formation there is preferably used a blue or cyan pigment such as phthalocyanine pigment, anthraquinone-based indanthrone pigment (e.g., C.I. Pigment Blue 60) and dyed lake pigment-based triarylcarbonium pigment, particularly phthalocyanine pigment (Preferred examples of the phthalocyanine pigment include copper phthalocyanine such as C.I. Pigment Blue 15:1, 15:2, 15:3, 15:4 and 15:6, monochlorophthalocyanine, low chlorination copper phthalocyanine, aluminum phthalocyanine such as pigment listed in European Patent 860475, metal-free phthalocyanine such as C.I. Pigment Blue 16, and phthalocyanine having Zn, Ni or Ti as a central metal. Particularly preferred among these phthalocyanine dyes are C.I. Pigment Blue 15:3, 15:4, and aluminum phthalocyanine).

Preferred examples of red or purple pigments include azo pigments (Preferred examples of these dyes include C.I. Pigment Red 3, 5, 11, 22, 38, 48:1, 48:3, 48:4, 49:1, 52:1, 53:1, 57:1, 63:2, 144, 146, 184. Particularly preferred among these dyes are C.I. Pigment Red 57:1, 146, 184), quinacridone-based pigments (Preferred examples of these dyes include C.I. Pigment Red 122, 192, 202, 207, 209, and C.I. Pigment Violet 19, 42. Particularly preferred among these dyes is C.I. Pigment Red 122), dyed lake-based triarylcarbonium pigments (Preferred examples of these dyes include xanthene-based C.I. Pigment Red 81:1, C.I. Pigment Violet 1, 2, 3, 27, 39), dioxazine-based pigments (e.g., C.I. Pigment Violet 23, 37), diketopyrrolopyrrole-based pigments (e.g., C.I. Pigment Red 254), perylene pigments (e.g., C.I. Pigment Violet 29), anthraquinone-based pigments (e.g., C.I. Pigment Violet 5:1, 31, 33), and thioindigo-based pigments (e.g., C.I. Pigment Red 38, 88).

Preferred examples of yellow pigments include azo pigments (Preferred examples of these dyes include monoazo pigment-based dyes such as C.I. Pigment Yellow 1, 3, 74, 98, disazo pigment-based dyes such as C.I. Pigment Yellow 12, 13, 14, 16, 17, 83, general azo-based dyes such as C.I. Pigment Yellow 93, 94, 95, 128, 155 and benzimidazolone-based dyes such as C.I. Pigment Yellow 120, 151, 154, 156, 180. Particularly preferred among these dyes are those prepared from materials other than benzidine-based compounds), isoindoline-isoindolinone-based pigments (Preferred examples of these dyes include, C.I. Pigment Yellow 109, 110, 137, 139), quinophthalone pigments (Preferred examples of these dyes include C.I. Pigment Yellow 138), and flavanthrone pigment (e.g., C.I. Pigment Yellow 24).

Preferred examples of black pigments include inorganic pigments (Preferred examples of these pigments include carbon black, and magnetite), and aniline black.

Other examples of pigments employable herein include orange pigments (C.I. Pigment Orange 13, 16), and green pigments (C.I. Pigment Green 7).

The pigments to be incorporated in the ink set may be used untreated as mentioned above or may be subjected to surface treatment before use. As surface treatment methods there may be proposed a method involving surface coat with a resin or wax, a method involving the attachment of a surface activator, and a method involving the bonding of a reactive material (e.g., silane coupling agent, radical produced from an epoxy compound, polyisocyanate or diazonium salt) to the surface of pigment. For the details of these methods, reference can be made to the following literatures and patents.

(1) Kinzoku Sekken no Seishitsu to Ouyou (Properties and Application of Metal Soap) (Saiwai Shobo)

(2) Insatsu Inki Insatsu (Printing with Printing Ink) (CMC Shuppan, 1984)

(3) Saishin Ganryo Ouyou Gijutsu (Modern Applied Technology of Pigments (CMC, 1986)

(4) U.S. Pat. Nos. 5,554,739, 5,571,311

(5) JP-A-9-151342, JP-A-10-140065, JP-A-10-292143, JP-A-11-166145

In particular, self-dispersible pigments prepared by reacting the diazonium salt disclosed in the US patents (4) with carbon black and capsulized pigments prepared according to the method disclosed in the Japanese patents (5) are useful to obtain dispersion stability without using extra dispersant in the ink.

In the invention, the pigment may be further dispersed with a dispersant. As such a dispersant there may be used any of known compounds depending on the pigment used. For example, a surface active agent type low molecular dispersant or polymer type dispersant may be used. Examples of these dispersants include those disclosed in JP-A-3-69949 and European Patent 549,486. In order to accelerate the adsorption of the pigment to the dispersant used, a pigment derivative called synergist may be added.

The particle diameter of the pigment thus dispersed is preferably from 0.01 $\mu$m to 10 $\mu$m, more preferably from 0.05 $\mu$m to 1 $\mu$m.

As a method for dispersing the pigment there may be used a known dispersion technique for use in the production of ink or toner. Examples of the dispersing machine employable herein include vertical or horizontal agitator mill, attritor, colloid mill, ball mill, three-roll mill, pearl mill, super mill, impeller, disperser, KD mill, dynatron, and pressure kneader. For the details of these dispersing machines, reference can be made to "Saishin Ganryo Ouyou Gijutsu (Modern Applied Technology of Pigments)", CMC, 1986.

The dyes or pigments to be incorporated in the inks to be used in the ink set of the invention have been described. Other ink composition components and related matters will be described hereinafter.

The surface active agent which can be incorporated in the inks to be used in the ink set of the invention will be further described below.

In the invention, a surface active agent can be incorporated in the ink to adjust the liquid physical properties of the ink, making it possible to provide the ink with an enhanced ejection stability and hence excellent effects such as enhanced water resistance of image and prevention of running of ink printed.

Examples of the surface active agent employable herein include anionic surface active agents such as sodium dodecylsulfate, sodium dodecyloxysulfonate and sodium alkylbenzenesulfonate, cationic surface active agents such as cetyl pyridinium chloride, trimethyl cetyl ammonium chloride and tetrabutyl ammonium chloride, and nonionic surface active agents such as polyoxyethylene nonyl phenyl ether, polyoxyethylene naphthyl ether and polyoxy ethylene octyl phenyl ether. Particularly preferred among these surface active agents are nonionic surface active agents.

The content of the surface active agent is from 0.001% to 20% by weight, preferably from 0.005% to 10% by weight, more preferably from 0.01% to 5% by weight based on the amount of the ink.

The ink to be incorporated in the ink set of the invention can be prepared by dissolving and/or dispersing the aforementioned dye and surface active agent in an aqueous medium. The term "aqueous medium" as used herein is meant to indicate water or a mixture of water and a water-miscible organic solvent optionally comprising additives such as wetting agent, stabilizer and preservative incorporated therein.

In order to prepare the ink solution of the invention, a water-soluble ink, if used, is preferably dissolved in water. Thereafter, various solvents and additives are added to the solution. The mixture is then subjected to dissolution and stirring to make a uniform ink solution.

During this procedure, dissolution is accomplished by any of various methods such as agitation, irradiation with ultrasonic wave and shaking. Particularly preferred among these methods is agitation. The agitation, if effected, is accomplished by any of various methods such as fluid agitation and agitation utilizing shearing force developed by contrarotating agitator or dissolver known in the art. On the other hand, agitation utilizing shearing force with respect to the bottom of container as developed by a magnetic agitator is preferably used.

Examples of the water-miscible organic solvent employable herein include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylene diamine, diethylene triamine, triethylene tetramine, polyethyleneimine, tetramethylpropylenediamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of the water-miscible organic solvents maybe used in combination.

The aforementioned dye, if it is oil-soluble, may be emulsion-dispersed in an aqueous medium in the form of solution in a high boiling organic solvent.

The boiling point of the high boiling organic solvent to be used in the invention is not lower than 150° C., preferably not lower than 170° C.

Examples of the high boiling organic solvent employable herein include phthalic acid esters (e.g., dibutyl phthalate, dioctyl phthalate, dicyclohexyl phthalate, di-2-ethylhexyl phthalate, decyl phthalate, bis(2,4-di-tert-amylphenyl-)isophthalate, bis(1,1-diethylpropyl)phthalate), phosphoric or phosphonic acid esters (e.g., diphenyl phosphate, triphenyl phosphate, tricresyl phosphate, 2-ethylhexyl diphenyl phosphate, dioctyl butyl phosphate, tricyclohexyl phosphate, tri-2-ethylhexyl phosphate, tridodecyl phosphate, di-2-ethylhexyl phenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecaneamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of from 10% to 80%), trimesic acid esters (e.g., tributyl trimesate), dodecyl benzene, diisopropylene naphthalene, phenols (e.g., 2,4-di-tert-amylphenol, 4-dodecyloxyphenol, 4-dodecyloxycarbonylphenol, 4 (4-dodecyloxy phenylsulfonyl)phenol), carboxylic acids (e.g., 2-(2,4-di-tert-amylphenoxybutyric acid, 2-ethoxyoctanedecanoic acid), and alkylphosphoric acids (e.g., di-2 (ethylhexyl) phosphoric acid, dipheylphosphoric acid). The high boiling organic solvent may be used in an amount of from 0.01 to 3 times, preferably from 0.01 to 1.0 times that of the oil-soluble dye by weight. When such a high boiling solvent is present, the dye and other volatile components can be difficultly precipitated during dispersion in the ink, providing the ink with an enhanced stability and hence an enhanced ejection stability.

These high boiling organic solvents may be used singly or in admixture of two or more thereof (e.g., tricresyl phosphate and dibutyl phthalate, trioctyl phosphate and di(2-ethylhexyl)sebacate, dibutyl phthalate and poly(N-t-butylacrylamide)).

For examples of compounds other than the aforementioned high boiling organic solvents to be used in the invention and/or methods for the synthesis of these high boiling organic solvents, reference can be made to U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, European Patents 276, 319A, 286,253A, 289,820A, 309,158A, 309,159A, 309, 160A, 509,311A, 510,576A, East German Patents 147,009, 157,147, 159,573, 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, and JP-A-4-346338.

The aforementioned high boiling organic solvents are used in an amount of from 0.01 to 3.0 times, preferably from 0.01 to 1.0 times that of the oil-soluble dye by weight.

In the invention, the oil-soluble dye and the high boiling organic solvent are used in the form of emulsion dispersion in an aqueous medium. During emulsion dispersion, a low boiling organic solvent may be used in some cases from the stand point of emulsifiability. As such a low boiling organic solvent there may be used an organic solvent having a boiling point of from about 30° C. to 150° C. at atmospheric pressure. Preferred examples of the organic solvent employable herein include esters (e.g., ethyl acetate, butyl acetate, ethyl propionate, β-ethoxyethyl acetate, methyl cellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone), and ethers (e.g., tetrahydrofurane, dioxane). However, the invention is not limited to these organic solvents, The emulsion dispersion is effected to disperse an oil phase having a dye dissolved in a high boiling organic solvent optionally mixed with a low boiling organic solvent in an aqueous phase mainly composed of water to make minute oil droplets of oil phase. During this procedure, additives such as surface active agent, wetting agent, dye stabilizer, emulsion stabilizer, preservative and antifungal agent described later may be added to either or both of the aqueous phase and the oil phase as necessary.

The emulsification is normally accomplished by adding the oil phase to the aqueous phase. Alternatively, a so-called emulsification method involving the dropwise addition of an aqueous phase to an oil phase is preferably used. Also in the case where the azo dye to be used in the invention is water-soluble and the additives are oil-soluble, the aforementioned emulsification method may be used.

The emulsion dispersion may be effected with various surface active agents. Preferred examples of the surface active agents employable herein include anionic surface active agents such as aliphatic acid salt, alkylsulfuric acid ester, alkylbenzenesulfonate, alkylnaphthalenesulfonate, dialkylsulfosuccinate, alkylphosphoric acid esters, naphthalenesulfonic acid-formalin condensate and polyoxyethylenealkylsulfuric acid ester, and nonionic surface active agents such as polyoxyethylenealkyl ether, polyoxyethylenealkylallyl ether, polyoxyethylenealiphatic acid ester, sorbitanaliphatic acid ester, polyoxyethylenesorbitanaliphatic acid ester, polyoxyethylenealkylamine, glycerinaliphatic acid ester and oxyethyleneoxypropylene block copolymer. Alternatively, SURFYNOLS (produced by Air Products & Chemicals Inc.), which are acetylene-based polyoxyethylene oxide surface active agents, are preferably used as well. Further, amine oxide-based amphoteric surface active agents such as N,N-dimethyl-N-alkylamine oxide may be used. Those listed as surface active agents in JP-A-59-157,636, pp. 37–38, and Research Disclosure No. 308119 (1989) may be used.

For the purpose of stabilizing the ink shortly after emulsification, the aforementioned surface active agents may be used in combination with a water-soluble polymer. As such a water-soluble polymer there may be preferably used a polyvinyl alcohol, polyvinyl pyrrolidone, polyethylene oxide, polyacrylic acid, polyacrylamide or copolymer thereof. Further, natural water-soluble polymers such as polysaccharides, casein and gelatin may be preferably used. For the purpose of stabilizing the dye dispersion, polyvinyls obtained by the polymerization of acrylic acid esters, methacrylic acid esters, vinyl esters, acrylamides, methacrylamides, olefins, styrenes, vinylethers or acrylonitriles, polyurethanes, polyesters, polyamides, polyureas, polycarbonates, etc., which are substantially insoluble in an aqueous medium, may be used. These polymers preferably have $—SO_3^-$ or $—COO^-$. In the case where these polymers substantially insoluble in an aqueous medium are used, they are preferably used in an amount of not greater than 20% by weight, preferably not greater than 10% by weight based on the amount of the high boiling organic solvent.

In the case where emulsion dispersion is effected to disperse the oil-soluble dye or high boiling organic solvent to make an aqueous ink, a particularly important factor is control over the particle size of the aqueous ink. In order to enhance the color purity or density during the formation of an image by ink injection, it is essential to reduce the average particle size. The volume-average particle diameter of the aqueous ink is preferably not greater than 1 $\mu$m, more preferably from 5 nm to 100 nm.

The measurement of the volume-average particle diameter and the particle size distribution of the dispersed particles can be easily accomplished by any known method such as static light scattering method, dynamic light scattering method, centrifugal sedimentation method and method as disclosed in "Jikken Kagaku Koza (Institute of Experimental Chemistru)", 4th ed., pp. 417–418. For example, measurement can be easily carried out by diluting the ink with distilled water such that the particle concentration in the ink reaches 0.1% to 1% by weight, and then subjecting the solution to measurement using a commercially available volume-average particle diameter measuring instrument (e.g., Microtrack UPA (produced by NIKKISO CO., LTD.). Further, dynamic light scattering method utilizing laser doppler effect is particularly preferred because it is capable of measuring even small particle size.

The term "volume-average particle diameter" as used herein is meant to indicate average particle diameter weighted with particle volume, which is obtained by dividing the sum of the product of the diameter and the volume of individual particles in the aggregate of particles by the total volume of the particles. For the details of volume-average particle diameter, reference can be made to Souichi Muroi, "Koubunshi Ratekkusuno Kagaku (Chemistry of Polymer Letexes)", Koubunshi Kankokai, page 119.

It was also made obvious that the presence of coarse particles has an extremely great effect on the printing properties. In other words, coarse particles clog the head nozzle. Even if coarse particles don't go so far as to clog the head nozzle, the ink cannot be ejected or can be deviated when ejected, giving a serious effect on the printing properties. In order to prevent this trouble, it is important to keep the number of particles having a diameter of not smaller than 5 $\mu$m and not smaller than 1 $\mu$m in the resulting ink to 10 or less and 1,000 or less, respectively.

The removal of these coarse particles can be accomplished by any known method such as centrifugal separation method and precision filtration method. The separation step may be effected shortly after emulsion dispersion or shortly before the filling of the emulsion dispersion comprising various additives such as wetting agent and surface active agent in the ink cartridge.

As an effective unit for reducing the average particle diameter of particles and eliminating coarse particles there may be used a mechanical emulsifier.

As such an emulsifier there may be used any known device such as simple stirrer, impeller type agitator, in-line agitator, mill type agitator (e.g., colloid mill) and ultrasonic agitator. The use of a high pressure homogenizer is particularly preferred.

For the details of the mechanism of high pressure homogenizer, reference can be made to U.S. Pat. No. 4,533,254, JP-A-6-47264, etc. Examples of commercially available high pressure homogenizers include Gaulin homogenizer (produced by A. P. V GAULIN INC.), microfluidizer (produced by MICROFLUIDEX INC.) and altimizer (produced by SUGINO MACHINE LIMITED).

In recent years, a high pressure homogenizer having a mechanism for atomizing a material in a ultrahigh pressure jet stream as disclosed in U.S. Pat. No. 5,720,551 is particularly useful in the emulsion dispersion of the invention. An example of the emulsifier using a ultrahigh jet stream is De BEE2000 (produced by BEE INTERNATIONAL LTD.).

The pressure at which emulsion is carried out by a high pressure emulsion disperser is not lower than 50 MPa, preferably not lower than 60 MPa, more preferably not lower than 180 MPa.

For example, the combined use of two or more emulsifiers as in a method involving the emulsification by an agitated emulsifier followed by the passage through a high pressure homogenizer is particularly preferred. Alternatively, a method is preferably used which comprises effecting the emulsion of the material using such an emulsifier, adding additives such as wetting agent and surface active agent, and then passing the ink composition again through the high pressure homogenizer before being filled in the cartridge.

In the case where the dye composition comprises a low boiling organic solvent incorporated therein in addition to the high boiling organic solvent, it is preferred to remove the low boiling organic solvent from the standpoint of emulsion stability and safety/hygiene. The removal of the low boiling solvent can be accomplished by any known method such as evaporation method, vacuum evaporation method and ultrafiltration method depending on the solvent to be removed. The step of removing the low boiling organic solvent is preferably effected as rapidly as possible shortly after emulsification.

For the details of the method for the preparation of the ink for ink jet recording, reference can be made to JP-A-5-148436, JP-A-5-295312, JP-A-7-97541, JP-A-7-82515 and JP-A-7-118584. These methods can apply also to the preparation of the ink to be incorporated in the ink set for ink jet recording according to the invention.

The ink for ink jet recording to be incorporated in the ink set of the invention may comprise properly selected additives incorporated therein in a proper amount such as drying inhibitor for preventing the clogging of the ejection nozzle with dried ink, penetration accelerator for helping the ink to penetrate in the page, ultraviolet absorber, oxidation inhibitor, viscosity adjustor, surface tension adjustor, dispersant, dispersion stabilizer, antifungal agent, rust preventive, pH adjustor, anti-foaming agent and chelating agent.

As the drying inhibitor there is preferably used a water-soluble organic solvent having a lower vapor pressure than water. Specific examples of the water-soluble organic solvent include polyvalent alcohols such as ethylene glycol, propylene glycol, diethylene glycol, polyethylene glycol, thiodiglycol, dithiodigycol, 2-methyl-1,3-propanediol, 1,2,6-hexanetriol, acetylene glycol derivative, glycerin and trimethylolpropane, lower alkylethers of polyvalent alcohol such as ethylene glycolmonomethyl(or ethyl)ether, diethylene glycol monomethyl(or ethyl)ether and triethylene glycol monoethyl(or butyl)ether, heterocyclic compounds such as 2-pyrrolidone, N-methyl-2-pyrrolidone, 1,3-dimethyl-2-imidazolidinone and N-ethylmorpholine, sulfur-containing compounds such as sulfolane, dimethylsulfoxide and 3-sulfolene, polyfunctional compounds such as diacetone alcohol and diethanolamine, and urea derivatives. Preferred among these water-soluble organic solvents are polyvalent alcohols such as glycerin and diethylene glycol. These drying inhibitors may be used singly or in combination of two or more thereof. These drying inhibitors are preferably incorporated in the ink in an amount of from 10% to 50% by weight.

Examples of the penetration accelerator employable herein include alcohols such as ethanol, isopropanol, butanol, di(tri)ethylene glycol monobutyl ether and 1,2-hexanediol, sodium laurylsulfate, sodium oleate, and non-ionic surface active agents. These penetration accelerators can exert a sufficient effect when incorporated in the ink in an amount of from 10% to 30% by weight. These penetration accelerators are preferably used in an amount such that no printing run or print through occurs.

Examples of the ultraviolet absorber to be used to enhance the preservability of the image formed by the ink for ink set according to the invention include benzotriazole-based compounds as disclosed in JP-A-58-185677, JP-A-61-190537, JP-A-2-782, JP-A-5-197075 and JP-A-9-34057, benzophenone-based compounds as disclosed in JP-A-46-2784, JP-A-5-194483 and U.S. Pat. No. 3,214,463, cinnamic acid-based compounds as disclosed in JP-B-48-30492, JP-A-56-21141 and JP-A-10-88106, triazine-based compounds as disclosed in JP-A-4-298503, JP-A-8-53427, JP-A-8-239368, JP-A-10-182621 and JP-T-1-543210, compounds as disclosed in Research Disclosure No. 24239, and compounds which absorb ultraviolet rays to emit fluorescence, i.e., so-called fluorescent brighteners, such as stilbene-based and benzoxazole-based compounds.

As the oxidation inhibitor to be used to enhance the image preservability there may be used any of various organic and metal complex-based discoloration inhibitors. Examples of the organic discoloration inhibitors include hydroquinones, alkoxyphenols, dialkoxyphenols, phenols, anilines, amines, indanes, chromans, alkoxyanilines, and heterocyclic compounds. Examples of the metal complex-based discoloration inhibitors include nickel complex, and zinc complex. Specific examples of these oxidation inhibitors include compounds listed in the patents cited in Research Disclosure No. 18716, Articles VI-I and J, Research Disclosure No. 15162, Research Disclosure No. 18716, left column, page 650, Research Disclosure No. 36544, page 527, Research Disclosure No. 307105, page 872, and Research Disclosure No. 15162, and compounds included in the general formula and examples of representative compounds listed in JP-A-62-215272, pp. 127–137.

Examples of the antifungal agent to be incorporated in the ink include sodium dehydroacetate, sodium benzoate, sodium pyridinethione-1-oxide, ethyl p-hydroxybenzoate, 1,2-benzoisothiazoline-3-one, and salts thereof. These antifungal agents are preferably incorporated in the ink in an amount of from 0.02% to 5.00% by weight.

For the details of these antifungal agents, reference can be made to "Bokin Bobizai Jiten (Dictionary of Anti-bacterial and Antifungal Agents")", compiled by Dictionary Compilation Committee of The Society for Antibacterial and Antifungal Agents, Japan.

Examples of the rust preventive employable herein include acidic sulfites, sodium thiosulfate, ammonium thioglycolate, diisopropylammonium nitrite, pentaerthyritol tetranitrate, dicyclohexylamonium nitrite, and benzotriazole. These rust preventives are preferably incorporated in the ink in an amount of from 0.02% to 5.00% by weight.

The pH adjustor to be incorporated in the ink for ink set of the invention is preferably used for the purpose of adjusting the pH value of the ink, providing dispersion stability or like purposes. It is preferred that the pH value of the ink be adjusted to a range of from 4 to 11 at 25° C. When the pH value of the ink falls below 4, the resulting dye composition exhibits a deteriorated solubility, causing nozzle clogging. On the contrary, when the pH value of the ink exceeds 11, the resulting ink tends to exhibit a deteriorated water resistance. Examples of the pH adjustor include basic pH adjustors such as organic base and inorganic alkali, and acidic pH adjustors such as organic acid and inorganic acid.

Examples of the basic compounds employable herein include inorganic compounds such as sodium hydroxide, potassium hydroxide, sodium carbonate, potassium carbonate, sodium hydrogencarbonate, potassium hydrogencarbonate, sodium acetate, potassium acetate, sodium phosphate and disodium hydrogenphosphate, and organic bass such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine.

Examples of the acidic compounds employable herein include inorganic compounds such as hydrochloric acid, sulfuric acid, phosphoric acid, boric acid, sodium hydrogensulfate, potassium hydrogensulfate, potassium dihydrogenphosphate and sodium dihydrogenphosphate, and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolic acid and quinolinic acid.

The various inks constituting the ink set each have an electric conductance of from 0.01 to 10 S/m. The preferred electric conductance of these inks ranges from 0.05 to 5 S/m.

The measurement of electric conductance can be accomplished by en electrode method using a commercially available saturated potassium chloride.

The electric conductance of the inks can be controlled mainly by the ionic concentration of the aqueous solution. In the case where the salt concentration is high, desalting may be effected using a ultrafiltration membrane or the like. Further, in the case where salts or the like are added to adjust electric conductance, various organic or inorganic salts may be added.

Examples of the inorganic salts employable herein include potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, disodium hydrogenphosphate, boric acid, potassium dihydrogenphosphate and sodium dihydrogenphosphate. Examples of the organic salts employable herein include organic compounds such as sodium acetate, potassium acetate, potassium tartrate, sodium tartrate, sodium benzoate, potassium benzoate, sodium p-toluenesultonate, potassium saccharinate, sodium phthalate and sodium picolate.

Alternatively, the selection of the aqueous media listed below makes it possible to adjust the electric conductance of the inks.

The ink of the invention exhibits a viscosity of from 1 to 20 mPa·s, more preferably from 2 to 15 mPa·s, particularly from 2 to 10 mPa·s at 25° C. When the viscosity of the ink exceeds 30 mPa·s, the resulting recorded image can be fixed only at a reduced rate. Further, the resulting ink exhibits a deteriorated ejectability. On the contrary, when the viscosity of the ink falls below 1 mPa·s, the resulting recorded image runs and thus exhibits a reduced quality.

The adjustment of viscosity can be arbitrarily carried out by controlling the added amount of the ink solvent. Examples of the ink solvent employable herein include glycerin, diethylene glycol, triethanolamine, 2-pyrrolidone, diethylene glycol monobutyl ether, and triethylene glycol monobutyl ether.

Further, a viscosity adjustor may be used. Examples of the viscosity adjustor employable herein include celluloses, water-soluble polymers such as polyvinyl alcohol, and non-ionic surface active agents. For the details of these viscosity adjustors, reference can be made to "Nendo Chousei Gijutsu (Technology for Viscosity Adjustment)", Gijutsu Joho Kyoukai, Article 9, 1999, and "Inku Jetto Purintayou Kemikaruzu (98 zouho)—Zairyou no Kaihatsu Doko/Tenbo Chousa (Chemicals for Ink Jet printer (98 enlarged edition)—Research on Trend and View of Development of Materials)", CMC, pp. 162–174, 1997.

For the details of the method for the measurement of viscosity of liquid, reference can be made to JIS Z8803. In practice, however, the viscosity of liquid can be simply measured using a commercially available viscometer. Examples of the rotary viscometer include Type B viscometer and Type E viscometer produced by Tokyo Keiki Kogyo K.K. In the invention, a Type VM-100a-L vibration viscometer (produced by YAMAICHI ELECTRONICS CO., LTD.) was used to measure viscosity at 25° C. The unit of viscosity is P·s. In practice, however, mPa·s is used.

The surface tension, regardless of which it is static or dynamic, of the ink to be used in the invention is preferably from 20 to not greater than 50 mN/m, more preferably from 20 to not greater than 40 mN/m at 25° C. When the surface tension of the ink exceeds 50 mN/m, the resulting ink exhibits a drastic deterioration in print quality such as ejection stability and resistance to running and whisker during color mixing. On the contrary, when the surface tension of the ink falls below 20 mN/m, the resulting ink can be attached to hard surface when ejected, causing defective printing.

The aforementioned various cationic, anionic and non-ionic surface active agents may be added also for the purpose of adjusting surface tension. For this purpose as well, the added amount of these surface active agents preferably fall within the range defined above. Two or more of these surface-active agents may be used in combination.

Known examples of the static surface tension measuring method include capillary rise method, dropping method, and ring method. In the invention, as the static surface tension measuring method there is used a perpendicular plate method.

When a thin glass or platinum plate is hanged partially dipped in a liquid, surface tension of the liquid acts downward along the length of the plate in contact with the liquid. The surface tension is measured by balancing this force by a upward force.

As dynamic surface tension measuring methods there are known vibration jet method, meniscus dropping method and maximum bubble pressure method as disclosed in "Shinjikken Kagaku Koza (New Institute of Experimental Chemistry), 18th ed., Kaimen to Koroido (Interface and Colloid)", Maruzen, pp. 69–90 (1977). Further, a liquid film destruction method is known as disclosed in JP-A-3-2064. In the invention, as the dynamic viscosity measuring method there is used a differential bubble pressure method. The principle and method of effecting this measuring method will be described hereinafter.

When bubbles are formed in a solution which has been stirred to uniformity, a new gas-liquid interface is produced. Surface active agent molecules in the solution then gather on the surface of water at a constant rate. The bubble rate (rate of formation of bubbles) is changed. As the formation rate decreases, more surface active agent components gather on the surface of bubbles, reducing the maximum bubble pressure shortly before the burst of bubbles. Thus, the maximum bubble pressure (surface tension) with respect to bubble rate can be detected. As a method for the measurement of dynamic surface tension there is preferably used a method which comprises forming bubbles in a solution using a large probe and a small probe, measuring the differential pressure of the two probes in the state of maximum bubble pressure, and then calculating the dynamic surface tension from the differential pressure.

The content of no-volatile components in the ink of the invention is preferably from 10% to 70% by weight based on the total amount of the ink from the standpoint of enhancement of ejection stability of ink, printed image quality and various fastnesses of image and elimination of running of printed image and stickiness of printed surface, more preferably from 20% to 60% by weight from the standpoint of enhancement of ejection stability of ink and elimination of running of printed image.

The term "non-volatile component" as used herein is meant to indicate a liquid, solid or polymer component having a boiling point of not lower than 150° C. at 1 atm. Examples of the non-volatile components to be incorporated in the ink for ink jet recording include dyes, and high boiling solvents, and polymer latexes, surface active agents, dye stabilizers, antifungal agents and buffers which are optically added. Most of these non-volatile components but dye stabilizers deteriorate the dispersion stability of the ink. Further, these non-volatile components are still present on the ink jet image-receiving paper after printing, inhibiting the stabilization of dyes by association on the image-receiving paper and hence deteriorating various fastnesses of the image area and worsening the image running at high temperature and humidity.

In the invention, the ink may comprise a polymer compound incorporated therein. The term "polymer compound" as used herein is meant to indicate all polymer compounds having a number-average molecular weight of not smaller than 5,000 contained in the ink. Examples of these polymer compounds include water-soluble polymer compounds substantially soluble in an aqueous medium, water-dispersible polymer compounds such as polymer latex and polymer emulsion, and alcohol-soluble polymer compounds soluble in polyvalent alcohols used as auxiliary solvents. All polymer compounds are included in the polymer compounds of the invention so far as they can be substantially uniformly dissolved or dispersed in the ink solution.

Specific examples of the water-soluble polymer compounds employable herein include water-soluble polymers such as polyvinyl alcohol, silanol-modified polyvinyl alcohol, carboxymethyl cellulose, hydroxyethyl cellulose, polyvinyl pyrrolidone, polyalkylene oxide (e.g., polyethylene oxide, polypropylene oxide) and polyalkylene oxide derivative, natural water-soluble polymers such as polysaccharide, starch, cationated starch, casein and gelatin, aqueous acrylic resins such as polyacrylic acid, polyacrylamide and copolymer thereof, aqueous alkyd resins, and water-soluble compounds which have —$SO_3^-$ or —$COO^-$ group and thus are substantially soluble in an aqueous medium.

Examples of the polymer latexes include styrene-butadiene latexes, styrene-acryl latexes, and polyurethane latexes. Examples of the polymer emulsions include acryl emulsions.

These water-soluble polymer compounds may be used singly or in combination of two or more thereof.

Such a water-soluble polymer compound is used as a viscosity adjustor to adjust the ink viscosity to a value falling within a range that provides the ink a good ejectability. When the added amount of the water-soluble polymer compound is too great, the resulting ink exhibits too high a viscosity that deteriorates the ejection stability of the ink solution. Thus, when time elapses, the ink undergoes precipitation, causing clogging of the nozzle.

The added amount of the polymer compound to be used as a viscosity adjustor depends on the molecular weight of the polymer compound added (The greater the molecular weight of the polymer compound to be added is, the smaller is the added amount thereof) but is normally from 0% to 5% by weight, preferably from 0% to 3% by weight, more preferably from 0% to 1% by weight based on the total amount of the ink composition.

In the invention, as the dispersant and dispersion stabilizer there may be used the aforementioned various cationic, anionic and nonionic surface active agents as necessary. As the anti-forming agent there may be used a fluorine-based or silicone-based compound or a chelating agent such as EDTA as necessary.

The recording paper and recording film to be used in the ink jet recording method to which the invention is applied will be described hereinafter. As the support in the recording paper or recording film there may be used one obtained by processing a chemical pulp such as LBKP and NBKP, a mechanical pulp such as GP, PGW, RMP, TMP, CTMP, CMP and CGP, used paper pulp such as DIP or the like, optionally mixed with known additives such as pigment, binder, sizing agent, fixing agent, cationic agent and paper strength improver, through various paper machines such as foundrinier paper machine and cylinder paper machine. As the support there may be used either a synthetic paper or plastic film sheet besides these support materials. The thickness of the support is preferably from 10 µm to 250 µm. The basis weight of the support is preferably from 10 to 50 g/m².

An image-receiving layer and a back coat layer may be provided on the support directly or with a size press or anchor coat layer of starch, polyvinyl alcohol or the like interposed therebetween to prepare a material for receiving the ink of the invention. The support may be further subjected to leveling using a calendering machine such as machine calender, TG calender and soft calender.

As the support there is preferably used a paper or plastic film laminated with a polyolefin (e.g., polyethylene, polystyrene, polybutene, copolymer thereof) or polyethylene terephthalate on both sides thereof. The polyolefin preferably comprises a white pigment (e.g., titanium oxide, zinc oxide) or a tinting dye (e.g., cobalt blue, ultramarine, neodymium oxide) incorporated therein.

The image-receiving layer to be provided on the support comprises a porous material or aqueous binder incorporated therein. The image-receiving layer also preferably comprises a pigment incorporated therein. As such a pigment there is preferably used a white pigment. Examples of the white pigment employable herein include inorganic white pigments such as calcium carbonate, kaolin, talc, clay, diatomaceous earth, synthetic amorphous silica, aluminum silicate, magnesium silicate, calcium silicate, aluminum hydroxide, aluminau, lithopone, zeolite, barium sulfate, calcium sulfate, titanium dioxide, zinc sulfate and zinc carbonate, and organic pigments such as styrene-based pigment, acrylic pigment, urea resin and melamine resin. Particularly preferred among these pigments are porous inorganic white pigments. In particular, synthetic amorphous silica having a large pore area, etc. are preferred. As the synthetic amorphous silica there may be also used anhydrous silicate obtained by dry method (gas phase method) or hydrous silicate obtained by wet method.

Specific examples of the recording paper comprising the aforementioned pigments incorporated in the image-receiving layer include those disclosed in JP-A-10-81064, JP-A-10-119423, JP-A-10-157277, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-2093, JP-A-174992, JP-A-11-192777, and JP-A-2001-301314.

Examples of the aqueous binder to be incorporated in the image-receiving layer include water-soluble polymers such as polyvinyl alcohol, silanol-modified polyvinyl alcohol, starch, cationated starch, casein, gelatin, carboxymethyl cellulose, hydroxyethyl cellulose, polyvinyl pyrrolidone, polyalkylene oxide and polyalkylene oxide derivative, and water-dispersible polymers such as styrene butadiene latex and acryl emulsion. These aqueous binders may be used singly or in combination of two or more thereof. In the invention, particularly preferred among these aqueous binders are polyvinyl alcohol and silanol-modified polyvinyl alcohol from the standpoint of adhesion to pigment and exfoliation resistance of ink-receiving layer.

The ink-receiving layer may comprise a mordant, a waterproofing agent, a light-resistance improver, a gas resistance improver, a surface active agent, a film hardener and other additives incorporated therein besides the pigments and aqueous binders.

The mordant to be incorporated in the image-receiving layer is preferably passivated. To this end, a polymer mordant is preferably used.

For the details of the polymer mordant, reference can be made to JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant disclosed in JP-A-1-161236, pp. 212 to 215. The use of the polymer mordant disclosed in the above cited patent makes it possible to obtain an image having an excellent quality and hence improve the light-resistance of the image.

The waterproofing agent can be used to render the image waterproof. As such a waterproofing agent there is preferably used a cationic resin in particular. Examples of such a cationic resin include polyamide polyamine epichlorohydrin, polyethylenimine, polyamine sulfone, dimethyl diallyl ammonium chloride polymer, and cation polyacrylamide.

The content of such a cation resin is preferably from 1% to 15% by weight, particularly from 3% to 10% by weight based on the total solid content of the ink-receiving layer.

Examples of the light-resistance improver and gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinic acid compounds, saccharides, water-soluble reducing compounds, organic acids, inorganic acids, hydroxyl-containing organic acids, benzotriazole compounds, benzophenone compounds, triazine compounds, heterocyclic compounds, water-soluble metal salts, organic metal compounds, and metal complexes.

Specific examples of these compounds include those disclosed in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258, and JP-A-11-321090.

The surface active agent acts as a coating aid, releasability improver, slipperiness improver or antistat. For the details of the surface active agent, reference can be made to JP-A-62-173463 and JP-A-62-183457.

An organic fluoro-compounds may be used instead of the surface active agent. The organic fluoro-compound is preferably hydrophobic. Examples of the organic fluoro-compound include fluorine-based surface active agents, oil-based fluorine compounds (e.g., fluorine-based oil), and solid fluorine-based compound resins (e.g., tetrafluoroethylene resin). For the details of the organic fluoro-compound, reference can be made to JP-B-57-9053 (8th to 17th columns), JP-A-61-20994, and JP-A-62-135826.

As the film hardener there may be used any of materials disclosed in JP-A-1-161236, page 222, JP-A-9-263036, JP-A-10-119423, and JP-A-2001-310547.

Other examples of additives to be incorporated in the image-receiving layer include pigment dispersants, thickening agents, antifoaming agents, dyes, fluorescent brighteners, preservatives, pH adjustors, matting agents, and film hardeners. There may be provided one or two ink-receiving layers.

The recording paper and recording film may comprise a back coat layer provided thereon. Examples of the components which can be incorporated in the back coat layer include white pigments, aqueous binders, and other components.

Examples of the white pigments to be incorporated in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, hydrated halloysite, magnesium carbonate and magnesium hydroxide, and organic pigments such as styrene-based plastic pigment, acrylic plastic pigment, polyethylene, microcapsule, urea resin and melamine resin.

Examples of the aqueous binder to be incorporated in the back coat layer include water-soluble polymers such as styrene/maleate copolymer, styrene/acrylate copolymer, polyvinyl alcohol, silanol-modified polyvinyl alcohol, starch, cationated starch, casein, gelatin, carboxymethyl cellulose, hydroxyethyl cellulose and polyvinylpyrrolidone, and water-dispersible polymers such as styrenebutadiene latex and acryl emulsion. Examples of other components to be incorporated in the back coat layer include antifoaming agents, foaming inhibitors, dyes, fluorescent brightening agents, preservatives, and waterproofing agents.

The layers (including back layer) constituting the ink jet recording paper and film may comprise a fine dispersion of polymer incorporated therein. The fine dispersion of polymer is used for the purpose of improving physical properties of film, e.g., stabilizing dimension, inhibiting curling, adhesion and film cracking. For the details of the fine dispersion of polymer, reference can be made to JP-A-62-245258, JP-A-62-1316648, and JP-A-62-110066. The incorporation of a fine dispersion of polymer having a glass transition temperature as low as not higher than 40° C. in a layer containing a mordant makes it possible to prevent the cracking or curling of the layer. The incorporation of a fine dispersion of polymer having a high glass transition temperature, too, in the back layer makes it possible to prevent the curling of the back layer.

The ink jet recording method to which the ink set of the invention is applied is not limited. The ink set of the invention may be used in any known recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink.

The ink for ink jet recording method of the invention can be used for purposes other than inkjet recording. These purposes include display image material, image-forming material for indoor decoration material, and image-forming material for outdoor decoration material.

Examples of the display image material include various materials such as poster, wall paper, small decoration articles (ornament, doll, etc.), commercial flyer, wrapping paper, wrapping material, paper bag, vinyl bag, packaging material, signboard, picture drawn or attached to the side of traffic facilities (automobile, bus, train, etc.) and clothing with logogram. In the case where the dye of the invention is used as a material for forming a display image, the term "image" as used herein means an image in a narrow sense as well as all dye patterns perceivable by human being such as abstract design, letter and geometrical pattern.

The term "indoor decoration material" as used herein is meant to include various materials such as wall paper, small decoration articles (ornament, doll, etc.), members of lighting fixture, members of furniture and design members of floor and ceiling. In the case where the dye of the invention is used as an image-forming material, the term "image" as used herein means an image in a narrow sense as well as all dye patterns perceivable by human being such as abstract design, letter and geometrical pattern.

The term "outdoor decoration material" as used herein is meant to include various materials such as wall material, roofing material, signboard, gardening material, small outdoor decoration articles (ornament, doll, etc.) and members of outdoor lighting fixture. In the case where the dye of the invention is used as an image-forming material, the term "image" as used herein means an image in a narrow sense as well as all dye patterns perceivable by human being such as abstract design, letter and geometrical pattern.

Examples of the media on which patterns are formed in these uses include various materials such as paper, fiber, cloth (including nonwoven cloth), plastic, metal and ceramics. Dyeing can be carried out by mordanting or printing. Alternatively, a dye can be fixed in the form of reactive dye having a reactive group incorporated therein. Preferred among these dyeing methods is mordanting.

During the production of the ink, dissolution of additives such as dye may be assisted by sound vibration.

Sound vibration is effected to prevent the ink from forming bubbles when given pressure by the recording head. In some detail, a sound energy which is not smaller than that given by the recording head is given during the production of the ink to remove bubbles.

Sound vibration normally indicates ultrasonic wave having a frequency of not lower than 20 kHz, preferably not lower than 40 kHz, more preferably 50 kHz. The energy which is given to the ink solution by sound vibration is normally not lower than $2 \times 10^7$ J/m$^3$, preferably not lower than $5 \times 10^7$ J/m$^3$, more preferably not lower than $1 \times 10^8$ J/m$^3$. The time during which sound vibration is given to the ink solution is normally from about 10 minutes to 1 hour.

Sound vibration can be effected at any time after the provision of the dye to the media to exert the desired effect. Sound vibration may be effected also after the storage of the finished ink to exert the desired effect. However, it is preferred that sound vibration be given during dissolution and/or dispersion of the dye in the media to exert a higher defoaming effect and accelerate the dissolution and/or dispersion of the dye in the media.

In some detail, the step at which at least sound vibration is given may be effected at any time during or after the dissolution and/or dispersion of the dye in the media. In other words, the step at which at least sound vibration is given may be arbitrarily effected once or more times between after the production of the ink and the completion of the product.

In a preferred embodiment, the step of dissolving and/or dispersing the dye in the medium consists of a step of dissolving the dye in part of the medium and a step of adding the rest of the medium to the solution. Preferably, sound vibration is given at at least any one of the two steps. More preferably, at least sound vibration is given at the step of dissolving the dye in part of the medium.

The step of adding the rest of the medium to the solution may be a single step or may consist of a plurality of steps.

During the production of the ink according to the invention, heat deaeration or vacuum deaeration is preferably effected to enhance the effect of removing bubbles from the ink. Heat deaeration or vacuum deaeration is preferably effected at the same time with or after the step of adding the rest of the medium to the solution.

Examples of the unit for generating sound vibration at the step of giving sound vibration include known devices such as ultrasonic dispersing machine.

In the process for the preparation of the ink of the invention, it is important to effect a step of removing dust as solid content by filtration after the preparation of the ink. For this job, a filter is used. As such a filter there is used a filter having an effective pore diameter of not greater than 1 μm, preferably from not smaller than 0.05 μm to not greater than 0.3 μm, particularly from not smaller than 0.25 μm to not greater than 0.3 μm. As the filter material there may be used any of various known materials, In the case where a water-soluble dye ink is used, a filter prepared for aqueous solvent is preferably used. In particular, a filter made of a polymer material which can difficultly give dust is preferably used. Filtration may be accomplished by pumping the solution through the filter or may be effected under pressure or reduced pressure.

Filtration is often accompanied by the entrapment of air in the solution. Bubbles due to air thus entrapped can often cause disturbance in image in the ink jet recording. Thus, the deaeration step is preferably provided separately. Deaeration may be accomplished by allowing the solution thus filtered to stand or by the use of various methods such as ultrasonic deaeration and vacuum deaeration using a commercially available apparatus. The ultrasonic deaeration maybe effected preferably for about 30 seconds to 2 hours, more preferably for about 5 minutes to 1 hour.

These jobs are preferably effected in a space such as clean room and clean bench to prevent the contamination by dust. In the invention, these jobs are preferably effected in a space having a cleanness degree of not greater than 1,000 class. The term "cleanness degree" as used herein is meant to indicate the value measured by a dust counter.

The volume of the droplet to be ejected onto the ink recording material of the invention is from not smaller than 0.1 pl to not greater than 100 pl, preferably from not smaller than 0.5 pl to not greater than 50 pl, particularly from not smaller than 2 pl to not greater than 50 pl.

In the invention, the ink jet recording method is not limited. The invention can be applied to any known ink jet recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink. The volume of the ink droplet to be ejected is controlled mainly by the print head.

For example, in the thermal ink jet recording system, the volume of the ink droplet to be ejected can be controlled by the structure of the print head. In some detail, the ink droplet can be ejected in a desired size by properly changing the size of the ink chamber, heating zone and nozzle. Even in the thermal inkjet recording system, the ink droplet can be ejected in a plurality of sizes by using a plurality of print heads comprising heating zones and nozzles having different sizes.

In the case of drop-on-demand system using a piezoelectric element, the volume of the ink droplet to be ejected can be varied due to the structure of the print head as in the thermal ink jet recording system. As described later, however, by controlling the waveform of the driving signal for driving the piezoelectric element, the ink droplet can be ejected in a plurality of sizes by the same structure of print head.

In the invention, the frequency at which the ink droplet is ejected onto the recording material is not lower than 1 kHz.

In order to record a high quality image as in photographic system, it is necessary that the ejection density be not smaller than 600 dpi (number of dots per inch) to reproduce an image having a high sharpness with small ink droplets.

In the system involving the ejection of the ink droplet through a head having a plurality of nozzles, on the other hand, the number of heads which can be driven at the same time in a type of recording system involving the cross movement of the recording paper and the head is from scores to about 200. Even in a type having heads called line heads fixed therein, the number of heads which can be driven at the same time is limited to hundreds. This is because the driving electric power is limited or the heat generated on the head gives an adverse effect on the image thus formed, making it impossible to drive a large number of head nozzles at the same time.

By raising the driving frequency, the recording rate can be raised.

The control over the ejection frequency in the case of thermal ink jet recording system can be accomplished by controlling the frequency of the head driving signal for heating the head.

In the piezoelectric system, the control over the ejection frequency can be accomplished by controlling the frequency of the signal for driving the piezoelectric element.

The driving of piezoelectric element will be described hereinafter. The image signal to be printed is made as follows. In some detail, the size of ink droplet to be ejected, the ejection rate and the ejection frequency are determined at the printer control. Thus, the signal for driving the print head is developed. The driving signal thus developed is then supplied into the print bead. The size of ink droplet to be ejected, the ejection rate and the ejection frequency are controlled by the signal for driving the piezoelectric element. The size of ink droplet to be ejected and the ejection rate are determined by the shape and amplitude of the driving waveform and the ejection frequency is determined by the repetition frequency of the signal.

When the ejection frequency is predetermined to 10 kHz, the head is driven every 100 microseconds. One line of recording is finished in 400 microseconds. By predetermining the moving rate of the recording paper such that it moves at a rate of 1/600 inch or about 42 micrometers per 400 microseconds, printing can be made at a rate of one sheet per 1.2 seconds.

The configuration of the printing device to which the invention can be applied is preferably in an embodiment disclosed in JP-A-11-170527. The configuration of the ink cartridge to which the invention can be applied is preferably in an embodiment disclosed in JP-A-5-229133. The configuration of the suction system and the cap covering the print head 28 are preferably in an embodiment disclosed in JP-A-7-276671. It is preferred that a filter for evacuating bubbles as disclosed in JP-A-9-277552 be provided in the vicinity of the head.

The surface of the nozzle is preferably subjected to water repellent treatment as disclosed in Japanese Patent No. 2001-016738. The invention may be used with a printer connected to computer. The invention may be used with an apparatus dedicated for printing photograph.

In the ink jet recording method of the invention, the ink set for ink jet recording comprising at least one of the dyes represented by the general formulae (I-a) and (I-b) dissolved and/or dispersed in an aqueous medium preferably operates in such a manner that the ink droplet is ejected onto the recording material at an average rate of not smaller than 2 m/sec, preferably not smaller than 5 m/sec.

The control over the ejection rate is accomplished by controlling the form and amplitude of the signal for driving the head.

By using a plurality of driving waveforms properly, ink droplets having a plurality of sizes can be ejected by the same head.

EXAMPLES

The invention will be further described in the following examples, but the invention is not construed as being limited thereto.

Example 1

<Preparation of Dark Yellow Ink>

To the following components was added deionized water to make 1 l. The mixture was then heated to a temperature of from 30° C. to 40° C. with stirring for 1 hour. Thereafter, the solution was adjusted to pH 8.8 with a 1 mol/l hydrochloric acid or potassium hydroxide, and then filtered through a microfilter having an average pore diameter of 0.2 µm under reduced pressure to prepare a dark yellow ink solution DY-1.

| | |
|---|---|
| C.I. Direct Yellow 132 | 20.5 g/l |
| C.I. Direct Yellow 86 | 6.0 g/l |
| Inventive magenta dye (exemplary compound a-36) | 6.0 g/l |
| C.I. Direct Blue 199 | 8.0 g/l |
| Diethylene glycol | 150 g/l |
| Urea | 37 g/l |
| Glycerin | 130 g/l |
| Triethylene glycol monobutyl ether | 130 g/l |
| Triethanolamine | 6.9 g/l |
| Benzotriazole | 0.08 g/l |
| PROXEL XL2 | 3.5 g/l |
| Surfynol STG | 10 g/l |

Subsequently, the foregoing ink thus prepared was mounted on the dark yellow portion of the cartridge of a Type PM920C ink jet printer (produced by EPSON CO., LTD.) by which an image was then printed on a Type EX ink jet paper photographic paper (produced by Fuji Photo Film Co., Ltd.) to evaluate the image fastness thereof.

For the evaluation of image preservability, a stepwise patch sample made of a patch having a stepwise gradation of dark yellow density was prepared. This sample was then subjected to the following evaluation.

(1) For the evaluation of light fastness, the density $C_i$ of an image printed on the sample was measured using a reflection densitometer (X-rite 310). The sample was then irradiated with light at an image surface illuminance of 85 klux from a high voltage xenon lamp (Type Ci65A5kv weatherometer, produced by Atlas Electric Devices, Inc.) through a pyrex glass having a thickness of 6.5 mm for 10 days. The sample thus irradiated was then measured for image density $C_f$ to determine the percent remaining of dye $C_f/C_i \times 100$ which was then used for evaluation. For the evaluation of percent remaining of dye, the reflection density was evaluated according to three points of yellow density, i.e., 1, 1.5 and 2 as measured through a status A blue filter (hereinafter referred to as "B filter") Those showing a percent magenta dye remaining of not smaller than 70% in the dark yellow ink (calculated from the measurements obtained with status A green filter light, i.e., G filter light) at any density were ranked A. Those showing a percent magenta dye remaining of less than 70% at one or two density points were ranked B. Those showing a percent magenta dye remaining of less than 70% at all densities were ranked C.

(2) For the evaluation of heat fastness, the sample was forcedly aged at a temperature of 80° C. and 70%RH for 10 days. The sample was measured for density using the aforementioned Type X-rite 310 reflection densitometer before and after aging to determine the percent dye remaining which was then evaluated. The percent dye remaining was then evaluated at three reflection density points, i.e., 1, 1.5 and 2 as calculated in terms of yellow measured through a B filter. Those showing a percent magenta dye remaining of not smaller than 90% in the dark yellow ink (calculated from the measurements obtained with a G filter) at any density were ranked A. Those showing a percent magenta dye remaining of less than 90% at one or two density points were ranked B. Those showing a percent magenta dye remaining of less than 90% at all densities were ranked C. Those showing a remarkable decoloration were ranked D.

(3) For the evaluation of ozone gas resistance, the sample on which an image had been formed was allowed to stand in a testing vessel the ozone gas concentration of which had been adjusted to 0.5 ppm for 7 days. The sample was measured for image density (G filter optical density) using a Type X-Rite 310TR reflection densitometer before and after aging to determine the percent dye remaining which was then evaluated. The reflection density was measured at three yellow density points, i.e., 1, 1.5 and 2.0 as determined with B filter light. As the ozonizer there was used a commercially available 5 kV ac voltage-applied high voltage discharge process device. The ozone gas concentration in the test vessel was adjusted by the use of a Type OZG-EM-01 ozone gas monitor (produced by APPLICS CO., LTD.).

The measurements were then evaluated according to the following three-step criterion. Those showing a percent magenta dye remaining of not smaller than 80% in the dark yellow ink (calculated from the measurements obtained with a G filter) at any density were ranked A. Those showing a percent magenta dye remaining of less than 80% at one or two density points were ranked B. Those showing a percent magenta dye remaining of less than 70% at all densities were ranked C.

Example 2

A dark yellow ink (DY-2) was prepared in the same manner as in Example 1 except that C.I. Acid Yellow 23 was used instead of C.I. Direct Yellow 132. A sample was then prepared from this dark yellow ink in the same manner as in Example 1. The sample thus prepared was then evaluated in the same manner as in Example 1.

Example 3

A dark yellow ink (DY-3) was prepared in the same manner as in Example 1 except that C.I. Acid Blue 9 was used instead of C.I. Direct Blue 199. A sample was then prepared from this dark yellow ink in the same manner as in Example 1. The sample thus prepared was then evaluated in the same manner as in Example 1.

Comparative Example 1

A dark yellow ink (DY-4) was prepared in the same manner as in Example 1 except that C.I. Acid Red 52 was used instead of the magenta dye (a-36) according to the invention. A sample was then prepared from this dark yellow ink in the same manner as in Example 1. The sample thus prepared was then evaluated in the same manner as in Example 1.

Comparative Example 2

A dark yellow ink (DY-5) was prepared in the same manner as in Example 1 except that a compound A of the following general formula was used instead of the magenta dye (a-36) according to the invention. A sample was then prepared from this dark yellow ink in the same manner as in Example 1. The sample thus prepared was then evaluated in the same manner as in Example 1.

Compound A

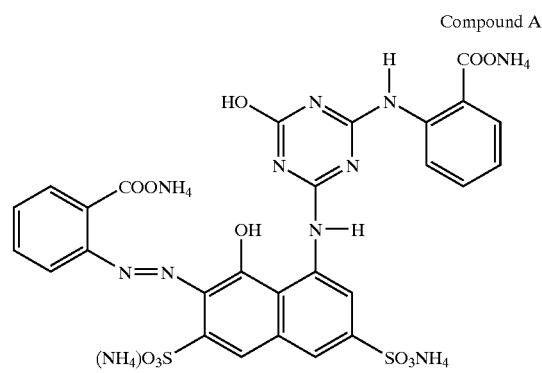

Reference Example 1

A sample was prepared in the same manner as in Example 1 except that a Type PM950C dark yellow ink was used instead of the dark yellow ink of Example 1. The sample thus prepared was then evaluated in the same manner as in Example 1.

The results are set forth in Table 14.

TABLE 14

| | Light fastness | Heat fastness | Ozone fastness |
|---|---|---|---|
| Example 1 | A | A | A |
| Example 2 | A | A | A |
| Example 3 | A | A | A |
| Comparative Example 1 | B | A | C |
| Comparative Example 2 | B | A | B |
| Reference Example 1 | B | A | C |

As can be seen in Table 12, the samples of Examples 1 to 3, which comprise a magenta dye of the general formula (I-a) incorporated in a dark yellow ink, are excellent all in light fastness, heat fastness and oxidation resistance represented by ozone fastness. The evaluation of image quality was effected in Example 4 below.

Example 4

<Preparation of Magenta Ink and Light Magenta Ink>

To the following components was added deionized water to make 1 l. The mixture was then heated to a temperature of from 30° C. to 40° C. with stirring for 1 hour. Thereafter, the solution was adjusted to pH 8.8 with a 1 mol/l hydrochloric acid or potassium hydroxide, and then filtered through a microfilter having an average pore diameter of 0.25 μm under reduced pressure to prepare a magenta ink solution M-1.

| | |
|---|---|
| Inventive magenta dye (exemplary compound a-36) | 23.0 g/l |
| Diethylene glycol | 150 g/l |
| Urea | 37 g/l |
| Glycerin | 130 g/l |
| Triethylene glycol monobutyl ether | 130 g/l |
| Triethanolamine | 6.9 g/l |
| Benzotriazole | 0.08 g/l |
| PROXEL XL2 | 3.5 g/l |
| Surfynol STG | 10 g/l |

A light magenta ink LM-1 was prepared according to the aforementioned formulation except that the content of the inventive magenta dye (exemplary compound a-36) was reduced to 7.5 g/l.

Subsequently, the foregoing inks thus prepared were each packed in the cartridge of a Type PM920C ink jet printer (produced by EPSON CO., LTD.) by which an image was then printed on a Type EX ink jet paper photographic paper (produced by Fuji Photo Film Co., Ltd.) to evaluate the image fastness thereof.

The inks used are set forth in Table 15.

For the evaluation of image quality, a sample (gray image) on which an image to be evaluated is printed such that the yellow, magenta and cyan densities reaches 1.0 as measured by the aforementioned Type X-rite densitometer and a photographic image of a person's face were prepared. These samples were then evaluated as follows.

(1) For the evaluation of light fastness, the sample image was irradiated with light at an image surface illuminance of 85 klux from the aforementioned high voltage xenon lamp for 10 days. The sample image was measured for chromaticity ($L^*a^*b^*$) of gray image using a Type X-rite 950 chromoscope before and after irradiation to calculate the chromaticity change ΔE. Those showing ΔE of not greater than 7 were ranked A. Those showing ΔE of from greater than 7 to not greater than 15 were ranked B. Those showing ΔE of greater than 15 were ranked C. The photographic image of person's face was irradiated with xenon light under the same conditions as mentioned above, and then subjected to visual organoleptic evaluation of change of flesh color from before to after irradiation.

(2) For the evaluation of heat fastness, the sample image was forcedly aged at a temperature of 80° C. and 70% RH for 10 days. The sample image was measured for chromaticity of gray image using the aforementioned Type X-rite 950 chromoscope before and after aging to calculate the chromaticity change ΔE. Those showing ΔE of not greater than 7 were ranked A. Those showing ΔE of from greater than 7 to not greater than 15 were ranked B. Those showing ΔE of greater than 15 were ranked C. The photographic image of person's face was processed under the same conditions as mentioned above, and then subjected to visual organoleptic evaluation of change of flesh color from before to after processing.

(3) For the evaluation of ozone gas resistance, the sample on which an image had been formed was allowed to stand in a testing vessel the ozone gas concentration of which had been adjusted to 0.5 ppm for 7 days. The sample image was measured for chromaticity ($L^*a^*b^*$) of gray image using the aforementioned Type X-rite 950 chromoscope before and after ozone gas resistance test to calculate the chromaticity change ΔE. Those showing ΔE of not greater than 7 were ranked A. Those showing ΔE of from greater than 7 to not greater than 15 were ranked B. Those showing, ΔE of greater than 15 were ranked C. The results are set forth in Table 16.

TABLE 15

| | Black | Yellow | Dark yellow | Magenta | Light magenta | Cyan | Light cyan |
|---|---|---|---|---|---|---|---|
| Example 5 | PM950C-black | PM950C-yellow | DY-1 | M-1 | LM-1 | PM950-cyan | PM950C-light cyan |
| Example 6 | PM950C-black | PM950C-yellow | DY-2 | " | " | PM950-cyan | PM950C-light cyan |
| Example 7 | PM950C-black | PM950C-yellow | DY-1 | PM950C-magenta | PM950C-light magenta | PM950-cyan | PM950C-light cyan |
| Comparative Example 3 | PM950C-black | PM950C-yellow | DY-4 | PM950C-magenta | PM950C-light magenta | PM950-cyan | PM950C-light cyan |
| Comparative Example 4 | PM950C-black | PM950C-yellow | DY-5 | PM950C-magenta | PM950C-light magenta | PM950-cyan | PM950C-light cyan |
| Reference Example 2 | PM950C-black | PM950C-yellow | PM950C-dark yellow | PM950C-magenta | PM950C-light magenta | PM950-cyan | PM950C-light cyan |

TABLE 16

| | Light fastness | | Heat fastness | | Ozone fastness | |
|---|---|---|---|---|---|---|
| | Gray image | Person | Gray image | Person | Gray image | Person |
| Example 5 | A | G (good) | A | G | B | G, F |
| Example 6 | A | G | A | G | B | G, F |
| Example 7 | B | F (fair) | A | G | B | F |
| Comparative Example 3 | C | P (poor) | A | G | B | F |
| Comparative Example 4 | C | P | B | F | C | P |

TABLE 16-continued

|  | Light fastness | | Heat fastness | | Ozone fastness | |
| --- | --- | --- | --- | --- | --- | --- |
|  | Gray image | Person | Gray image | Person | Gray image | Person |
| Reference Example 2 | B | F | A | G | B | F |

As can be seen in the results above, the ink set of the invention exhibits a reduced change of hue of gray and flesh color against light, heat and ozone because it comprises a magenta dye of the general formula (I-a), which has a good fastness, in the dark yellow ink as well as in the magenta ink.

The ink set of the invention comprising a magenta dye having a specific structure of the general formula (I-a) having a 6-membered heterocyclic group connected to diazo group exhibits a high recorded image quality and excellent heat stability, light fastness and oxidation resistance and shows little change of color balance with time even during storage.

Example 8

<Preparation of Dark Yellow Ink>

To the following components was added deionized water to make 1 l. The mixture was then heated to a temperature of from 30° C. to 40° C. with stirring for 1 hour. Thereafter, the solution was adjusted to pH 8.8 with a 1 mol/l hydrochloric acid or potassium hydroxide, and then filtered through a microfilter having an average pore diameter of 0.25 μm under reduced pressure to prepare a dark yellow ink solution DY-1.

| | |
|---|---|
| C.I. Direct Yellow 132 | 20.5 g/l |
| C.I. Direct Yellow 86 | 6.0 g/l |
| Inventive cyan dye (exemplary compound 154) | 8.0 g/l |
| C.I. Acid Red 52 | 6.0 g/l |
| Diethylene glycol | 150 g/l |
| Urea | 37 g/l |
| Glycerin | 130 g/l |
| Triethylene glycol monobutyl ether | 130 g/l |
| Triethanolamine | 6.9 g/l |
| Benzotriazole | 0.08 g/l |
| PROXEL XL2 | 3.5 g/l |
| Surfynol STG | 10 g/l |

Subsequently, the foregoing ink thus prepared was mounted on the dark yellow portion of the cartridge of a Type PM920C ink jet printer (produced by EPSON Co., LTD.) by which an image was then printed on a Type EX ink jet paper photographic paper (produced by Fuji Photo Film Co., Ltd.) to evaluate the image fastness thereof.

For the evaluation of image preservability, a stepwise patch sample made of a patch having a stepwise gradation of dark yellow density was prepared. This sample was then subjected to the following evaluation.

(1) For the evaluation of light fastness, the density Ci of an image printed on the sample was measured using a reflection densitometer (X-rite 310). The sample was then irradiated with light at an image surface illuminance of 85 klux from a high voltage xenon lamp (Type Ci65A5kv weatherometer, produced by Atlas Electric Devices, Inc.) through a pyrex glass having a thickness of 6.5 mm for 10 days. The sample thus irradiated was then measured for image density Cf to determine the percent remaining of dye Cf/Ci×100 which was then used for evaluation. For the evaluation of percent remaining of dye, the reflection density was evaluated according to three points of yellow density, i.e., 1, 1.5 and 2 as measured through a status A blue filter (hereinafter referred to as "B filter"). Those showing a percent magenta dye remaining of not smaller than 70% in the dark yellow ink (calculated from the measurements obtained with status A green filter light, i.e., G filter light) at any density were ranked A. Those showing a percent magenta dye remaining of less than 70% at one or two density points were ranked B. Those showing a percent magenta dye remaining of less than 70% at all densities were ranked C.

(2) For the evaluation of heat fastness, the sample was forcedly aged at a temperature of 80° C. and 70% RH for 10 days. The sample was measured for density using the aforementioned Type X-rite 310 reflection densitometer before and after aging to determine the percent dye remaining which was then evaluated. The percent dye remaining was then evaluated at three reflection density points, i.e., 1, 1.5 and 2 as calculated in terms of yellow measured through a B filter. Those showing a percent magenta dye-remaining of not smaller than 90% in the dark yellow ink (calculated from the measurements obtained with a G filter) at any density were ranked A. Those showing a percent magenta dye remaining of less than 90% at one or two density points were ranked B. Those showing a percent magenta dye remaining of less than 90% at all densities were ranked C. Those showing a remarkable decoloration were ranked D.

(3) For the evaluation of ozone gas resistance, the sample on which an image had been formed was allowed to stand in a testing vessel the ozone gas concentration of which had been adjusted to 0.5 ppm for 7 days. The sample was measured for image density (G filter optical density) using a Type X-Rite 310TR reflection densitometer before and after aging to determine the percent dye remaining which was then evaluated. The reflection density was measured at three yellow density points, i.e., 1, 1.5 and 2.0 as determined with B filter light. As the ozonizer there was used a commercially available 5 kV ac voltage-applied high voltage discharge process device. The ozone gas concentration in the test vessel was adjusted by the use of a Type OZG-EM-01 ozone gas monitor (produced by APPLICS CO., LTD.).

The measurements were then evaluated according to the following three-step criterion. Those showing a percent magenta dye remaining of not smaller than 80% in the dark yellow ink (calculated from the measurements obtained with a G filter) at any density were ranked A. Those showing a percent magenta dye remaining of less than 80% at one or two density points were ranked S. Those showing a percent magenta dye remaining of less than 70% at all densities were ranked C.

Example 9

A dark yellow ink (DY-2) was prepared in the same manner as in Example 8 except that C.I. Acid Yellow 23 was used instead of C.I. Direct Yellow 132. A sample was then prepared from this dark yellow ink in the same manner as in Example 8. The sample thus prepared was then evaluated in the same manner as in Example 8.

Example 10

A dark yellow ink (DY-3) was prepared in the same manner as in Example 8 except that a compound A of the following general formula was used instead of C.I. Acid Red 52. A sample was then prepared from this dark yellow ink in the same manner as in Example 8. The sample thus prepared was then evaluated in the same manner as in Example 8.

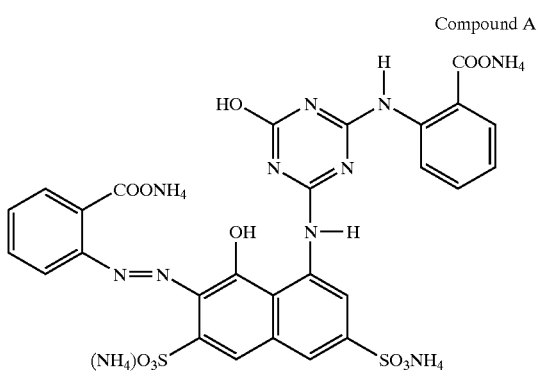

Compound A

Comparative Example 5

A dark yellow ink (DY-4) was prepared in the same manner as in Example 8 except that C.I. Direct Blue 199 was used instead of the cyan dye (154) according to the invention. A sample was then prepared from this dark yellow ink in the same manner as in example 8. The sample thus prepared was then evaluated in the same manner as in Example 8.

Comparative Example 6

A dark yellow ink (DY-5) was prepared in the same manner as in Example 8 except that C.I. Acid Blue 9 was used instead of the cyan dye (154) according to the invention. A sample was then prepared from this dark yellow ink in the same manner as in Example 8. The sample thus prepared was then evaluated in the same manner as in Example 8.

Reference Example 3

A sample was prepared in the same manner as in Example 8 except that a Type PM950C dark yellow ink was used instead of the dark yellow ink of Example 8. The sample thus prepared was then evaluated in the same manner as in Example 8.

The results are set forth in Table 17.

TABLE 17

|  | Light fastness | Heat fastness | Ozone fastness |
|---|---|---|---|
| Example 8 | A | A | A |
| Example 9 | A | A | A |
| Example 10 | A | A | A |
| Comparative Example 5 | B | A | C |
| Comparative Example 6 | B | A | C |
| Reference Example 3 | B | A | C |

As can be seen in Table 17, the samples of Examples 8 to 10, which comprise a phthalocyanine dye of the general formula (I-b) incorporated in a dark yellow ink, are excellent all in light fastness, heat fastness and oxidation resistance represented by ozone fastness. The evaluation of image quality was effected in Example 11 below.

Example 11

<Preparation of Cyan Ink and Light Cyan Ink>

To the following components was added deionized water to make 1 l. The mixture was then heated to a temperature of from 30° C. to 40° C. with stirring for 1 hour. Thereafter, the solution was adjusted to pH 8.8 with a 1 mol/l hydrochloric acid or potassium hydroxide, and then filtered through a microfilter having an average pore diameter of 0.25 μm under reduced pressure to prepare a magenta ink solution C-1.

| | |
|---|---|
| Inventive cyan dye (exemplary compound 154) | 68.0 g/l |
| Diethylene glycol | 150 g/l |
| Urea | 37 g/l |
| Glycerin | 130 g/l |
| Triethylene glycol monobutyl ether | 130 g/l |
| Triethanolamine | 6.9 g/l |
| Benzotriazole | 0.08 g/l |
| PROXEL XL2 | 3.5 g/l |
| Surfynol STG | 10 g/l |

A light cyan ink LC-1 was prepared according to the aforementioned formulation except that the content of the inventive cyan dye (154) was reduced to 17.5 g/l.

Subsequently, the foregoing inks thus prepared were each packed on the cartridge of a Type PM920C ink jet printer (produced by EPSON CO., LTD.) by which an image was then printed on a Type EX ink jet paper photographic paper (produced by Fuji Photo Film Co., Ltd.) to evaluate the image fastness thereof.

The inks used are set forth in Table 15.

TABLE 15

| | Black | Yellow | Dark yellow | Magenta | Light magenta | Cyan | Light cyan |
|---|---|---|---|---|---|---|---|
| Example 12 | PM950C-black | PM950C-yellow | DY-1 | PM950C-magenta | PM950C-light magenta | C-1 | LC-1 |

TABLE 15-continued

|  | Black | Yellow | Dark yellow | Magenta | Light magenta | Cyan | Light cyan |
|---|---|---|---|---|---|---|---|
| Example 13 | PM950C-black | PM950C-yellow | DY-2 | PM950C-magenta | PM950C-light magenta | " | " |
| Example 14 | PM950C-black | PM950C-yellow | DY-1 | PM950C-magenta | PM950C-light magenta | PM950-cyan | PM950C-light cyan |
| Comparative Example 7 | PM950C-black | PM950C-yellow | DY-4 | PM950C-magenta | PM950C-light magenta | PM950-cyan | PM950C-light cyan |
| Comparative Example 8 | PM950C-black | PM950C-yellow | DY-5 | PM950C-magenta | PM950C-light magenta | PM950-cyan | PM950C-light cyan |
| Reference Example 4 | PM950C-black | PM950C-yellow | PM950C-dark yellow | PM950C-magenta | PM950C-light magenta | PM950-cyan | PM950C-light cyan |

For the evaluation of image quality, a sample (gray image) on which an image to be evaluated is printed such that the yellow, magenta and cyan densities reaches 1.0 as measured by the aforementioned Type X-rite densitometer and a photographic image of a person's face were prepared. These samples were then evaluated as follows.

(1) For the evaluation of light fastness, the sample image was irradiated with light at an image surface illuminance of 85 klux from the aforementioned high voltage xenon lamp for 10 days. The sample image was measured for chromaticity (L*a*b*) of gray image using a Type X-rite 950 chromoscope before and after irradiation to calculate the chromaticity change ΔE. Those showing ΔE of not greater than 7 were ranked A. Those showing ΔE of from greater than 7 to not greater than 15 were ranked B. Those showing ΔE of greater than 15 were ranked C. The photographic image of person's face was irradiated with xenon light under the same conditions as mentioned above, and then subjected to visual organoleptic evaluation of change of flesh color from before to after irradiation.

(2) For the evaluation of heat fastness, the sample image was forcedly aged at a temperature of 80° C. and 70% RH for 10 days. The sample image was measured for chromaticity of gray image using the aforementioned Type X-rite 950 chromoscope before and after aging to calculate the chromaticity change ΔE. Those showing ΔE of not greater than 7 were ranked A. Those showing ΔE of from greater than 7 to not greater than 15 were ranked B. Those showing ΔE of greater than 15 were ranked C. The photographic image of person's face was processed under the same conditions as mentioned above, and then subjected to visual organoleptic evaluation of change of flesh color from before to after processing.

(3) For the evaluation of ozone gas resistance, the sample on which an image had been formed was allowed to stand in a testing vessel the ozone gas concentration of which had been adjusted to 0.5 ppm for 7 days. The sample image was measured for chromaticity (L*a*b*) of gray image using the aforementioned Type X-rite 950 chromoscope before and after ozone gas resistance test to calculate the chromaticity change ΔE. Those showing ΔE of not greater than 7 were ranked A. Those showing ΔE of from greater than 7 to not greater than 15 were ranked B. Those showing ΔE of greater than 15 were ranked C.

The results are set forth in Table 19.

TABLE 19

|  | Light fastness | | Heat fastness | | Ozone fastness | |
|---|---|---|---|---|---|---|
|  | Gray image | Person | Gray image | Person | Gray image | Person |
| Example 12 | A | G (good) | A | G | A | G |
| Example 13 | A | G | A | G | A | G |
| Example 14 | B | F (fair) | A | G | B | G, F |
| Comparative Example 7 | C | P (poor) | A | G | B | F |
| Comparative Example 8 | C | P | B | F | C | P |
| Reference Example 4 | B | F | A | G | B | F |

As can be seen in the results above, the ink set of the invention exhibits a reduced change of hue of gray and flesh color against light, heat and ozone because it comprises a cyan dye of the general formula (I-b), which has a good fastness, in the dark yellow ink as well as in the cyan ink.

The ink set of the invention comprising at least one phthalocyanine dye having a specific structure of the general formula (I-b) exhibits a high recorded image quality and excellent heat stability, light fastness and oxidation resistance and shows little change of color balance with time even during storage.

The entire disclosure of each and every foreign patent application: Japanese Patent Applications No. 2002-215396 and No. 2002-215297, from which the benefit of foreign priority has been claimed in the present application is incorporated herein by reference, as if fully set forth.

What is claimed is:

1. An ink set for ink jet recording, which comprises a plurality of inks containing a dye, a water-miscible organic solvent and water, wherein the ink set includes yellow, magenta, cyan, black and dark yellow inks, and the dark yellow ink contains at least one of a magenta dye represented by the following general formula (I-a) and a cyan dye represented by the following general formula (I-b):

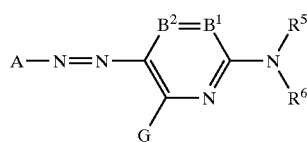

(I-a)

wherein A represents a 5-membered heterocyclic group; $B^1$ and $B^2$ each represent a nitrogen atom, $=CR^1-$ or $-CR^2=$, and when one of $B^1$ and $B^2$ represents a nitrogen atom, the other represents $=CR^1-$ or $-CR^2=$; $R^5$ and $R^6$ each independently a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, the hydrogen atom of which maybe substituted; G, $R^1$ and $R^2$ each independently represent a hydrogen atom, halogen atom, aliphatic group, aromatic group, heterocyclic group, cyano group, carboxyl group, carbamoyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureide group, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfinyl group, sulfamoyl group or sulfo group, the hydrogen atom of which may be substituted; $R^1$ and $R^5$ or $R^5$ and $R^6$ may be connected to each other to form a 5- or 6-membered ring:

(I-b)

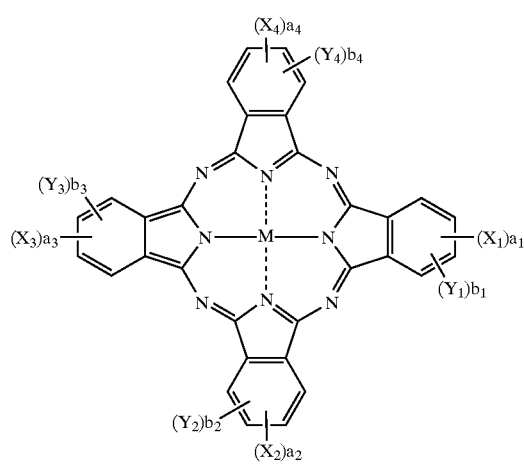

wherein $X_1$, $X_2$, $X_3$ and $X_4$ each independently represent $-SO\text{-}Z$, $-SO_2\text{-}Z$, $-SO_2NR_1R_2$, sulfo group, $-CONR_1R_2$ or $-CO_2R_1$; Z represents a substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group; $R_1$ and $R_2$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group, with the proviso that when there area plurality of Z's, they may be the same or different;

$Y_1$, $Y_2$, $Y_3$ and $Y_4$ each independently represent a monovalent substituent, with the proviso that when there are a plurality of any of $X_1$ to $X_4$ and $Y_1$ to $Y_4$, they may be the same or different; M represents a hydrogen atom, a metal atom, or the oxide, hydroxide or halide thereof; and $a_1$ to $a_4$ and $b_1$ to $b_4$ each independently represent an integer of from 0 to 4, which indicate the number of substituents on $X_1$ to $X_4$ and $Y_1$ to $Y_4$, with the proviso that $a_1$ to $a_4$ are not 0 at the same time.

2. The ink set for ink jet recording as defined in claim 1, wherein the dark yellow ink and the magenta ink each comprise at least one magenta dye represented by the general formula (I-a).

3. The ink set for ink jet recording as defined in claim 1, wherein the dark yellow ink and the cyan ink each comprise at least one cyan dye represented by the general formula (I-b).

4. The ink set for ink jet recording as defined in claim 1, wherein the ink set comprises yellow, dark yellow, magenta, light magenta, cyan, light cyan and black inks.

5. An ink jet recording method, which comprises ejecting ink from the ink set for ink jet recording as defined in claim 1.

6. The ink jet recording method which comprises: ejecting an ink droplet onto an image-receiving material according to a recording signal, in which the image-receiving material comprises an image-receiving layer containing a particulate white inorganic pigment provided on a support; and recording an image on the image-receiving material, wherein the ink droplet is an ink of the ink set for ink jet recording defined in claim 1.

* * * * *